US009776568B2

(12) United States Patent
Hoyda et al.

(10) Patent No.: US 9,776,568 B2
(45) Date of Patent: Oct. 3, 2017

(54) SYSTEM AND PROCESS FOR VIEWING IN BLIND SPOTS

(71) Applicant: Serge B. Hoyda, Great Neck, NY (US)

(72) Inventors: Serge B. Hoyda, Great Neck, NY (US); Zachary Bernard Hines, Jackson Heights, NY (US)

(73) Assignee: Serge B. Hoyda, Great Neck, NY (US)

( * ) Notice: Subject to any disclaimer, the term of this patent is extended or adjusted under 35 U.S.C. 154(b) by 0 days.

(21) Appl. No.: 15/161,189

(22) Filed: May 20, 2016

(65) Prior Publication Data

US 2016/0288713 A1  Oct. 6, 2016

Related U.S. Application Data

(63) Continuation-in-part of application No. 14/898,129, filed as application No. PCT/US2015/065255 on Dec. 11, 2015.

(Continued)

(51) Int. Cl.
*H04N 7/18* (2006.01)
*B60R 1/00* (2006.01)
(Continued)

(52) U.S. Cl.
CPC ............... *B60R 1/002* (2013.01); *B60R 1/00* (2013.01); *B60R 11/04* (2013.01); *G08G 1/167* (2013.01);
(Continued)

(58) Field of Classification Search
CPC ..... B60R 1/002; B60R 1/00; B60R 2300/105; B60R 2300/8026; B60R 2300/202;
(Continued)

(56) References Cited

U.S. PATENT DOCUMENTS 4,892,386 A  1/1990 Suzuki et al.
5,096,287 A  3/1992 Kakinami et al.
(Continued)

FOREIGN PATENT DOCUMENTS

EP    0 990 834 A1   4/2000
WO   2006/027563 A1  3/2006
(Continued)

OTHER PUBLICATIONS

International Search Report of PCT/US15/65255, dated Mar. 29, 2016.

(Continued)

*Primary Examiner* — Allen Wong
(74) *Attorney, Agent, or Firm* — Collard & Roe, P.C.

(57) ABSTRACT

There is disclosed a viewing system coupled to a motor vehicle having a frame having a roof, at least one support, and a body with the at least one support supporting the roof over the body. The system can comprise at least one camera, at least one screen coupled to the support. In addition each camera is coupled to the at least one support and wherein said at least one screen is in communication with the first set of cameras, wherein said at least one screen displays images presented by the first set of cameras. This device can provide additional view in the blind spot of the vehicle.

17 Claims, 64 Drawing Sheets

Related U.S. Application Data

(60) Provisional application No. 62/181,170, filed on Jun. 17, 2015, provisional application No. 62/091,346, filed on Dec. 12, 2014.

(51) Int. Cl.

| | | |
|---|---|---|
| *B60R 11/04* | (2006.01) | |
| *G08G 1/16* | (2006.01) | |
| *B60R 11/00* | (2006.01) | |

(52) U.S. Cl.
CPC ........ *H04N 7/181* (2013.01); *B60R 2011/004* (2013.01); *B60R 2011/0033* (2013.01); *B60R 2011/0052* (2013.01); *B60R 2011/0071* (2013.01); *B60R 2011/0073* (2013.01); *B60R 2011/0089* (2013.01); *B60R 2300/105* (2013.01); *B60R 2300/202* (2013.01); *B60R 2300/8026* (2013.01)

(58) Field of Classification Search
CPC ....... B60R 2011/004; B60R 2011/0071; B60R 2011/0073; B60R 2011/0089; B60R 2011/0033; B60R 11/04; G08G 1/167; H04N 7/181
USPC .......................................................... 348/149
See application file for complete search history.

(56) References Cited

U.S. PATENT DOCUMENTS

| | | | |
|---|---|---|---|
| 5,727,960 | A | 3/1998 | Zehrung |
| 6,115,651 | A | 9/2000 | Cruz |
| 6,122,865 | A | 9/2000 | Branc et al. |
| 6,859,148 | B2 | 2/2005 | Miller et al. |
| 6,954,152 | B1 | 10/2005 | Matthews |
| 7,049,945 | B2 | 5/2006 | Breed et al. |
| 8,004,425 | B2 | 8/2011 | Hoek et al. |
| 8,624,716 | B2 | 1/2014 | Englander |
| 2002/0003571 | A1* | 1/2002 | Schofield ................ B60C 23/00 348/148 |
| 2002/0124479 | A1 | 9/2002 | Branc et al. |
| 2003/0095185 | A1 | 5/2003 | Naifeh |
| 2004/0211868 | A1 | 10/2004 | Holmes et al. |
| 2006/0197019 | A1* | 9/2006 | Satou ........................ G01S 7/51 250/338.1 |
| 2006/0221183 | A1 | 10/2006 | Sham |
| 2007/0035385 | A1* | 2/2007 | Miyahara ................ G01S 11/12 340/435 |
| 2007/0170321 | A1 | 7/2007 | Smed |
| 2008/0099655 | A1 | 5/2008 | Goodman |
| 2008/0117298 | A1 | 5/2008 | Torres |
| 2008/0136915 | A1 | 6/2008 | Iwamura |
| 2008/0203308 | A1* | 8/2008 | Yoo ........................... B60R 1/00 250/352 |
| 2009/0091618 | A1 | 4/2009 | Anderson |
| 2010/0231719 | A1* | 9/2010 | Nakamura ............... B60R 11/04 348/148 |
| 2010/0315507 | A1* | 12/2010 | Chrobocinski ........ H04N 7/181 348/143 |
| 2010/0321408 | A1* | 12/2010 | Miceli ..................... G09G 3/001 345/643 |
| 2011/0267466 | A1 | 11/2011 | Brester |
| 2012/0105638 | A1* | 5/2012 | Englander ................ B60Q 1/24 348/148 |
| 2013/0169469 | A1 | 7/2013 | Mitsuta et al. |
| 2013/0193173 | A1* | 8/2013 | Bonito ................ B60R 11/0235 224/274 |
| 2015/0002633 | A1 | 1/2015 | Hayashi et al. |
| 2015/0002642 | A1 | 1/2015 | Dressler |
| 2015/0282346 | A1* | 10/2015 | Ganim ................. H05K 5/0204 361/807 |
| 2016/0050399 | A1 | 2/2016 | Chuter et al. |
| 2016/0062217 | A1 | 3/2016 | Slater |
| 2016/0288713 | A1 | 10/2016 | Hoyda et al. |
| 2017/0026555 | A1 | 1/2017 | Hoyda et al. |

FOREIGN PATENT DOCUMENTS

| | | |
|---|---|---|
| WO | 2007/081894 A2 | 7/2007 |
| WO | 2014/162260 A1 | 10/2014 |
| WO | 2016/094801 A1 | 6/2016 |
| WO | 2016/094882 A1 | 6/2016 |

OTHER PUBLICATIONS

International Search Report of PCT/US15/65407, dated Feb. 25, 2016.

International Preliminary Report on Patentability and Written Opinion of the International Searching Authority of PCT/US2015/065255 dated Jun. 22, 2017.

International Preliminary Report on Patentability and Written Opinion of the International Searching Authority of PCT/US2015/065407 dated Jun. 22, 2017.

Non-Final Office Action in U.S. Appl. No. 15/161,173 dated Jan. 30, 2017.

Final Office Action in U.S. Appl. No. 15/161,173 dated Apr. 24, 2017.

International Search Report and Written Opinion of the International Searching Authority with Notice of Transmittal of the International Search Report and Written Opinion of PCT/US17/27972, dated Jun. 29, 2017.

Non-Final Office Action in U.S. Appl. No. 14/898,130 dated Jul. 31, 2017.

* cited by examiner

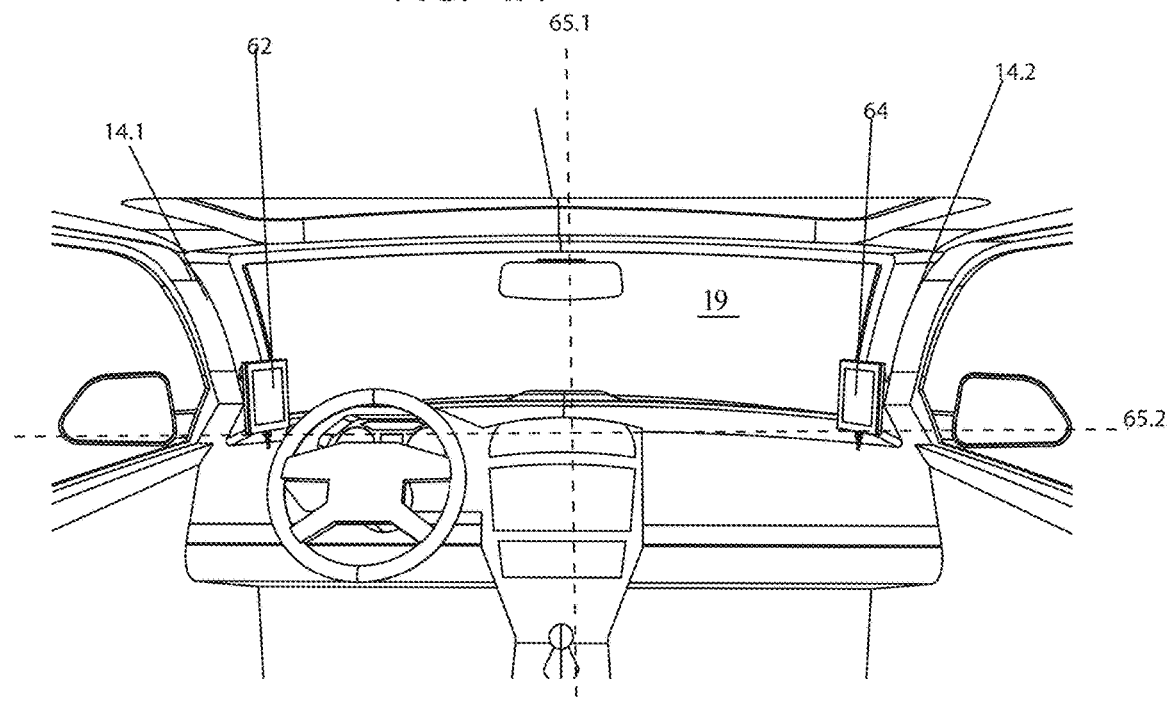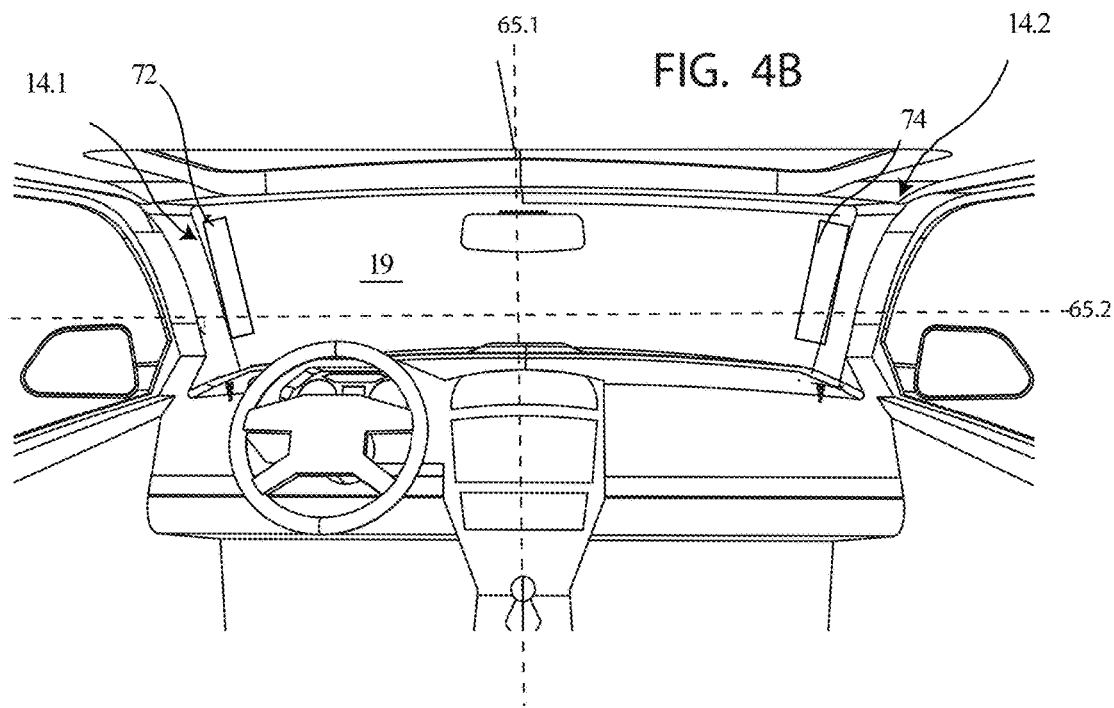

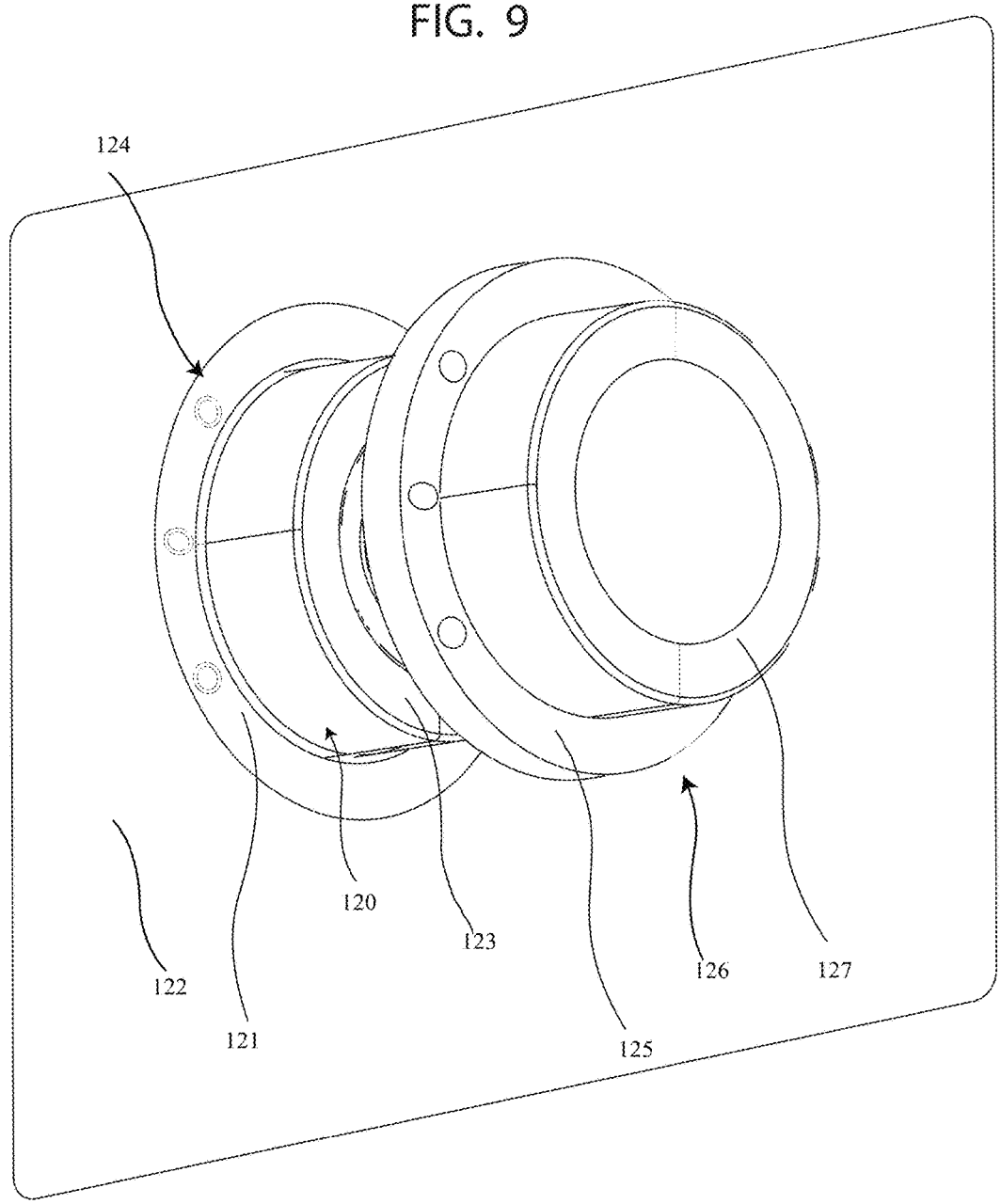

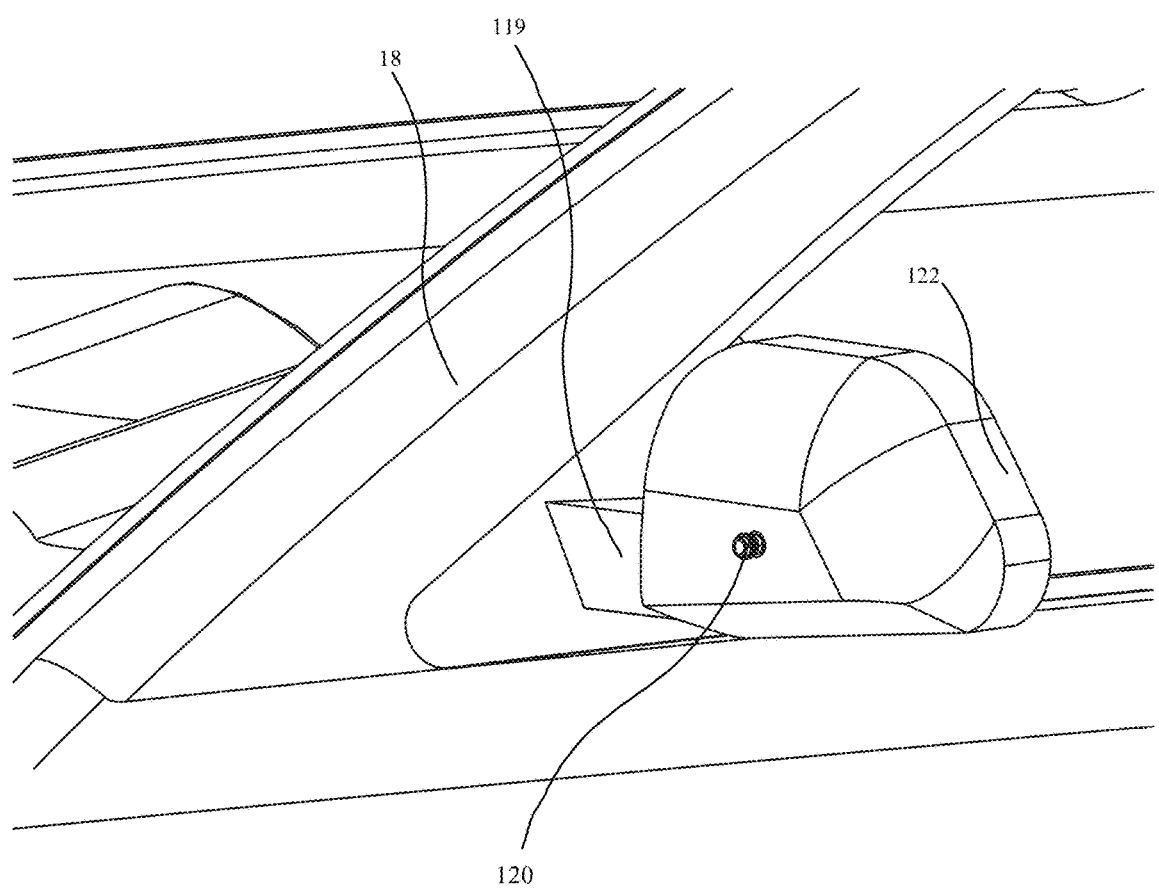

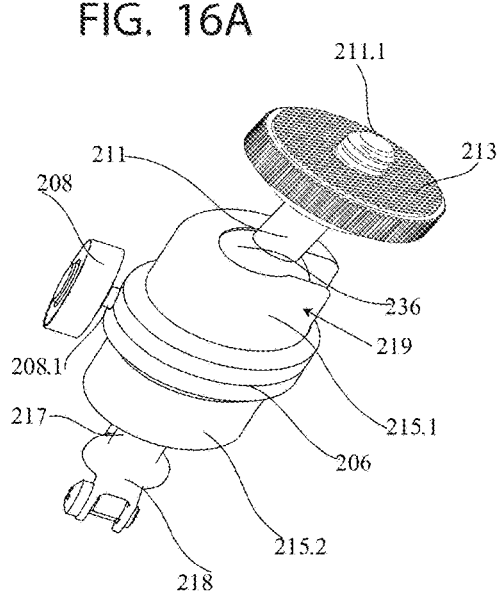
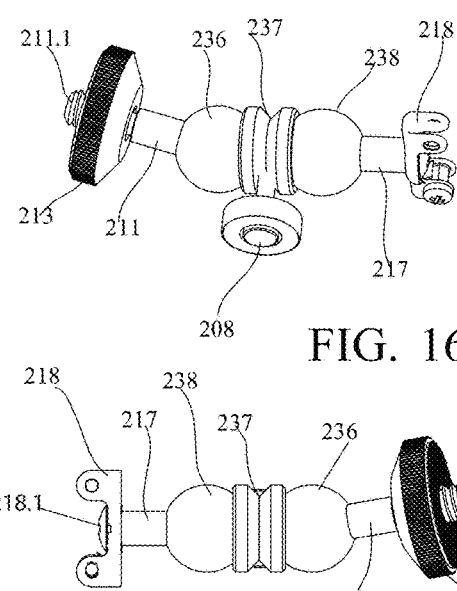
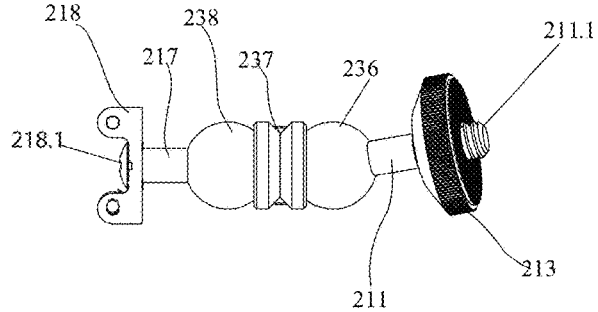
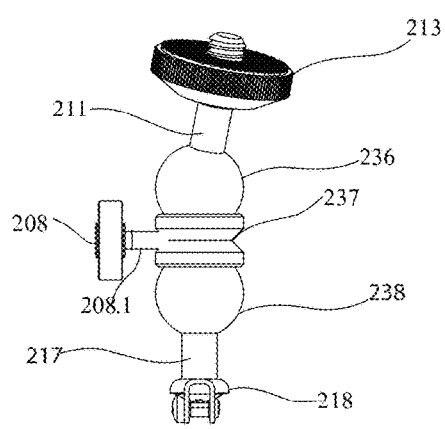
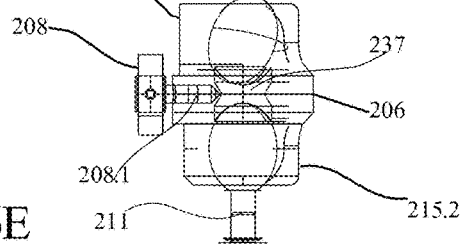
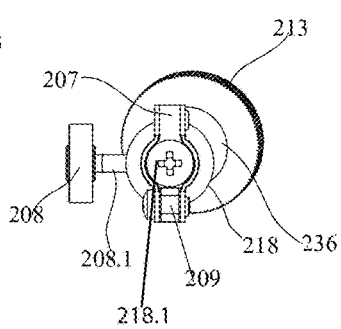

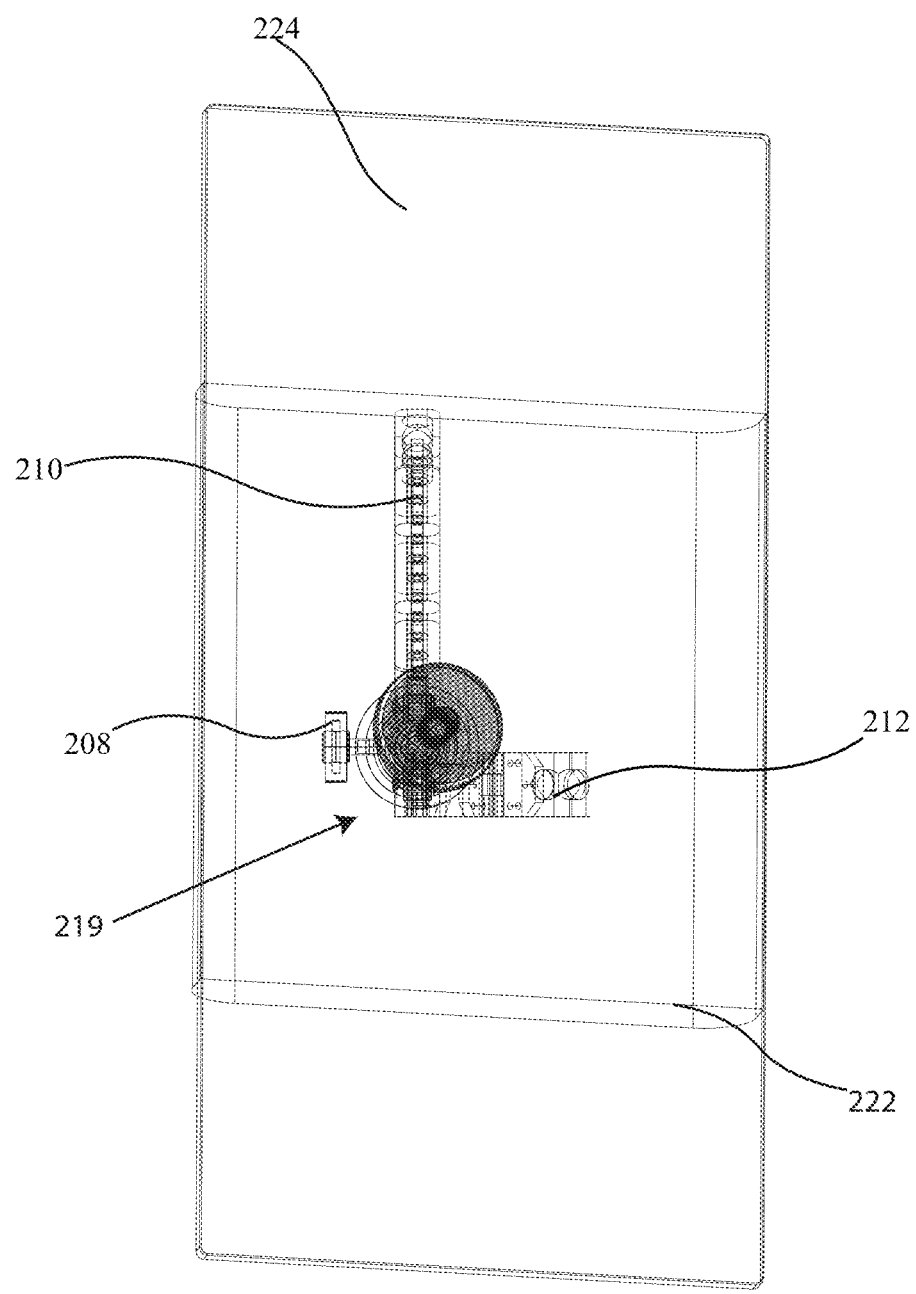

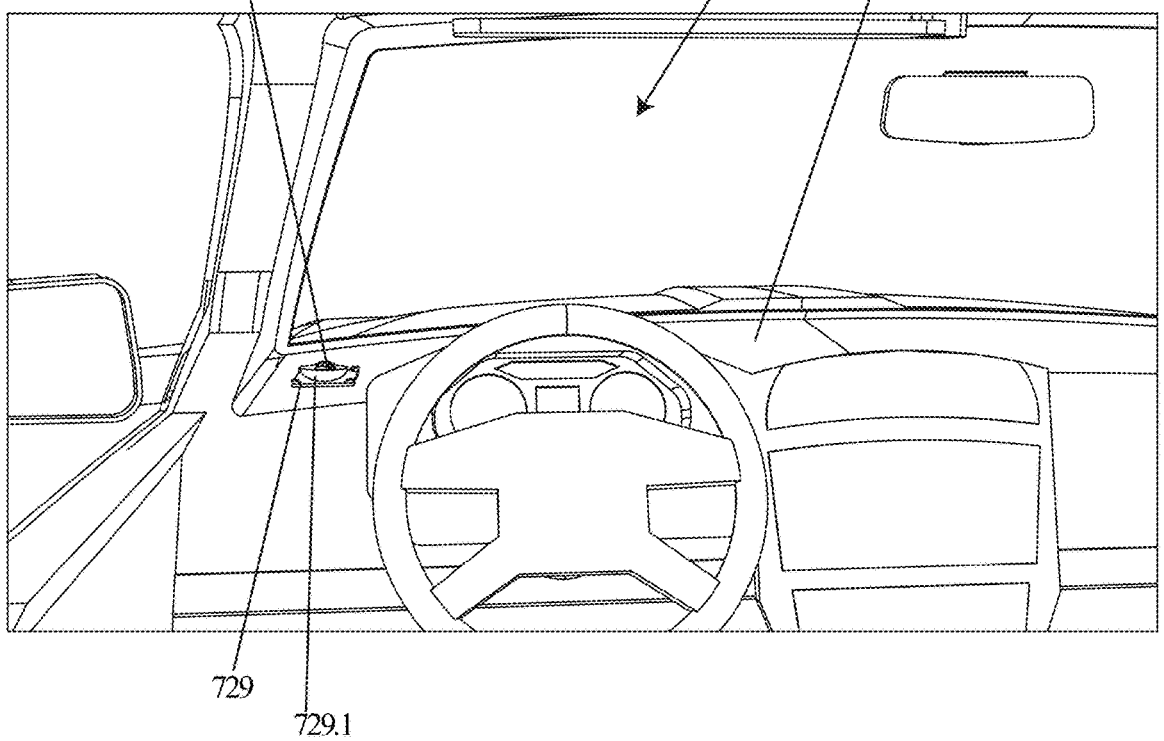

SYSTEM AND PROCESS FOR VIEWING IN BLIND SPOTS

CROSS REFERENCE TO RELATED APPLICATIONS

This application is a continuation in part application that claims priority to U.S. patent application Ser. No. 14/898,129 filed on Dec. 12, 2015 which is a national stage application of International Application Serial No. PCT/US15/65255 filed on Dec. 11, 2015. This application is also a continuation in part application of PCT/US15/65255 filed on Dec. 11, 2015. Both the '129 application, and the international application '65255 claim priority from two provisional applications including Ser. No. 62/091,346 filed on Dec. 12, 2014 and Ser. No. 62/181,170 filed on Jun. 17, 2015 wherein the disclosure of these two applications are hereby incorporated by reference in their entirety.

BACKGROUND

One embodiment relates to a display and video system for viewing blind spots which is configured to expand the viewing area for operators of autos, or motor vehicles, planes, or boats. Sometimes viewers encounter blind spots and cannot see around obstructions limiting the visibility required for the operation of the vehicle. Therefore, there is a need to have additional viewing areas for users so that people can see in the blind spots.

SUMMARY

In one embodiment, there is disclosed a viewing system coupled to a device such as a motor vehicle, a plane, or a boat having a frame, having a roof, at least one support, and a body with the at least one support supporting the roof over the body. The system can comprise a first set of cameras at least one screen coupled to the support. In addition, the first set of cameras are also coupled to the at least one support and wherein said at least one screen is in communication with the first set of cameras, wherein said at least one screen displays images presented by the first set of cameras.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 4A is an inside view of an auto of the embodiment of either FIG. 1 A or FIG. 2A;
FIG. 4B is another view of the inside of the automobile;
FIG. 9 is a side view of the side view mirror with the camera on it;
FIG. 10A is a front perspective view of a side view mirror with a camera on it;
FIG. 16A is a side view of the adjustable connection of FIG. 15;
FIG. 16B is a side perspective view of a portion of the adjustable connection of FIG. 15;
FIG. 16C is a side view of a portion of the adjustable connection of FIG. 15;
FIG. 16D is a side view of the adjustable connector of FIG. 16A;
FIG. 16E shows an end view of the adjustable connector of FIG. 16A;
FIG. 16F shows a side see-thru view of the embodiment shown in FIG. 16A;
FIG. 18A is a back view of the screen.

FIG. 42C is a view of the inside of a vehicle having another embodiment;

DETAILED DESCRIPTION

Figure 1A:
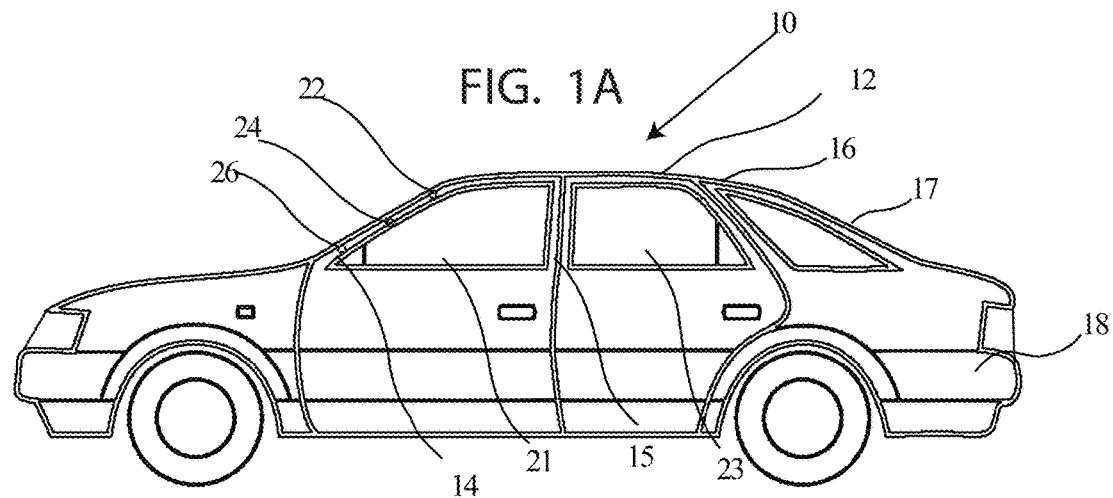
FIG. 1A is a side view of one embodiment.

FIG. 1 A is a side view of one embodiment. This embodiment 10 shows an automobile 12 having a frame comprising a body 18, a roof 16, and supports 14 and 15. Supports 14 and 15 support the roof over the body. Windows such as front windshield 19 are positioned between supports 14.1 and 14.2. Support 14 comprises both supports 14.1 and 14.2. Support 15 comprises both supports 15.1 and 15.2. There is also a rear support 17 which is also useful in supporting roof 16 over body 18. Side windows 21 and 23 are interspersed between roof 16 and body 18 as well.

Figure 1B:
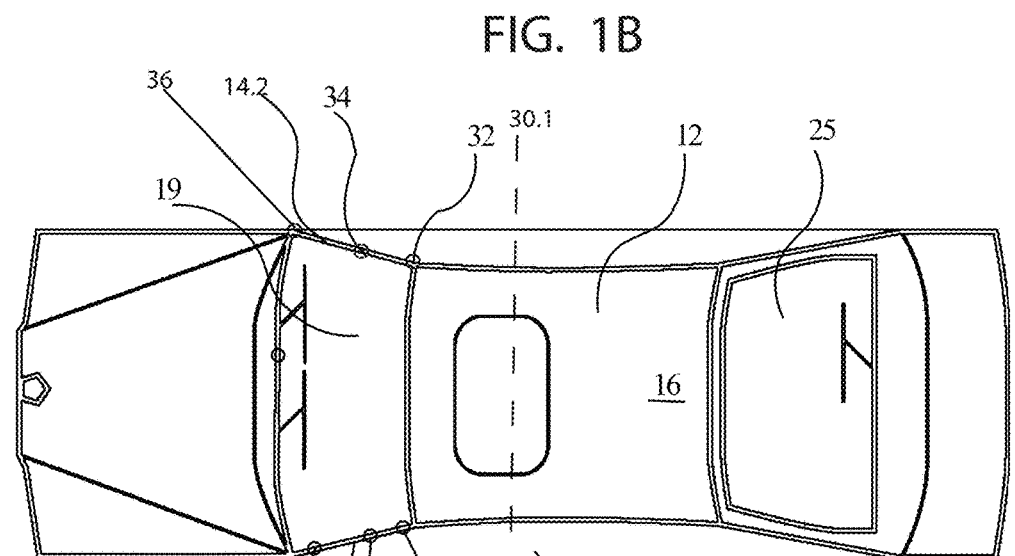
FIG. 1B is a top view of the embodiment shown in FIG. 1A.

FIG. 1B is a top view of the embodiment shown in FIG. 1 A. In this view there is windshield 19 as well as back windshield 25. The top of roof 16 is also shown. In addition, there is shown the two sides of the auto with supports 14.1 and 14.2 each having multiple cameras such as at least one camera. There are for example, three cameras 22, 24, and 26 in the first side support 14.1. In addition there is an additional support 14.2 which has additional cameras 32, 34, and 36 as well. There is also a dashed dotted line 30.1 which bisects the auto wherein in this view a front end of the auto is to the left side of the line and back end of the auto is to the right side of the line. Supports 14.1 and 14.2 sit at the front end of the auto.

Figure 1C:
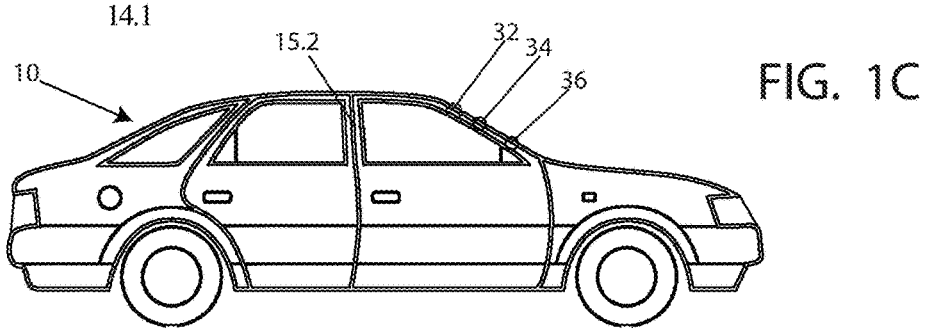
FIG. 1C shows an opposite side view of the embodiment shown in FIG. 1 A.

FIG. 1C shows the opposite side from FIG. 1A showing cameras 32, 34, 36 and support 15.2 as well. Thus, there could be at least one, but in this embodiment there are at least three cameras on each side of the supports 14.1 and 14.2 respectively. Because there are a plurality of cameras, on each side, each of these cameras provide additional depth perceptions because these cameras are positioned at different heights and different depths from the front of an automobile. These cameras 22, 24, 26, and 32, 34 and 36 are positioned between a front windshield of the auto 12.

Figure 2A:
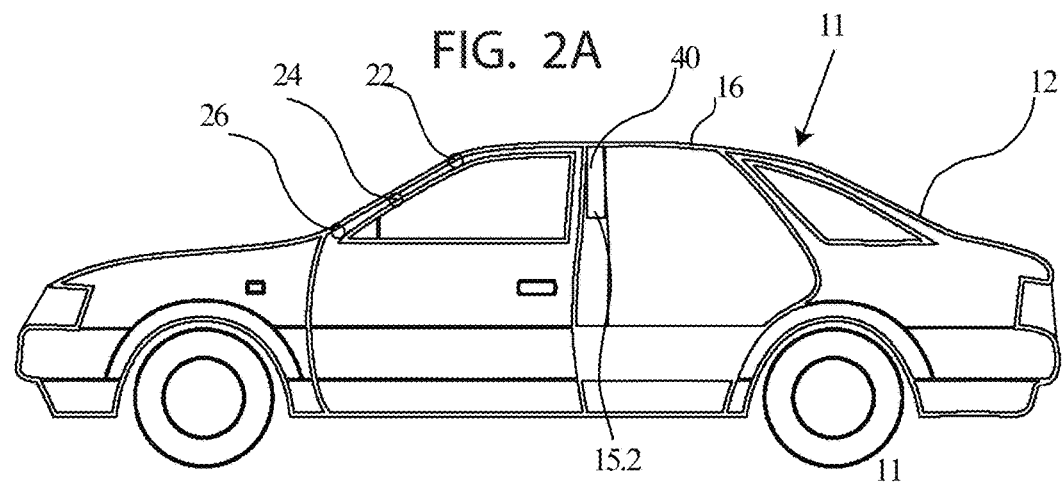
FIG. 2A is a side cut-away view of another embodiment.

FIG. 2A shows a side view of an automobile wherein this design shows another embodiment 11 which shows a screen 40 which shows the images or view inside of an automobile. This view also shows cameras 22, 24, and 26 coupled to supports 14. This view is a cut-away side view showing the interior of the vehicle. The positioning of this screen is in a middle section of the automobile on the support frame between the front seat of the auto and the back seat. The screen or display 40 is coupled to the frame section using a support structure such as that shown in FIG. 2A.

Figure 2B:
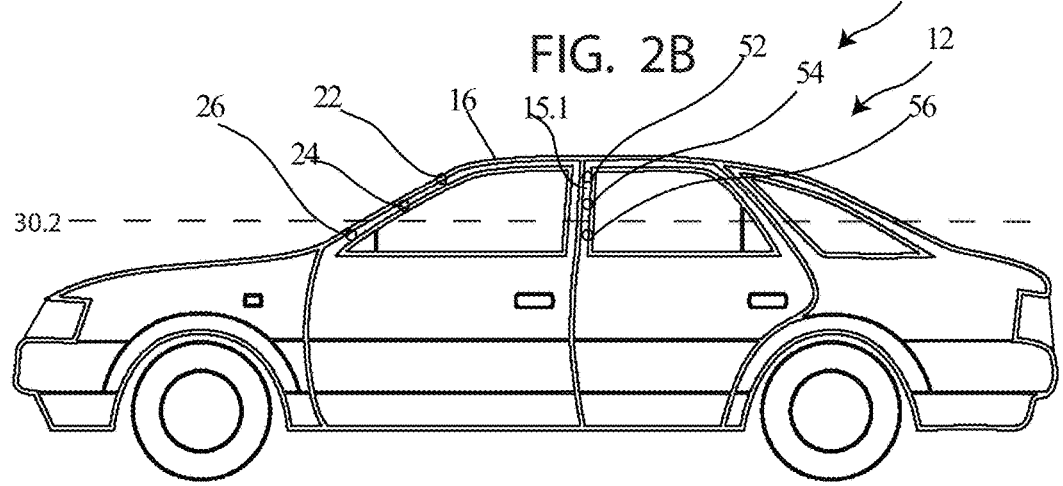
FIG. 2B is a side view of the embodiment shown in FIG. 2A.

FIG. 2B is a side view of the embodiment shown in FIG. 2A. This view shows the exterior view. This exterior view shows additional cameras 52, 54, and 56 which are coupled to support 15.1 while as shown screen or display 40 is coupled to support 15.2. Cameras 52, 54, and 56 are in communication with an associated screen such as screen 40 shown on an associated support such as support 15.1. Thus, the screen is located just inside of the cameras. This view also shows a bisecting line 30.2 on FIG. 2B which extends substantially horizontally and which forms a bisecting line bisecting the auto so that a bottom half is shown below the bisecting line and a top half is shown above the bisecting line. Thus, the cameras and associated displays are shown in a top half of the auto. For example, cameras 22, 24, and 26 and the associated display are shown in the top front section of the auto to cover blind spots in the top front viewing region of the auto.

Figure 2C:
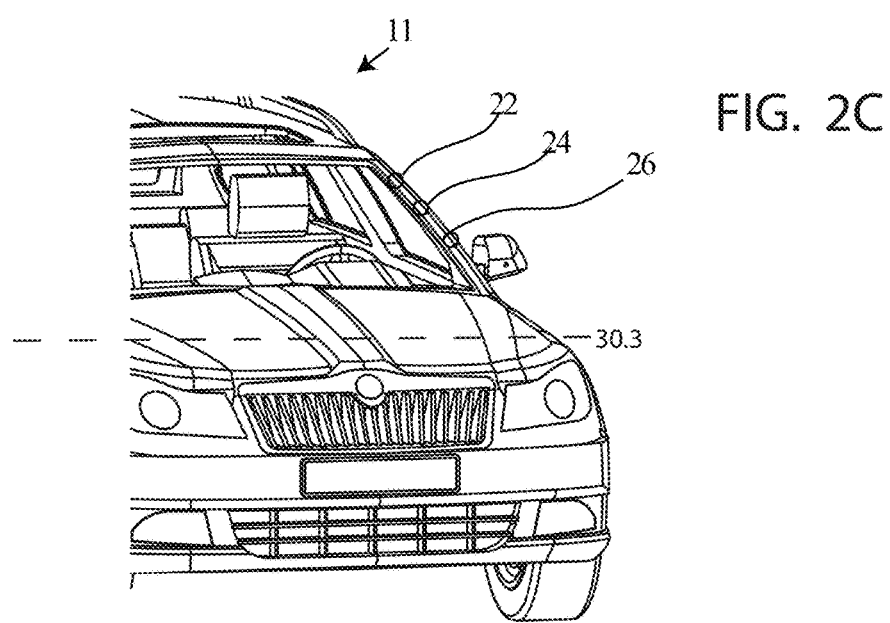
FIG. 2C is a front view of the embodiment shown in FIG. 2A.

FIG. 2C shows a front view of the auto of the embodiment 11 which shows cameras 22, 24, and 26 on support 14.1 while cameras 32, 34, and 36 are positioned on support 14.2. This view shows a bisecting line 30.3 which bisects the auto and extends in a substantially horizontal plane. Thus above this line 30.3 is a top half of the auto and below this line is a bottom half of the auto.

Figure 3A:
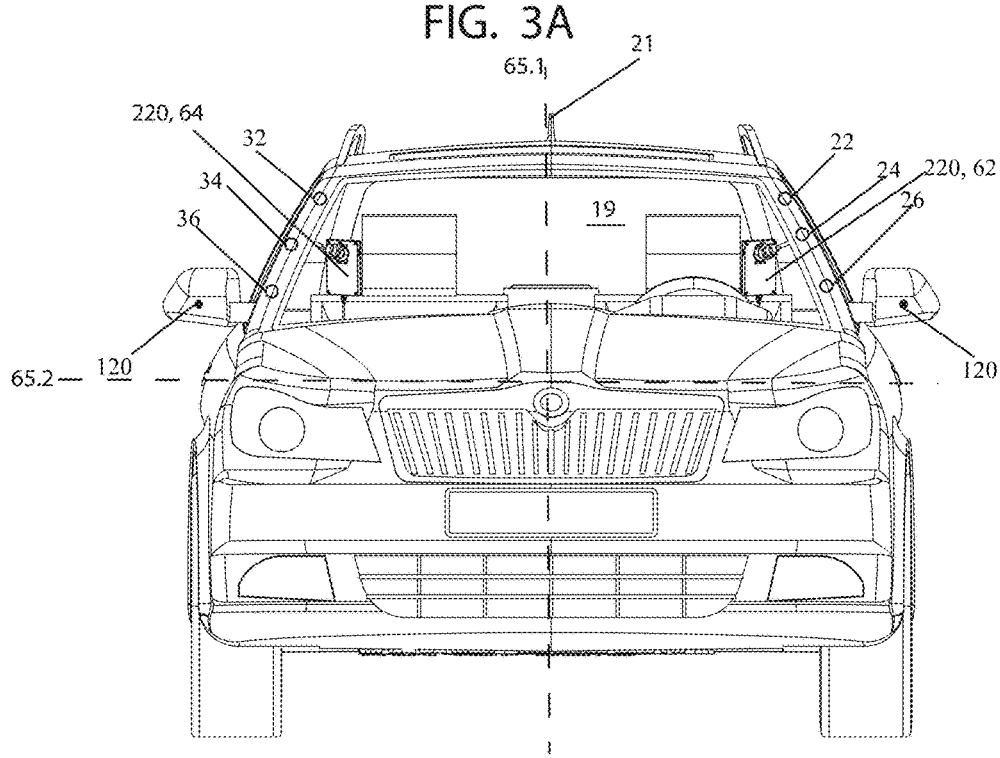
FIG. 3A is a front view of an auto of the embodiment of either FIG. 1A or FIG. 2A.

FIG. 3A is an inside view of an auto of the embodiment of either FIG. 1 A or FIG. 2A. In this view, it shows a video screen 62, or screen 220 (See FIG. 22) positioned on the inside surface of support 14.1 (See FIG. 1B). This screen is in communication with associated cameras 22, 24, and 26 as well as camera 120 positioned on the side view mirror on that side of the car. Screen 64, or 220 is coupled to support 14.2. Screen 64 is associated with cameras 32, 34, and 36 as well as camera 120 on the side view mirror of that side of the car. In this view there is shown dashed dotted lines 65.1 and 65.2. Dashed line 65.1 bisects the auto in the middle with a vertical line and divides the auto into a right half and a left half from this perspective. Thus, the screens 62 and 64 are positioned on both the right half and the left half of the auto and generally or substantially on the top half of the auto along the supports 14.1 and 14.2 and adjacent to the windshield 19.

Figure 3B:
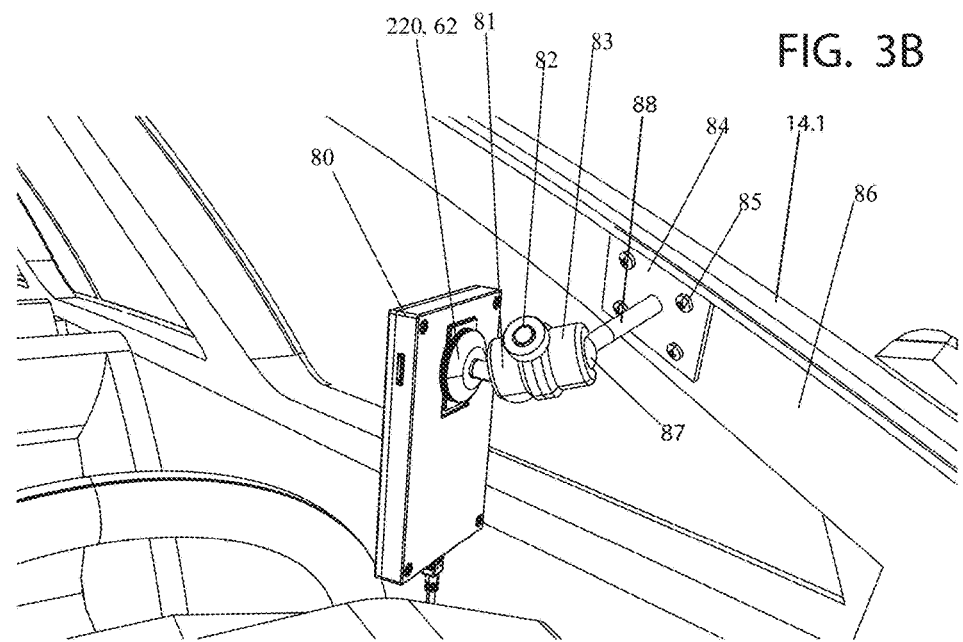
FIG. 3B is a front inside view of another embodiment.

FIG. 3B shows a front inside view of at least one screen 62, or 220, with a housing 80. There is also at least one first adjustment mechanism 81, a turn screw 82 for tightening and fixing the screen in place. The turn screw 82 fixes the housing section 83 around ball joint 87. Ball joint 87 is coupled to shaft 88. Shaft 88 is coupled to plate 84. Plate 84 is coupled to inside frame 86 via screws. Thus, with this embodiment, the screen system is coupled to inside section 86 of frame 14.1 so that this adjustable section makes the screen 62 adjustable in movement. This adjustable omnidirectional system is similar to that shown in FIGS. 11-13 as well.

FIG. 4A is an inside view of an auto of the embodiment of either FIG. 1 A or FIG. 2A. This view shows screens 62 and 64 associated with respective cameras 22, 24, and 26, or cameras 32, 34, and 36. Screens 62 and 64 are similar to screens 220 and are coupled to the auto adjacent to supports 14.1 and 14.2. This view also shows the screens positioned on either side of bisecting line 65.1 in generally the top half of the auto.

FIG. 4B shows an inside view of an auto of the embodiment of FIG. 1 A or FIG. 2A. In this view, there is bisecting line 65.1 as well as bisecting line 65.2. Bisecting line 65.1. Bisecting line 65.1 is substantially vertical while bisecting line 65.2 is substantially horizontal. On either side of bisecting line 65.1 are screens such as screens 72 or 74 which can be positioned inside of frames 14.1 and 14.2 and be used to display images from a camera. These images can be even three dimensional images created by multiple cameras such as cameras 22, 24, 26, 32, 34, 36, or cameras 100 or 120 which can be used to present an image that has depth and also be used to provide the user with an ability to judge the distance that a pedestrian or an automobile may be positioned from the automobile.

Figure 5:
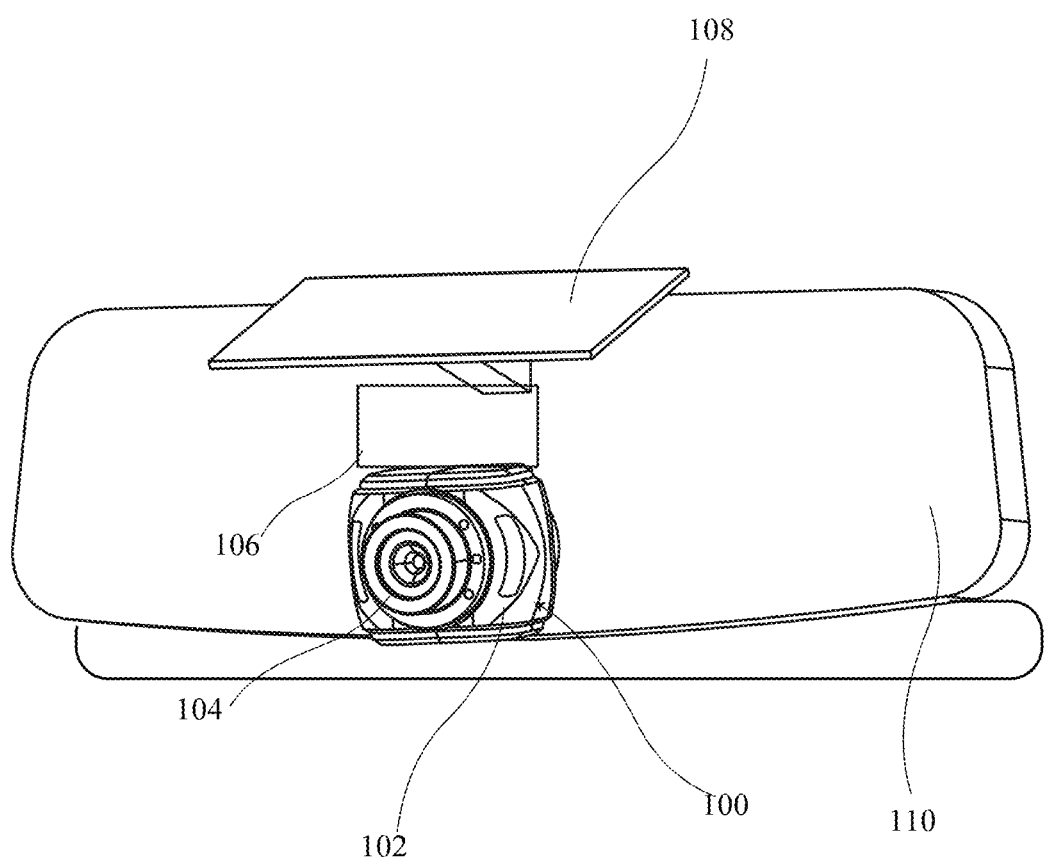
FIG. 5 is a view of an embodiment coupled to a rear view mirror.
Figure 6:
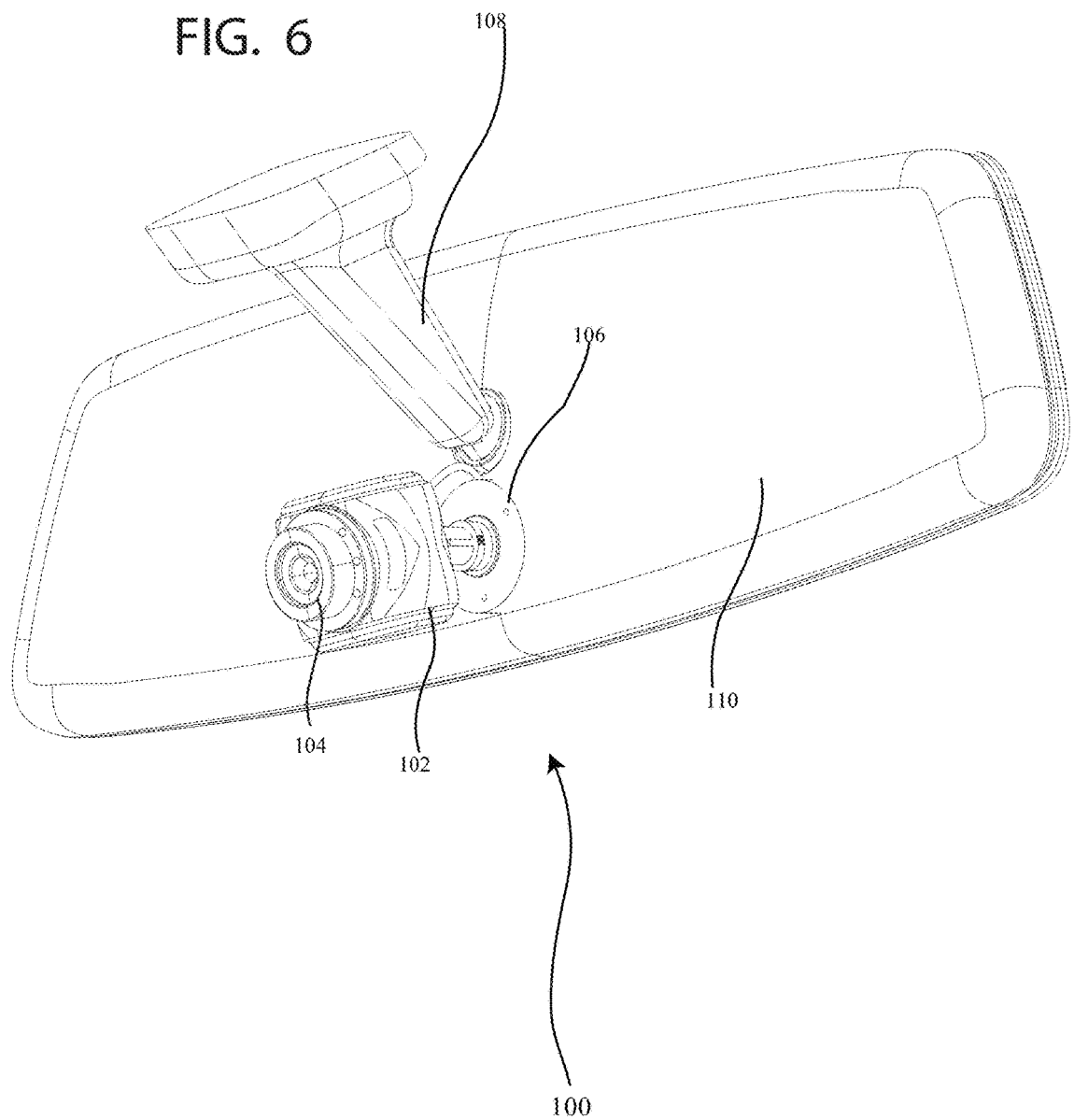
FIG. 6 is another view of the embodiment coupled to the rear view mirror.
Figure 7:
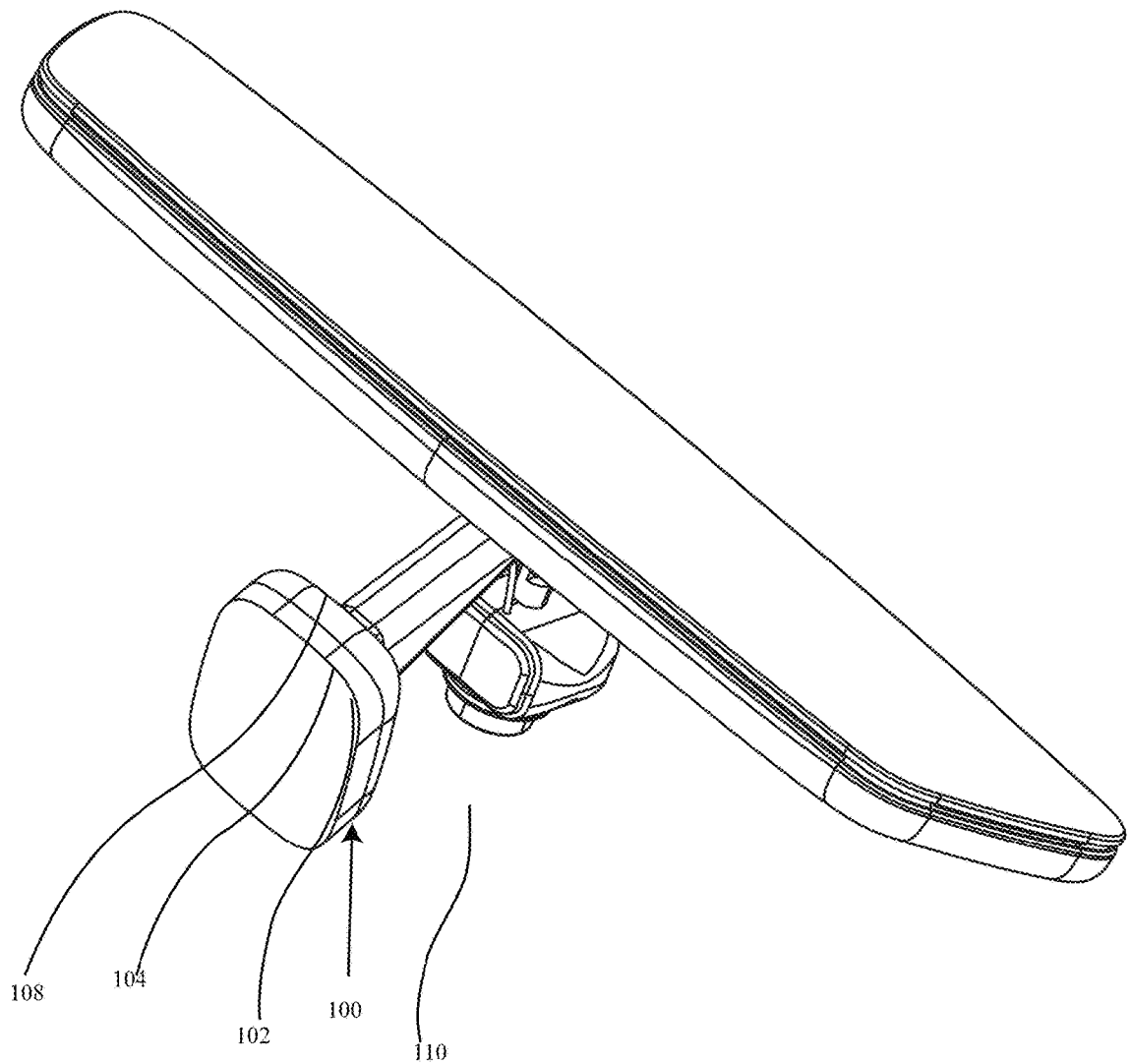
FIG. 7 is a side view of the embodiment of FIG. 5.

FIG. 5 is a side perspective view of a camera mounted on a rearview mirror. For example, there is a camera system 100, which includes a camera body 102, and a lens section 104 the camera body 102 is coupled to a bracket such as a support bracket 106. Bracket 106 is coupled to a mounting body 108. Body 108 is coupled to rearview mirror 110. Mounting body 108 can be coupled to a windshield or windscreen. In this way, camera 100, including camera body 102 can be positioned in front of rearview mirror 110 so that the user has blind spot recordability and visibility of this rearview mirror. FIGS. 6 and 7 show alternate views as well.

Figure 8:
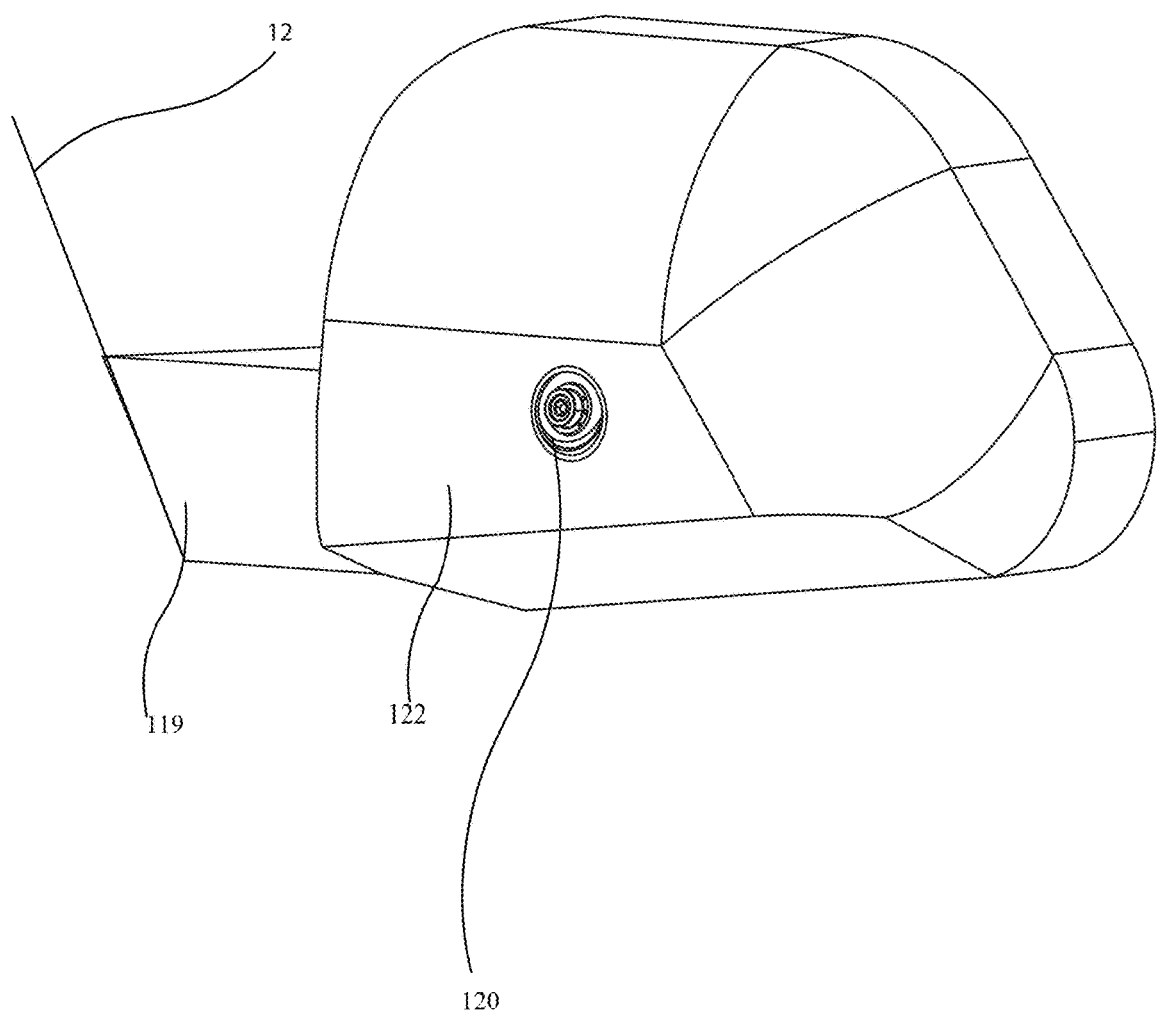
FIG. 8 is a view of a side view mirror with a camera on it.

FIG. 8 is a front view of a side view mirror 122 side view mirror 122 includes a camera 120. A cable such as cable or line 254 (See FIG. 19) can be fed along arm 119 into the body of the automobile 12. The cable can then be coupled into the vehicle's electrical system as well as into the screens such as screens 62, 64, 72, 74, 220, or 249.

FIG. 9 shows a side exploded view of this camera 120. Cameras such as camera 120 can be placed in any region. For example, side view mirror 122 includes a mounting surface which is configured to receive mounting flange 121. This camera 120 can be positioned so that it is adjustable in angle and orientation. Coupled to mounting flange 121 is a lens body 123. A lens cover 126 is configured to cover over lens body 123. Lens cover 126 includes a lens flange 125, and lens cover section 127. Lens cover 126 is configured to cover over the camera, and protect it from the environment.

FIG. 10A shows an alternate view of the side view mirror. For example, side view mirror 122 includes camera 120, wherein side view mirror 122 is coupled to arm 119, which is coupled to automobile body 18. A cable or line can feed from body 18 through arm 119 to camera 120 from the electrical and communications system of the auto.

Figure 10B:
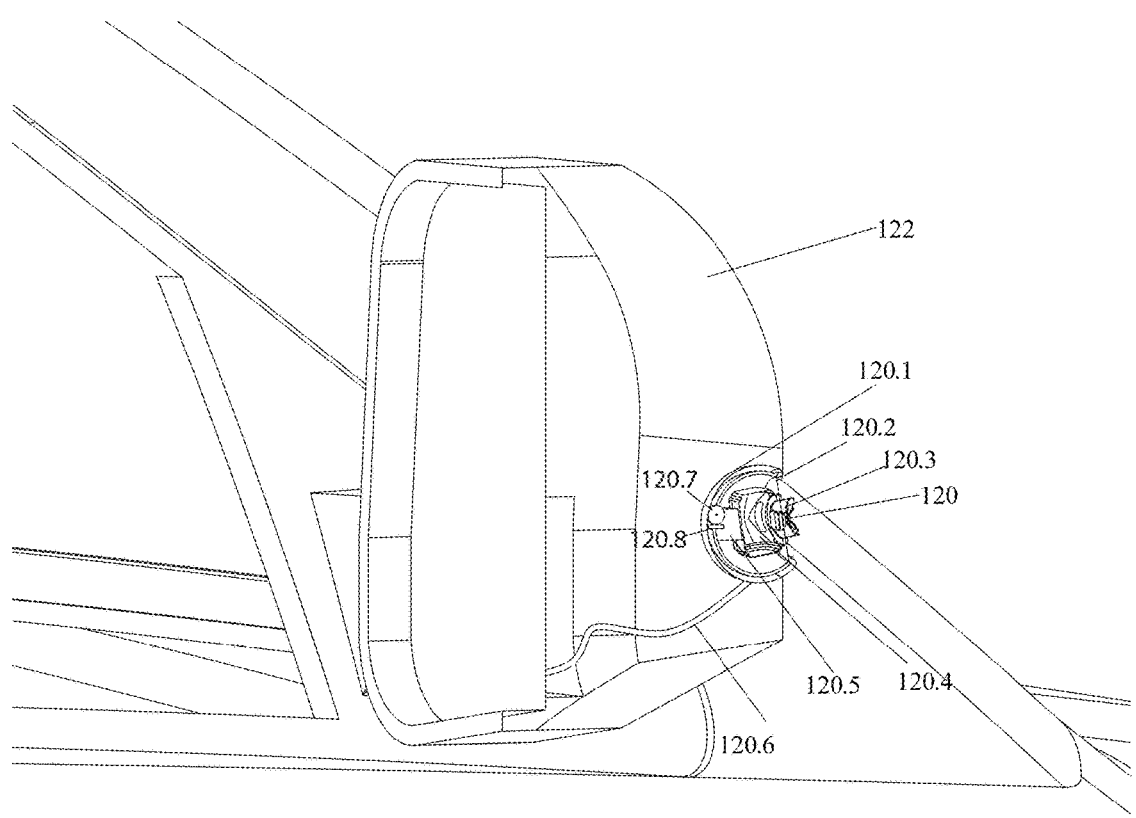
FIG. 10B is a side cross-sectional view of a mirror.

FIG. 10B shows a side cross-sectional view of a camera system for a side view mirror 122. This view shows an inner shell 120.2 disposed inside of an outer shell 120.1. Inner shell 120.2 rotates within outer shell 120.1. There is a camera body 120.4 coupled to a lens section 120.3. A drive motor 120.5 is coupled to the camera body 120.4. Wheels 120.7 and 120.8 are coupled to drive motor 120.5 and are used to selectively drive the angle of vision or attack, i.e. the direction of the camera lens 120.3 to a particular direction. Drive motor 120.5 is driven by cable 120.6. Cable 120.6 is powered by a battery or electrical system within the automobile.

Figure 11:
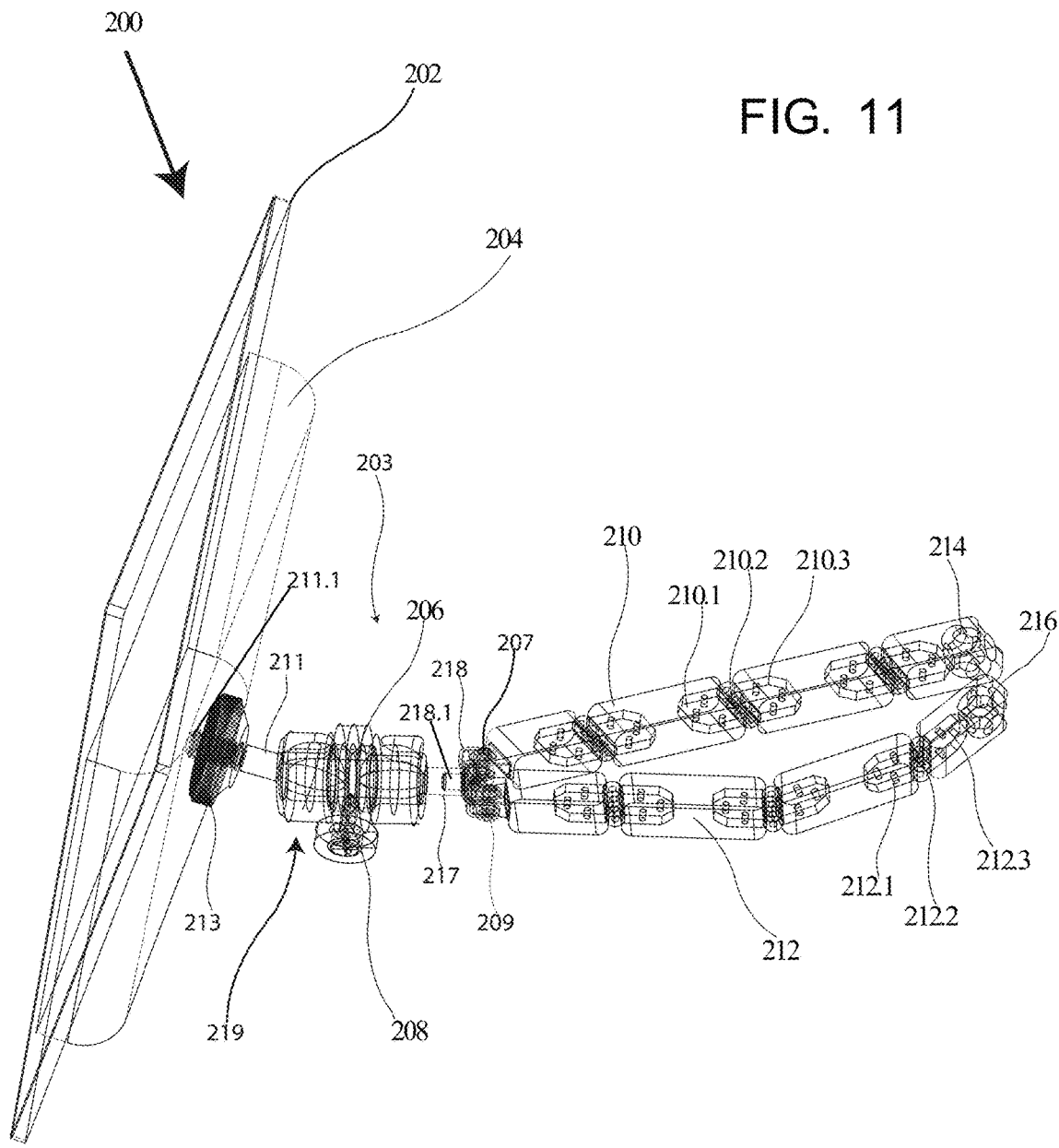
FIG. 11 is a side view of the screen with arms.

FIG. 11 is a side perspective view of a screen system 200. Screen system 200 includes a front screen 202, a screen body 204 coupled to the front screen 202. Coupled to screen body 204 is a bracket such as a support bracket comprising of at least a screw adjuster 213. Screw adjuster 213 is configured to be screwed into the backend of screen body 204. Screen body 204 is configured to hold the electronic components of the screen.

Screw adjuster 213 includes is threaded screw end 211.1. Coupled to screw adjuster 213 is an adjustable mounting arm 203. Adjustable mounting arm 203 includes an adjustable section 219, which includes a clamp body section 206, a clamp arm 208.1, a first end 211, and a second end 217. Second end 217 extends towards arms 210 and 212. Coupled between arms 210 and 212 and second end 217 is rotatable T connection 218. Rotatable T connection 218 includes screws or couplings 207 and 209. Arm, 210 is coupled to rotatable T connection 218 via screws or couplings 207. Arm 212 is coupled to rotatable T connection 218 via screw or coupling 209. Rotatable T connection 218 can be selectively secured via a screw such the T clamp screw 218.1. This screen system can be used in place of any of the screen systems mentioned herein such that these arms can wrap around supports 14.1 or 14.2 or 15.1 or 15.1. The screen can then be selectively coupled to a camera such as any one of the cameras mentioned herein such as cameras 22, 24, 26, 32, 34, 36, 52, 54, 56, 100, 120, 250, 390, 580.

Arm 210 includes a plurality of different sections, wherein each section is coupled together via a hinge. For example, there are hinge flanges 210.1 and 210.3 coupled to each other via an intermediate hinge section 210.2. These hinges allow for a flexible rotatable multidimensional arm which can then be wrapped around a column, a post or any other body support section of an automobile. In addition, arm 212 includes hinge connectors 212.1, and 212.3, which comprise flanges, and a hinge section 212.2. Positioned at the end of arm 212 are openings 216. In addition, position at the end of arm 210 is opening 214. Openings 216 and 214 are configured to be wrapped around and coupled to a post or body section of a moving vehicle such as an airplane a boat, a motor vehicle or any other device. These openings allow the screws to be screwed into a column or body of an automobile.

Figure 12:
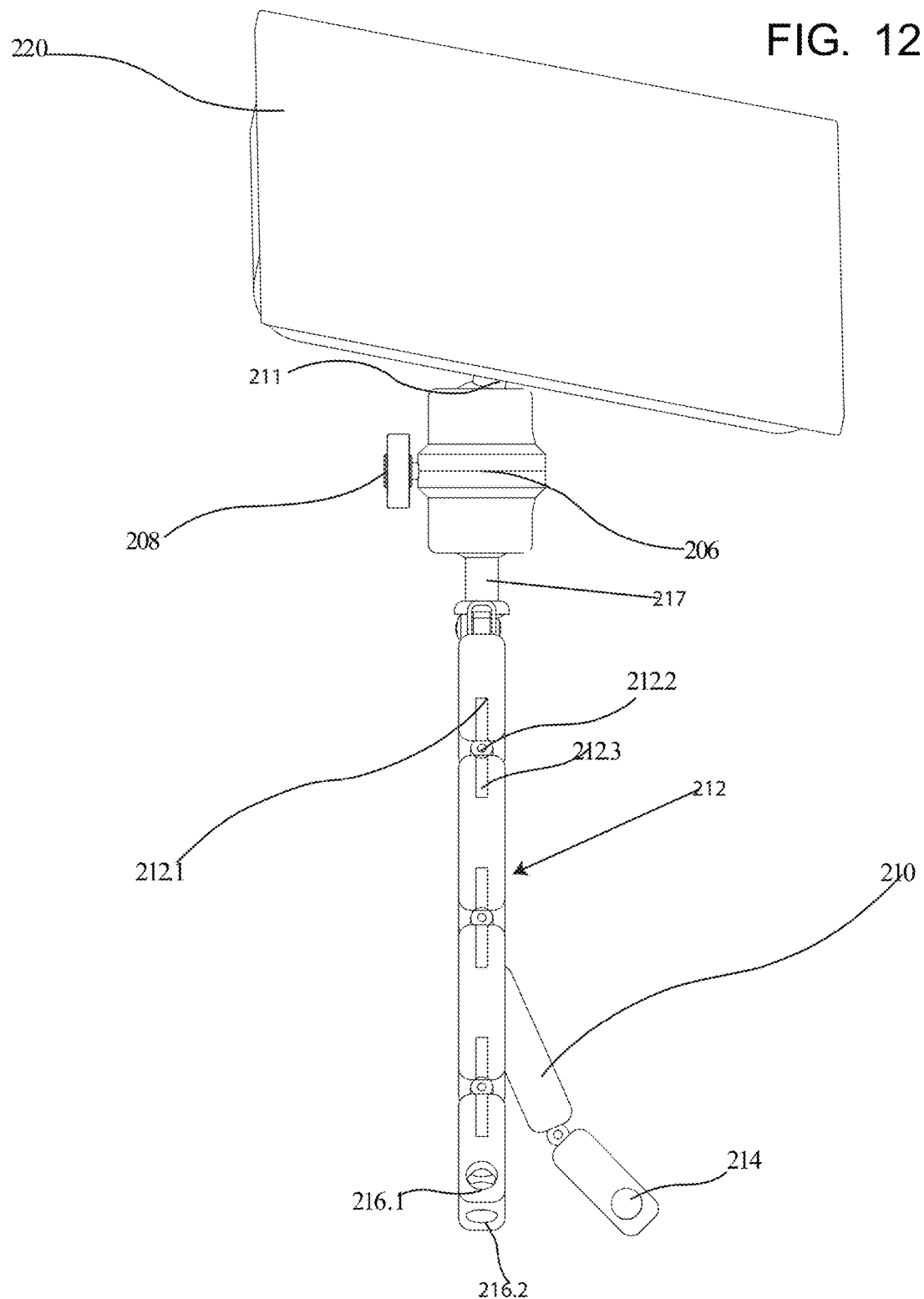
FIG. 12 is a front perspective view of the screen of FIG. 11.

FIG. 12 shows the upright view of this device showing a front view of screen 200 as well as openings 216.1 and 216.2 which are configured to receive a fastener. In addition, opening 214 can be inserted between openings 216.1 and 216.2 to tie the ends together.

Figure 13:
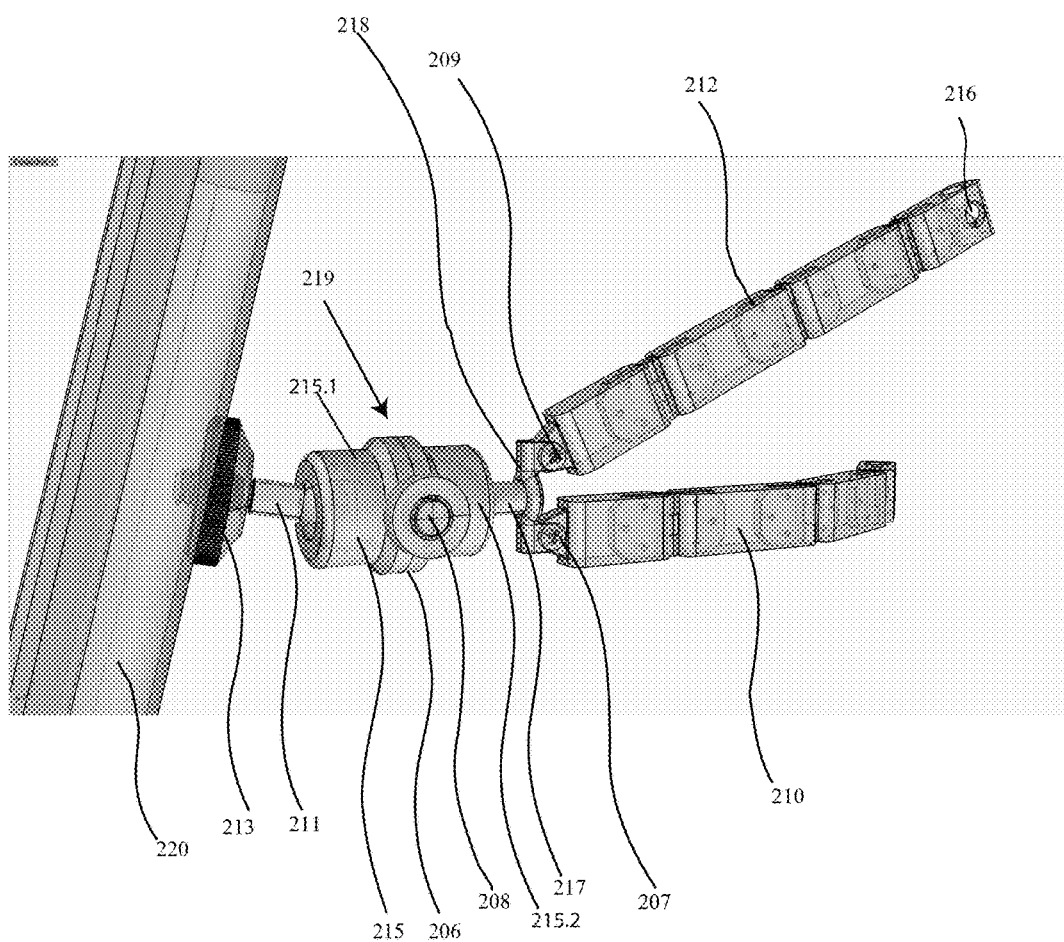
FIG. 13 is a side view of the screen of FIG. 11.

FIG. 13 shows the adjustable section 219. Adjustable section 219 includes a body 215 which includes a first body part 215.1 and second body part 215.2. In addition, there is also a clamp body section 206 and clamp arm 208.

Figure 14:
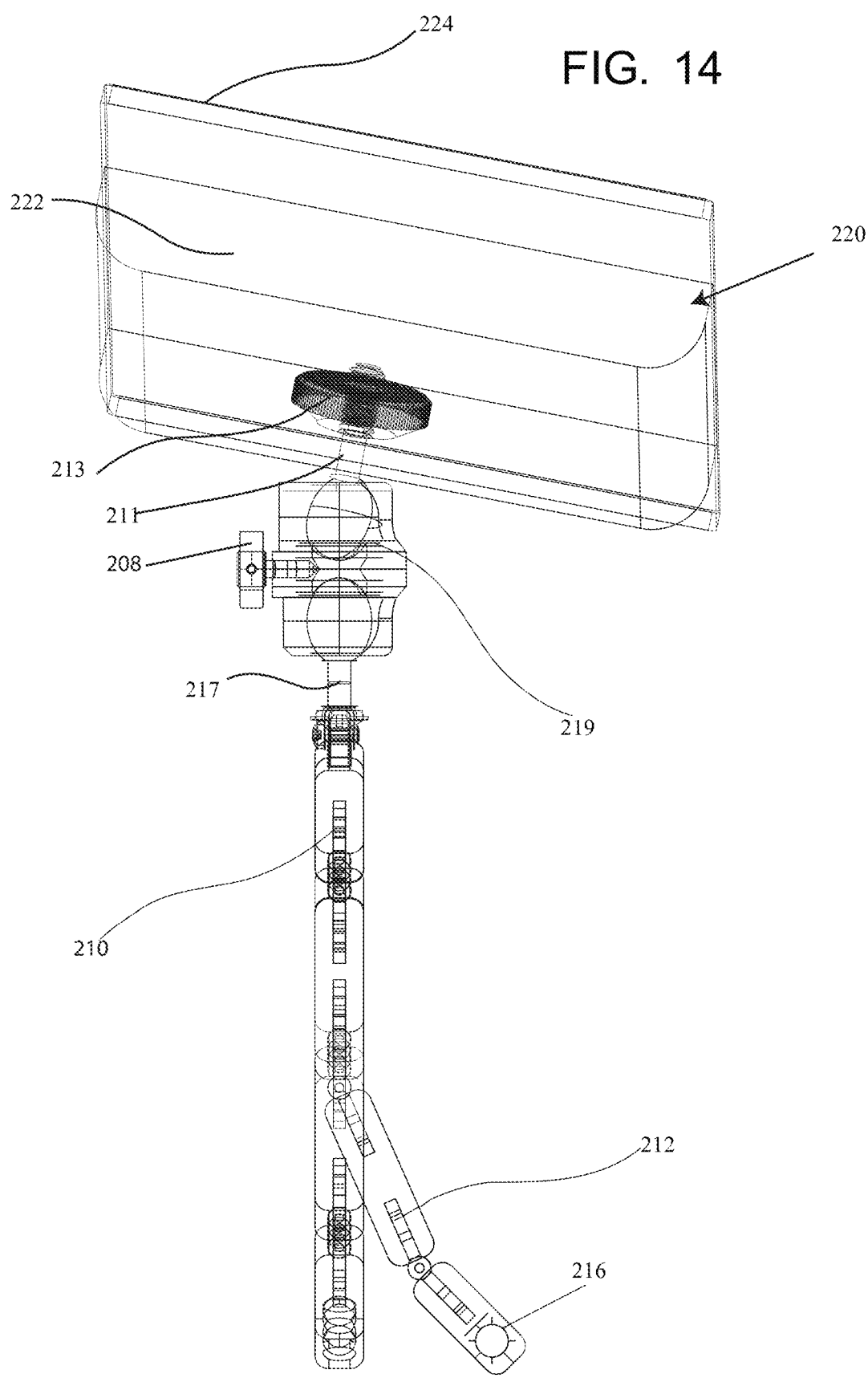
FIG. 14 is a back view of the screen of FIG. 11.
Figure 15:
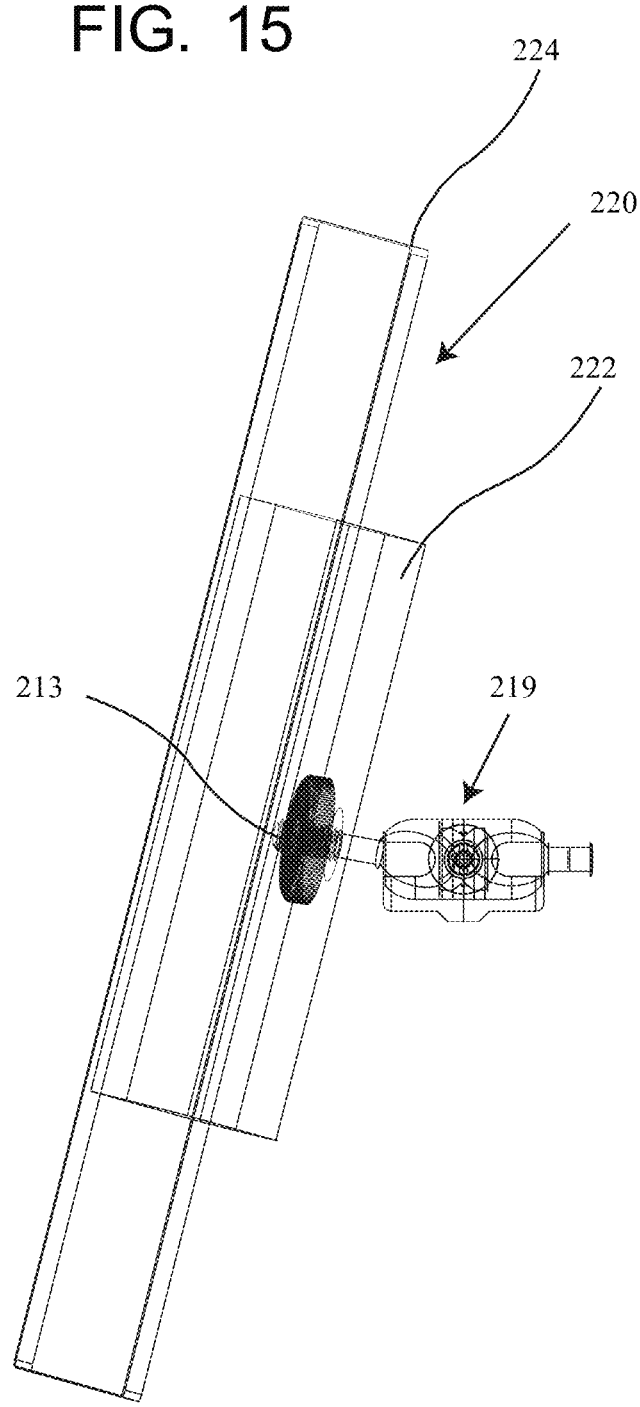
FIG. 15 is a side view of a portion of the device of FIG. 11.

FIG. 14 shows a side transparent view of this adjustable section 219. FIG. 15 also shows the side transparent view as well.

FIGS. 16A-16F show adjustable body section 219, which includes clamp 208, and clamp arm 208.1. When clamp 208 is rotated in a predetermined manner it drives clamp arm 208.1 into clamp body section 206. FIGS. 16B through 16E show different views of adjustable section 219 with first body part 215.1 and second body part 215.2 removed. As shown in these views, there are a plurality of ball joints 236, and 238, positioned within a clamp seat 237. As clamp arm 208.1 is driven into clamp seat, 237, it exerts pressure on ball joints 238, and or 236 which one position within first body part 215.1, and second body part 215.2, respectively. This clamps the ball joint in a fixed position. Essentially, because there are two ball joints which are movable within the ball seat 237 creating a multidimensional, easily adjustable device which allows for positioning of the screen to almost any angle and in nearly any position. This omnidirectional double ball joint system is similar to that shown in FIG. 3B.

Figure 17:
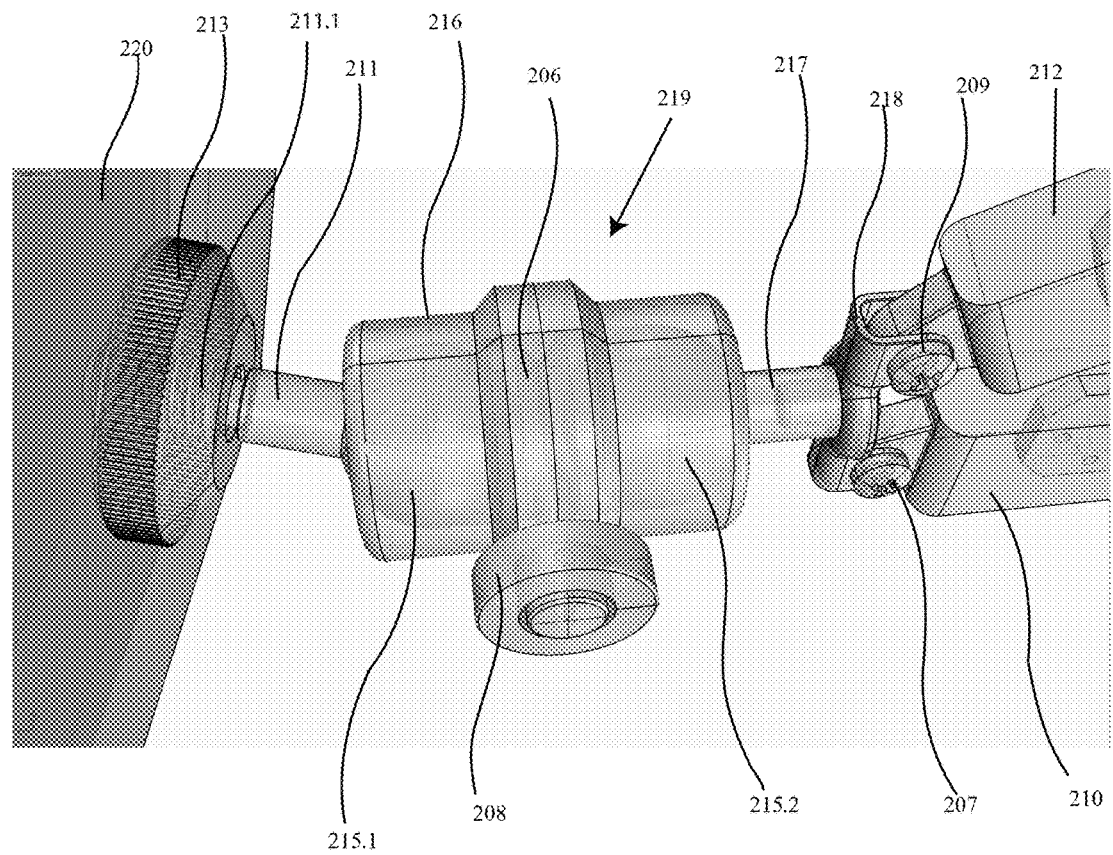
FIG. 17 shows a side view of the adjustable connector in a see-thru view.
Figure 18B:
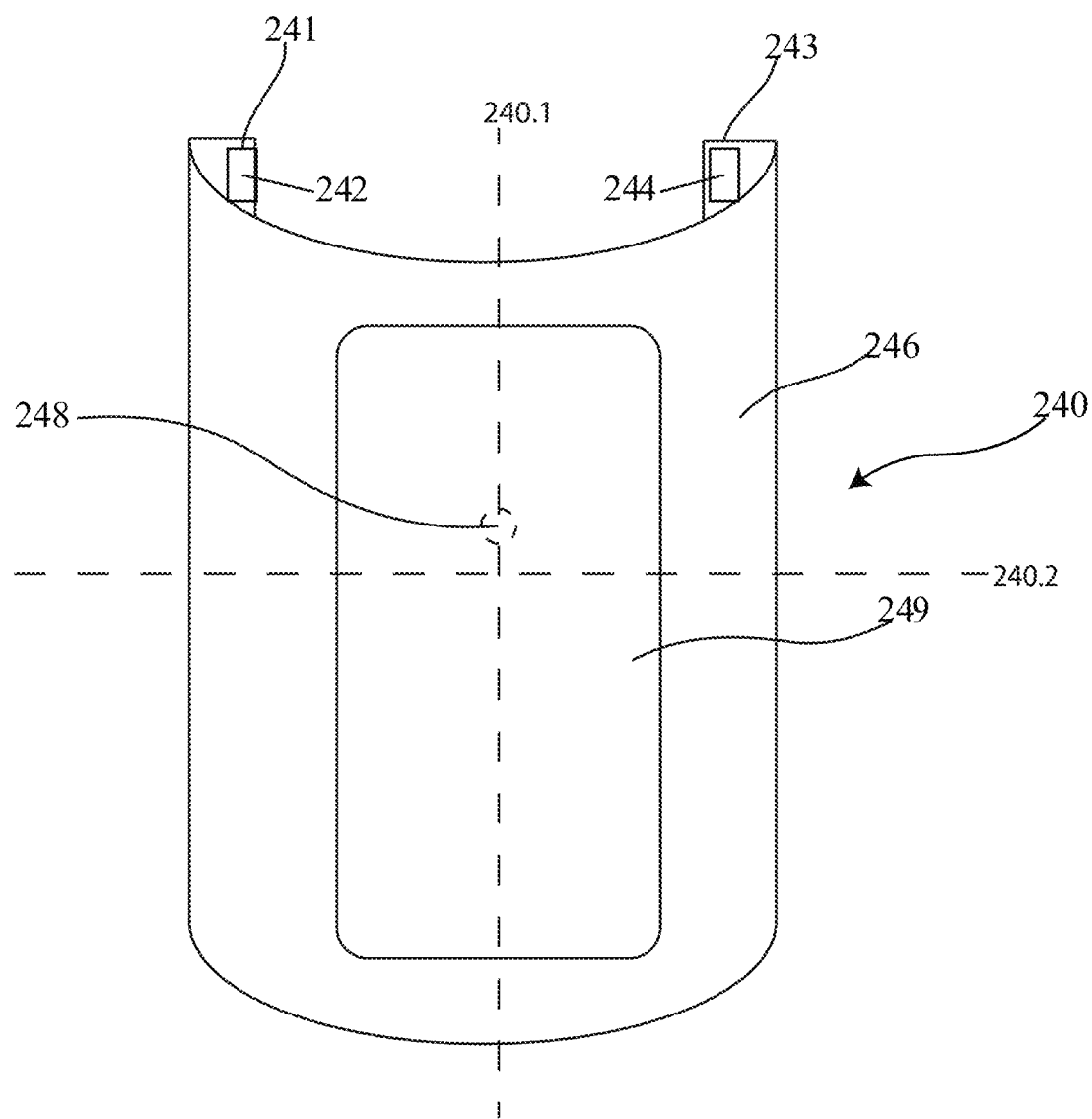
FIG. 18B is a front view of the cuff type connection of a screen.

FIG. 17 also shows a view of this adjustable section 219 in a substantially transparent view. This view shows arms 210 and 212 coupled to T connection 218. FIG. 18A discloses arms 210 and 212 which are coupled to adjustable section 219, in which are selectively fixed in place via clamp 208. In addition, as shown in this view, there is also screen body 222, and screen display 224. This view, of course, is as a back view of screen display 224. FIG. 18B is a view of a frame type attachment for a screen. This cuff type attachment includes a body section 246 which is formed from any suitable material such as metal or plastic. The body can be made so that it is at least partially or substantially flexible so that it can be expanded and then selectively snap around a semi-circular or circular column such as a support or frame in a car or plane cockpit such as supports 14.1, 14.2, 15.1 or 15.2. The body section 246 is coupled to flanges 242 and 244 which have attachment elements 242 and 244. Attachment elements or flanges 242 and 244 comprise at least one of the following: screws, fasteners, hook and loop fastener, clips, etc. Screen 249 is coupled to body section 246. In addition, a camera 248 is disposed on an opposite side of screen 249. This body section 246 is bisected via a first axis 240.1 which comprises a longitudinal axis. Longitudinal axis 240.1 bisects this body section such that screen 249 is positioned in a substantially central region. In addition, this body section is substantially C-shaped or rounded so that it can fit around vertical columns or posts. Axis 240.2 is a latitudinal axis and bisects body section 246 as well. In at least one embodiment, the extension of body section 246 is longer than the extension along the latitudinal axis. Screen 249 can be used in place of any of the other screens mentioned herein and in combination with any of the other cameras mentioned herein. When the body section 246 which is made from flexible material snaps around a column or post the flanges 241, and 243 hold the body section in place.

Figure 19:
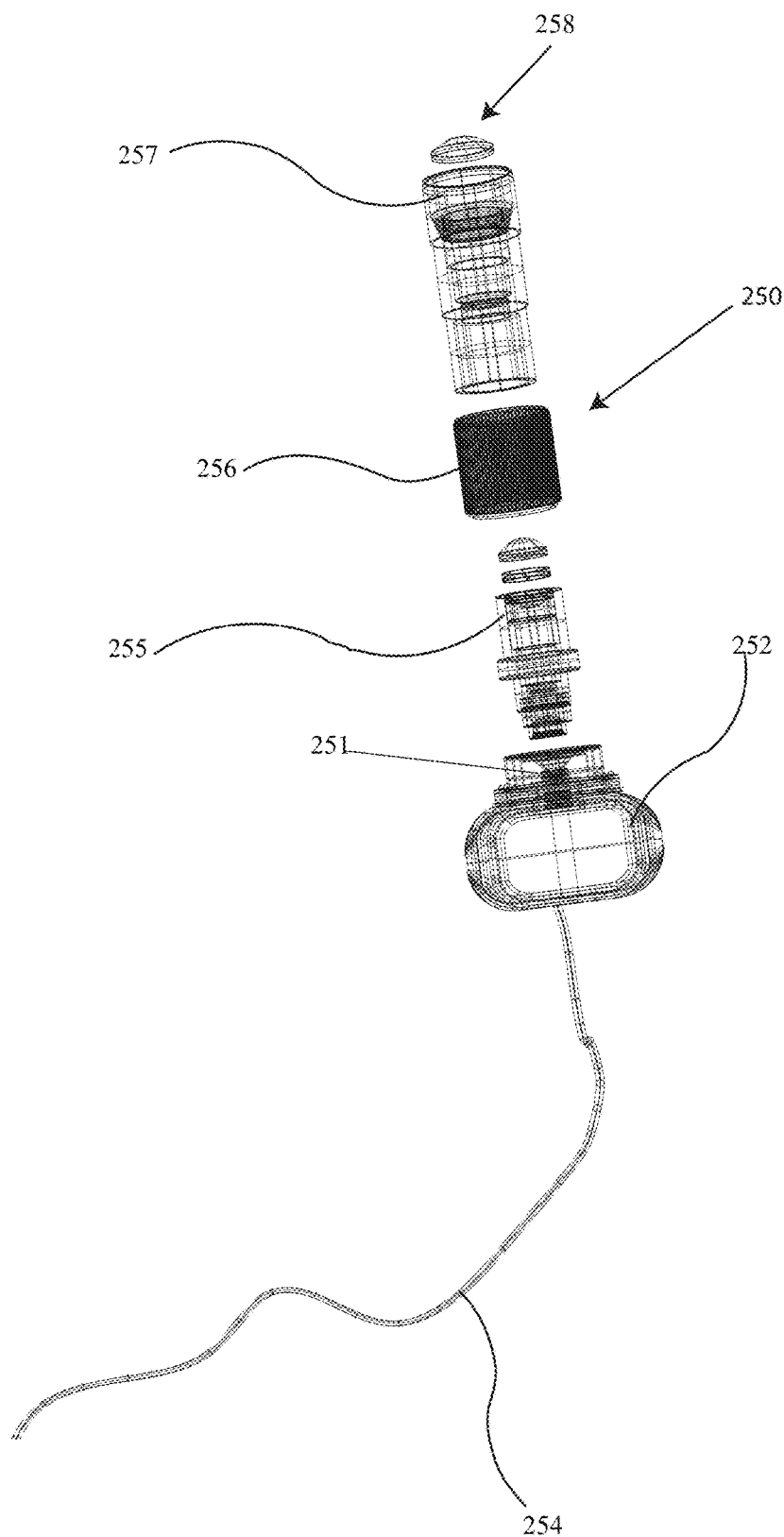
FIG. 19 is a side exploded view of a camera for use with a motor vehicle and with the screens described below.

FIG. 19 is an exploded view of a camera system 250. Camera system 250 can be coupled selectively to screen display 220. For example, in this view, there is a lens front 258, which is coupled to a second lens section 257 second lens section 257 is coupled to focal adjuster 256. Focal adjuster 256 is configured to be rotated to selectively focus the camera. In addition, there is also a first lens section 255. First lens section 255, sits in lens seat, 251. Lens seat 251 is coupled to camera body 252. Coupled to a backend of camera body is cable 254. In short, this camera system 250 includes multileveled lens sections 255 and 257. In addition, with focal adjuster 256 the camera can be focused selectively in a number of different ways. This camera can be positioned inside of the car on the rearview mirror or outside the car on the supports or on the side view mirror. Cable 254 can extend through the arm of a side view mirror. As indicated above to connect into the system components of an automobile and also to a screen such as screen 220.

Figure 20:
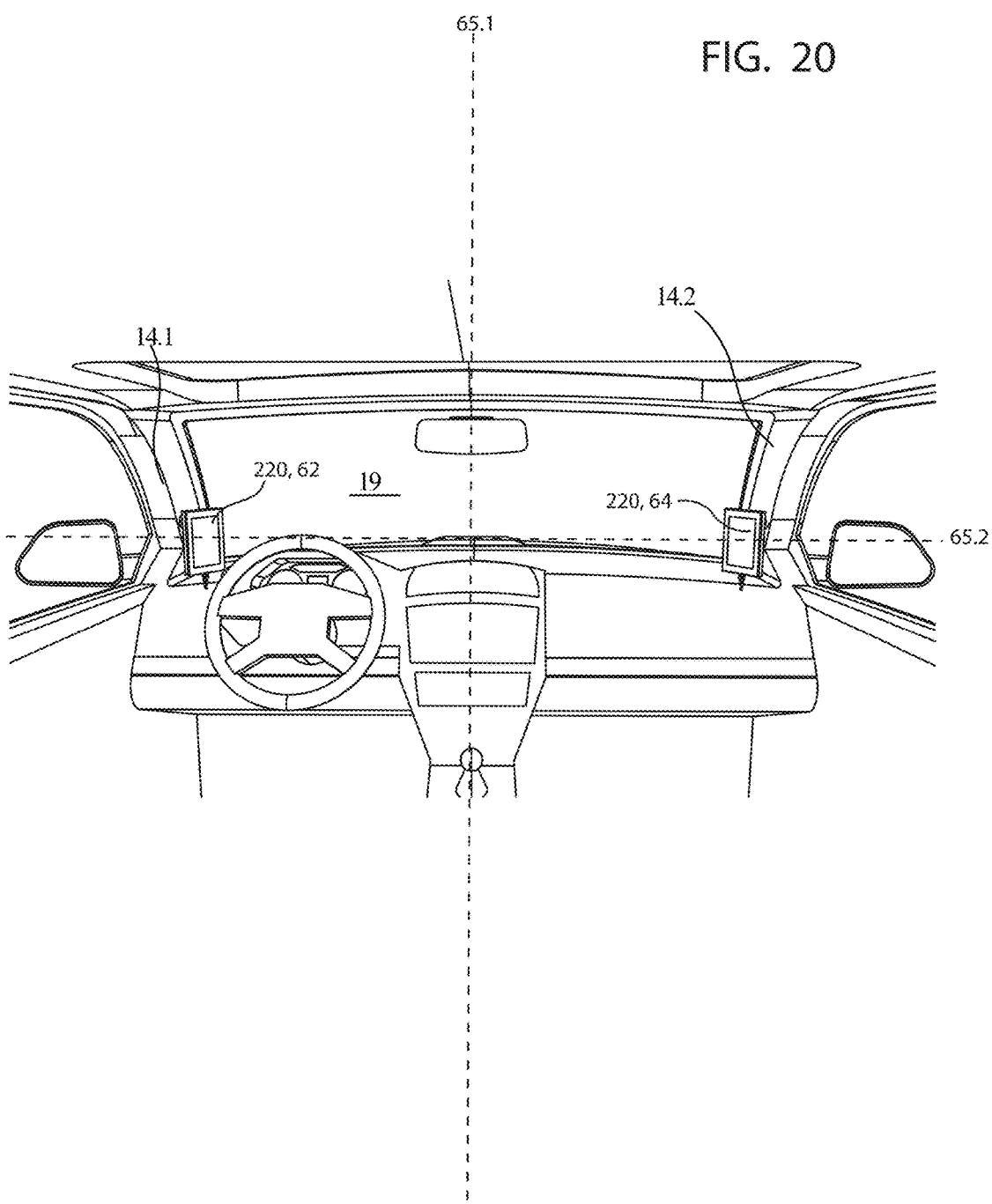
FIG. 20 is a view of an interior of an automobile having the screens installed.

FIG. 20 shows the inside of an automobile. For example, there are columns 14.1 and 14.2. Positioned along columns 14.1, 14.2 are screens 220. Screens 220 or screen 62 or 64 can be coupled to camera system 250. Alternatively, the screens can be coupled to camera 120 shown in FIG. 8.

Figure 21:
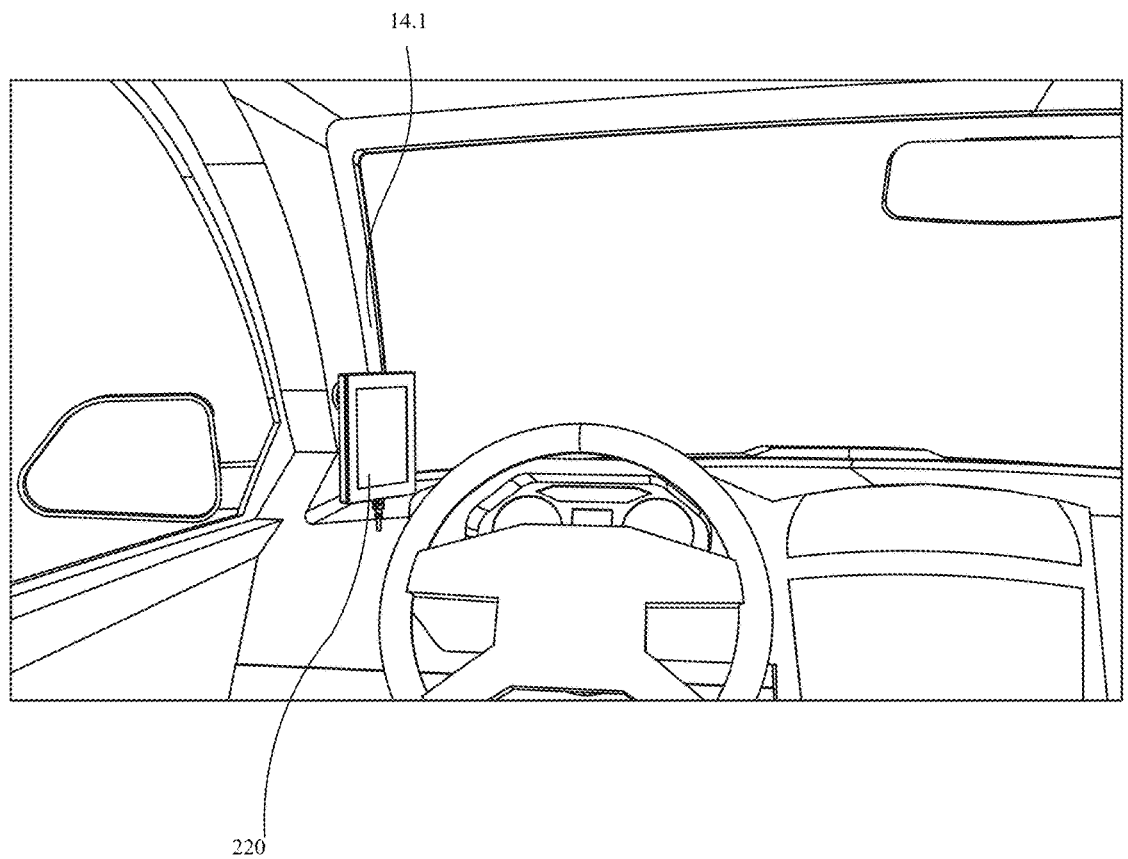
FIG. 21 is an inside view of an auto having the screens installed inside.

FIG. 21 shows the inside of an automobile which shows screen 220 positioned inside of column 14.1.

Figure 22:
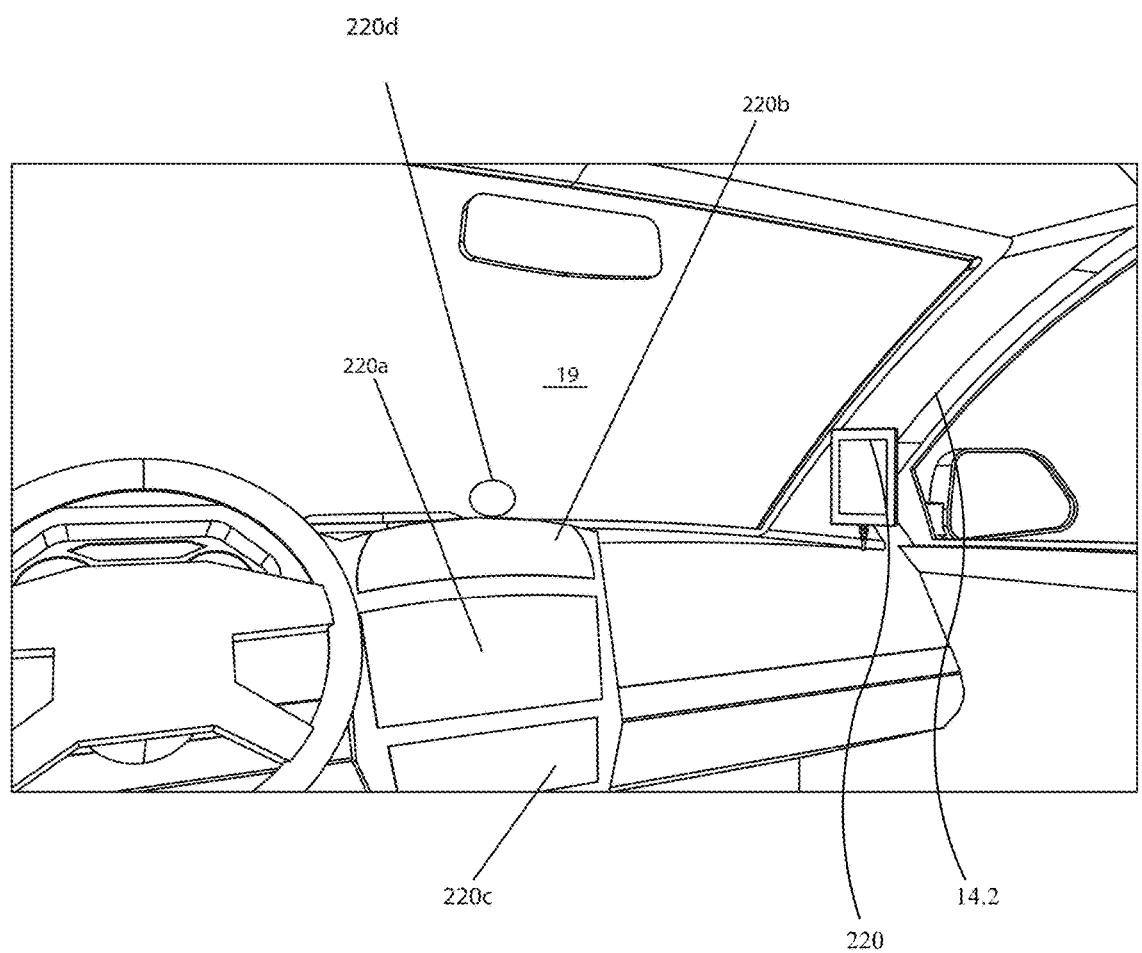
FIG. 22 is another view of an interior of an auto with the screens installed inside.

FIG. 22 shows screen 220 positioned along column 14.2. FIG. 22 also shows a screen 220a which can be used to display one of the fields of the cameras as well. Other screens 220b or 220c can also be used. Alternatively, a projector 220d can sit on the dashboard and project an image of the view of the camera onto the windshield 19 as well.

Figure 23A:
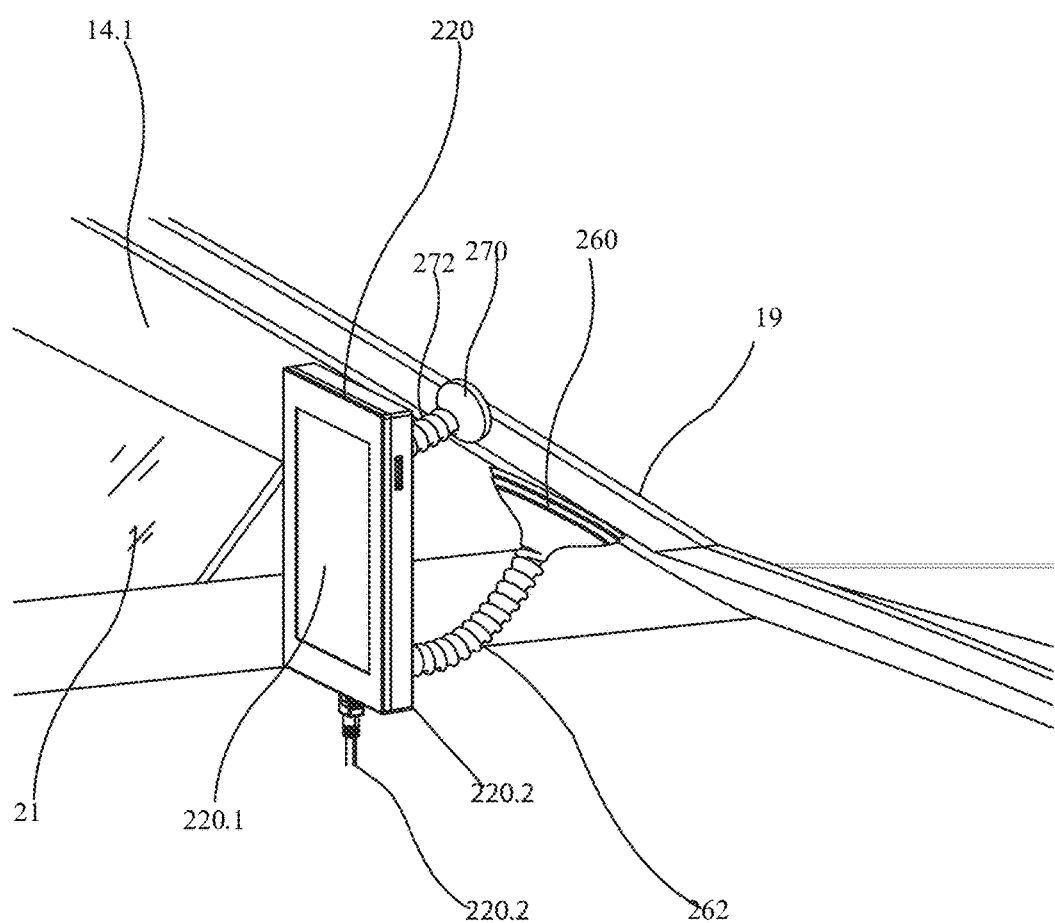
FIG. 23A is a side interior view of another embodiment.

FIG. 23A shows an inside view of another embodiment. In this view there is a screen or screen unit 220, which has a screen face 220.1. Coupled to the screen face is an arm 272 and a camera head 270. Inside of the camera head 270 is a camera which is electronically coupled to screen unit 220. In addition, coupled to the screen unit body 220.2 is an anchor 260 which is configured to anchor the screen to an auto such as to a windshield 19. Anchor 260 comprises a suction cup which can be adhered to windshield 19 via a suction force.

Arm 262 as well as arm 272 are both bendable and adjustable in an accordion-like manner by using sufficient force but are otherwise substantially rigid.

Figure 23B:
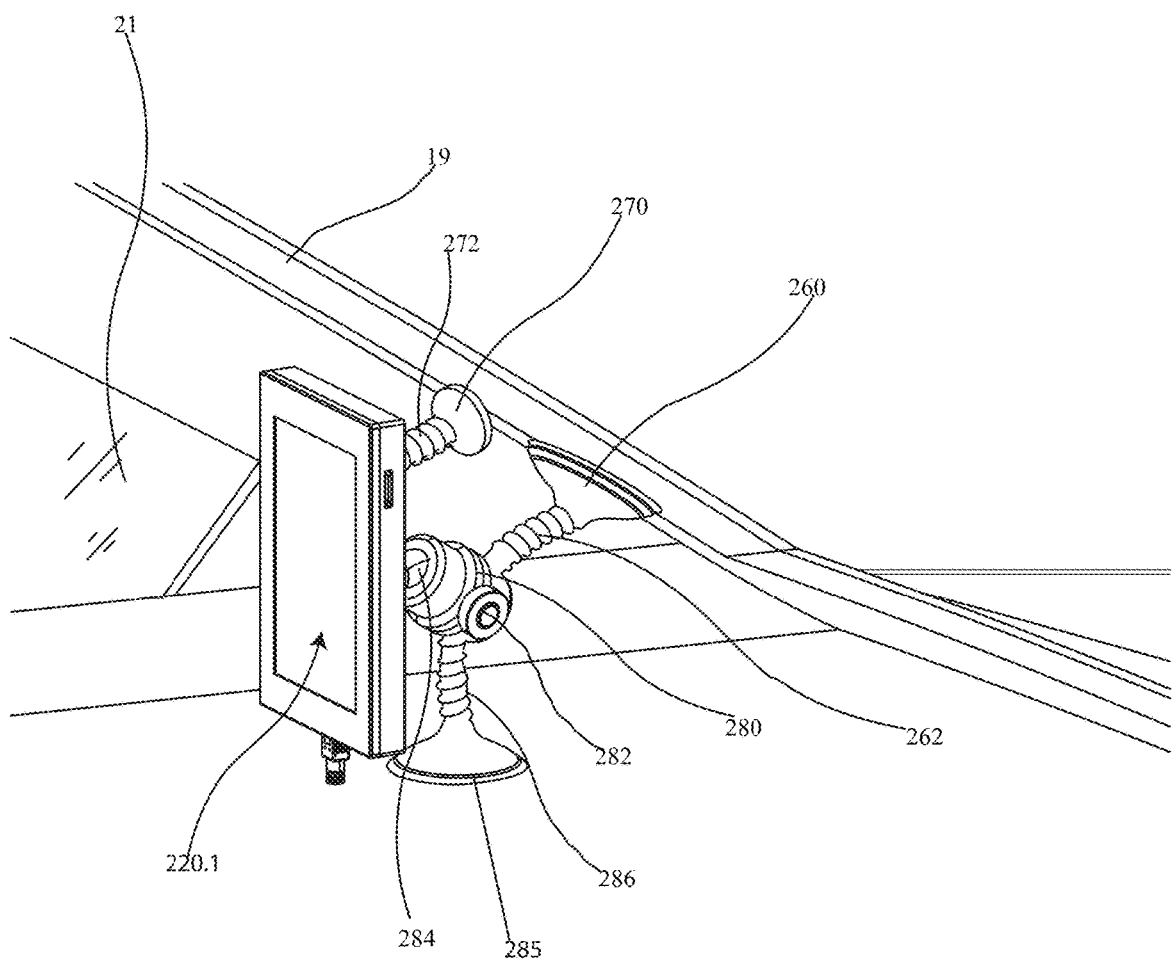
FIG. 23B is a side interior view of another embodiment.

FIG. 23B is an inside view of another embodiment which also discloses the anchor 260, the arm 262, the camera head 270, and the camera arm 272. However, in this embodiment there is an adjustment body 280 which includes a ball joint 284 disposed inside of the body 280. There is also a lock 282 which can comprise a screw lock which when loosened allows for the ball in the ball joint 284 to move and to be adjusted. When the lock 282 is tightened it locks the ball in the ball joint in place.

Figure 23C:
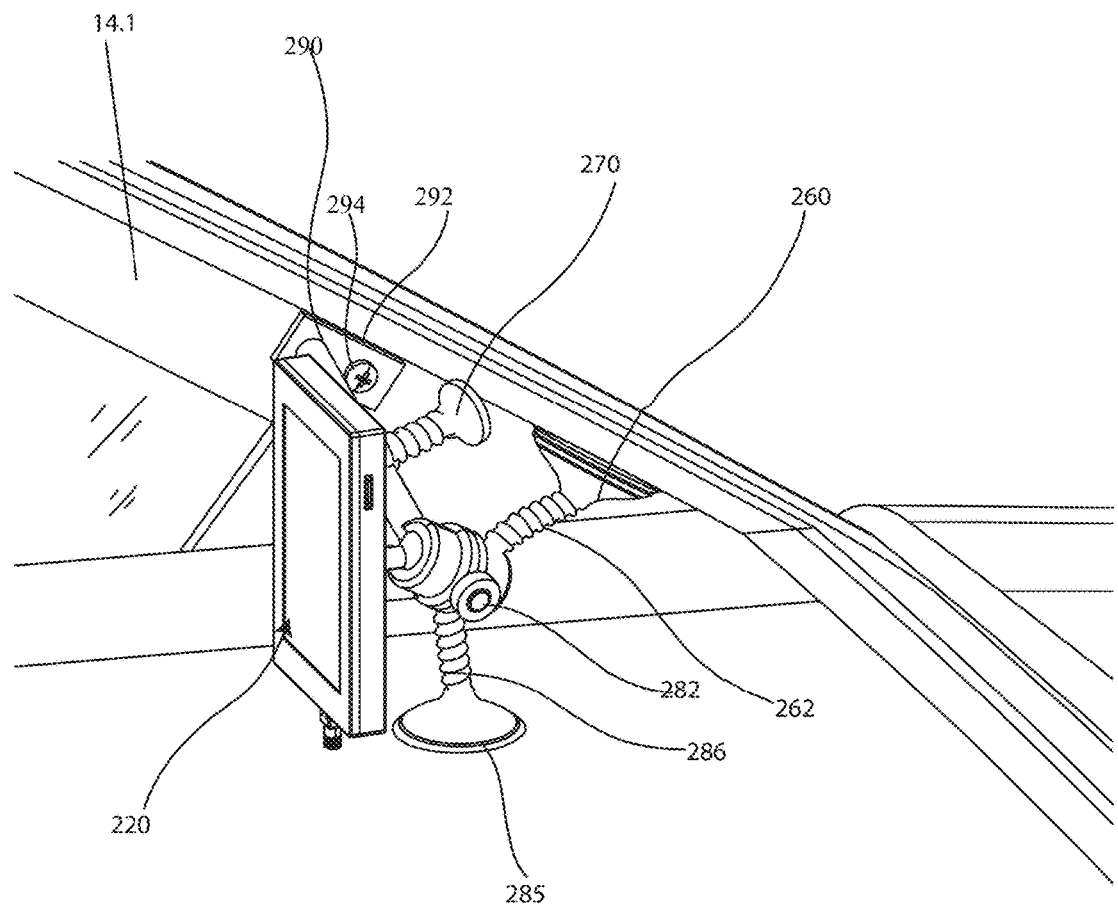
FIG. 23C is a side interior view of another embodiment.

FIG. 23C shows another embodiment which includes the features of FIG. 23B but also includes the following additional features, a post 290 and a mounting plate 292. Mounting plate 292 is configured to be mounted to a support such as support 14.1.

Figure 23D:
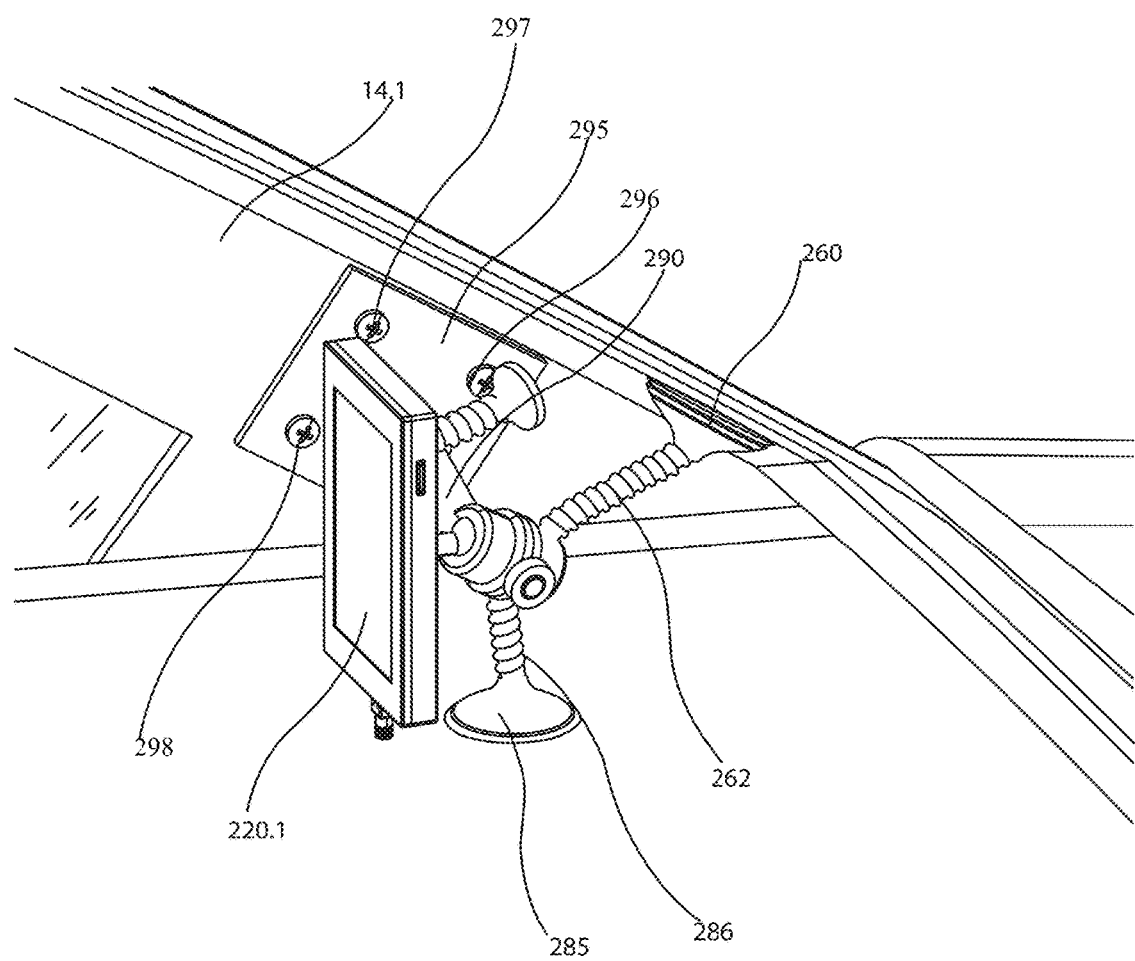
FIG. 23D is a side interior view of another embodiment.

FIG. 23D shows another embodiment which shows a mounting plate 295 which is different than mounting plate 292 in that mounting plate 295 is configured to have multiple screws such as four screws. In this view there are three screws 296, 297, and 298 shown. The mounting plate such as mounting plate 292 or 295 are configured to semi-permanently mount the screen to a car.

Anchors 285 and 260 are configured to also mount the screen and the camera to the car but in a non-destructive manner. In the embodiment shown in FIG. 23A there is only one mounting point via anchor 260. In the embodiment shown in FIG. 23B there are two mounting points shown by anchors 260 and 280. These two mounting points allow for a compressive fit for the screen mounting system between the windshield 19 and the dashboard. The embodiments 23C and 23D allow for three mounting points allowing for the compression coming from three different angles and allowing further security in mounting the screen. Thus, with these embodiments, the screen can be mounted to a car or auto in a safe and reliable manner.

Figure 24A:
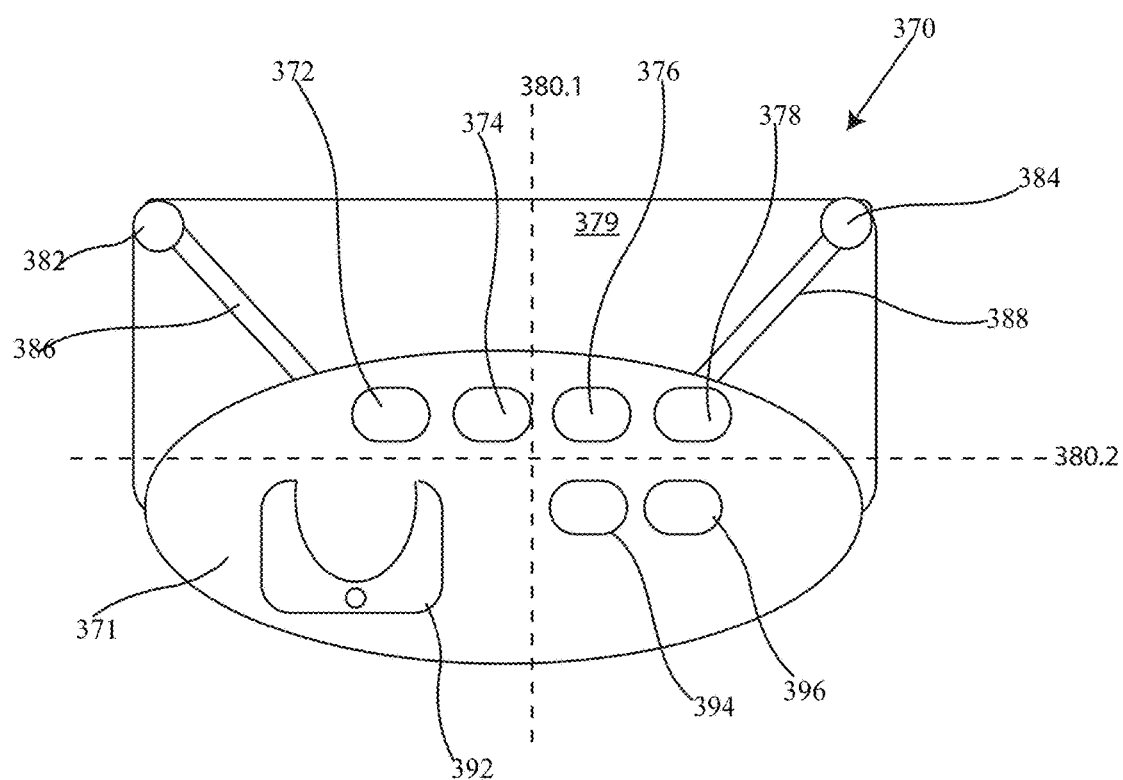
FIG. 24A is a view of a cockpit of an airplane or boat.

FIG. 24A is a view of a cockpit for a boat or a plane. In this view the cockpit design 370 includes a windshield 379, as well as screens or displays 382 and 384 mounted on supports 386 and 388 respectively. In addition, there is a front panel of a cockpit dashboard which has a steering wheel as well as a plurality of screens 372, 374, 376, 378, 394, and 396. Any one of these screens 372, 374, 378, 394, and 396 can display the information associated with cameras. In this view, there is a bisecting line 380.1 which divides the cockpit substantially longitudinally in half. Thus, on either side of the bisecting line there are screens or displays 382 and 384 coupled to these supports 386 and 388. In addition, these displays 382 and 384 are positioned in a top half of the cockpit as shown by the bisecting line 380.2 which divides the cockpit laterally into two sections.

Figure 24B:
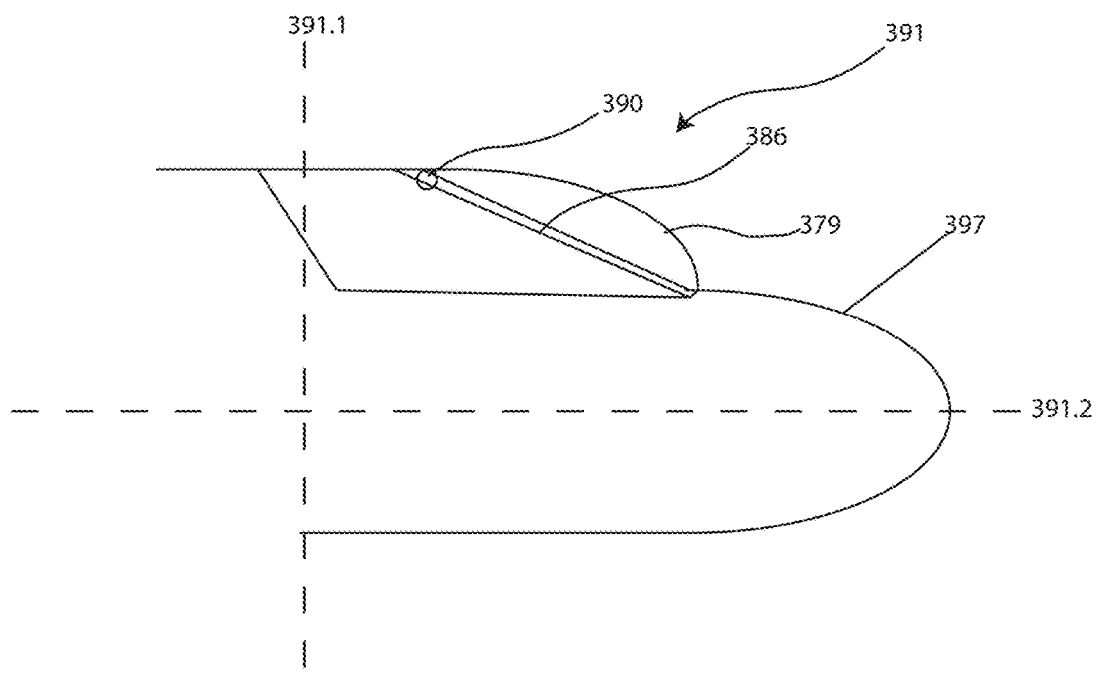
FIG. 24B is a side view of a cockpit of an airplane or boat.

FIG. 24B is a view of an outer portion of the plane 391 which has the cockpit shown in FIG. 24A. In this view there is a body 397 with a windshield 379. The body of the plane is bisected latitudinally by dashed line 391.2. This view shows that camera 390 is positioned in the top half of the plane along support 386. Another opposite camera is positioned on the other support 388. While bisecting line 391.2 bisects the plane along a substantially horizontal axis, bisecting line 391.1 extends vertically and starts at the beginning region of a plane cabin which is positioned towards a front end of a plane. In this implementation all of the screens, adjusting mechanisms such as that shown in FIGS. 11-17.

Figure 25:
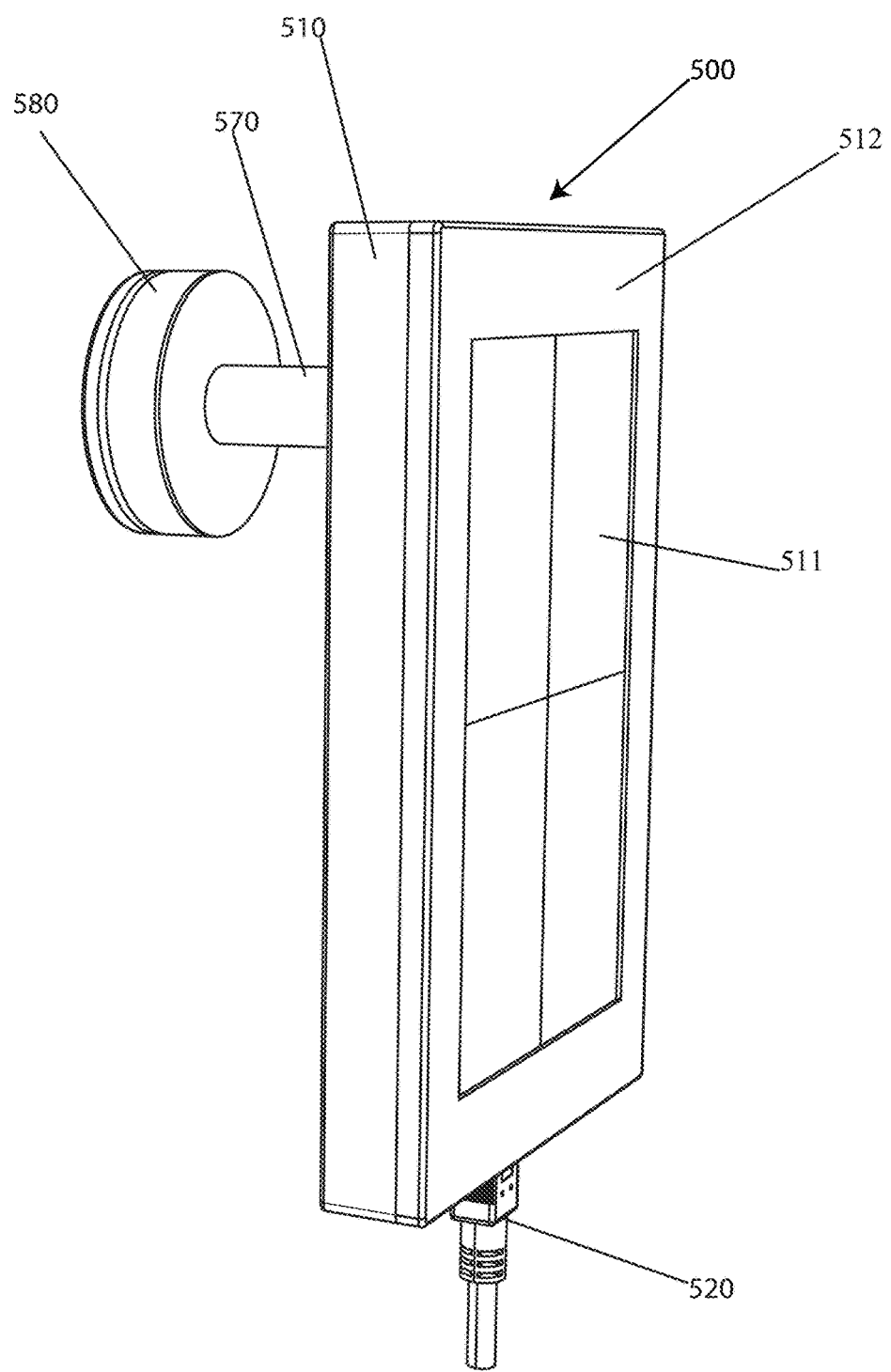
FIG. 25 is a view of a new embodiment which discloses a screen and camera combination.

FIG. 25 discloses another new embodiment 500 which includes a screen assembly 510, a camera assembly 580, and a channel 570 connecting the camera assembly 580 with the screen assembly 510. Screen assembly 510 includes at least a screen body or housing 512, and a screen itself 511. Screen 511, is housed inside of screen body 512. Behind screen 511, are electronic components shown in FIG. 36. A cable 520 can be coupled to screen assembly 510 through a port not shown herein. Thus, with this design, camera assembly 580 can be positioned on one side of a support such as supports 14.1 14.2, 15.1, 15.2 while the screen assembly 510 can be positioned on the opposite side of the support 14.1 14.2, 15.1, 15.2. Channel 570 then extends through the door to bridge between the two assemblies.

Figure 26:
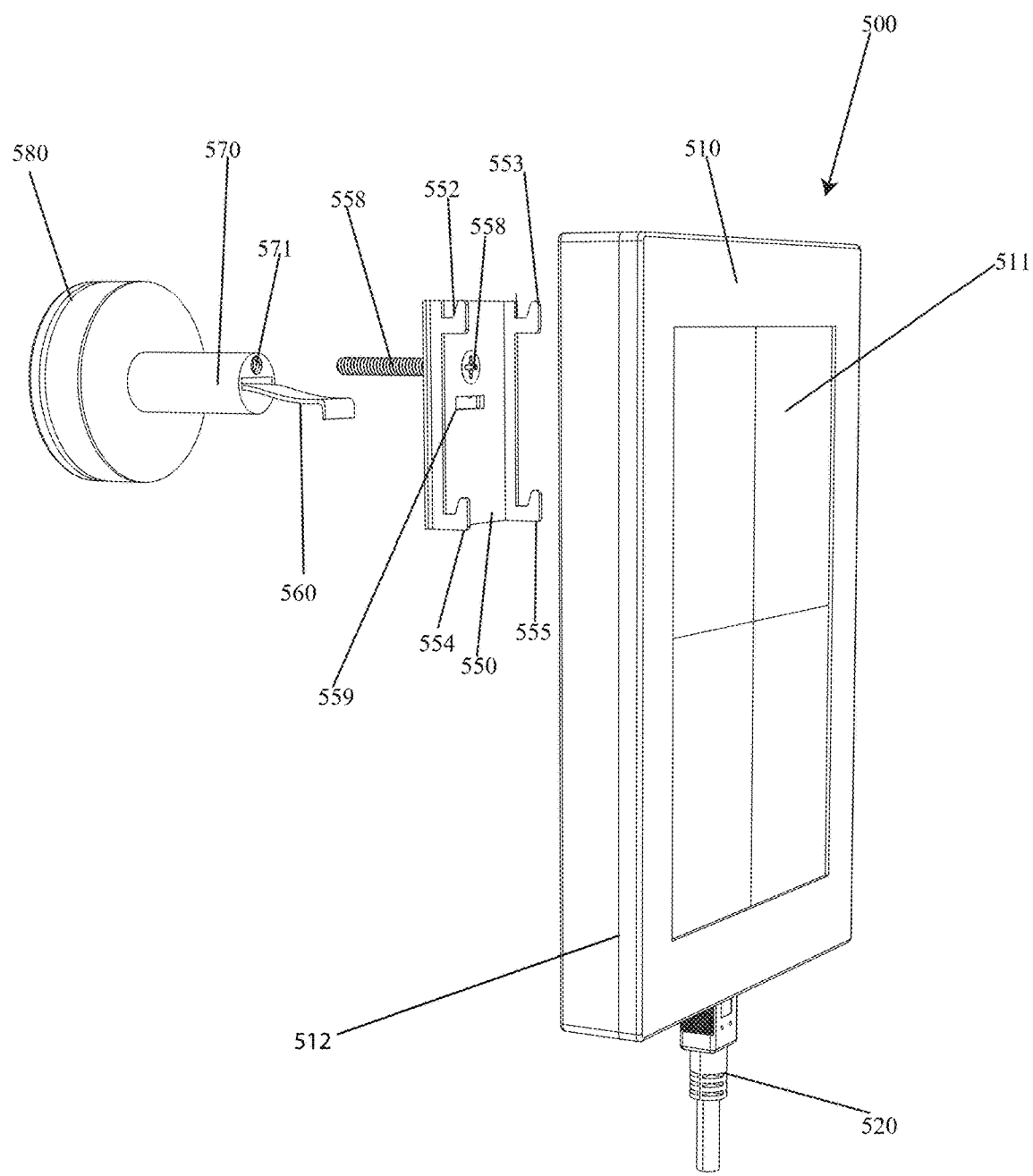
FIG. 26 shows a side exploded view of the screen and camera combination.

FIG. 26 shows a side perspective exploded view of the device shown in FIG. 25. For example, in with this embodiment 500, there is shown screen assembly 510 with screen 511 disposed inside of screen housing 512. As with FIG. 25, there is a cable 520 coupled to a bottom section of the screen. A coupling or support bracket 550 includes a bracket body, as well as at least four different bracket prongs 552, 553, 554, and 555. These bracket prongs extend out from the bracket body that are formed as substantially L-shaped hooks.

Figure 31:
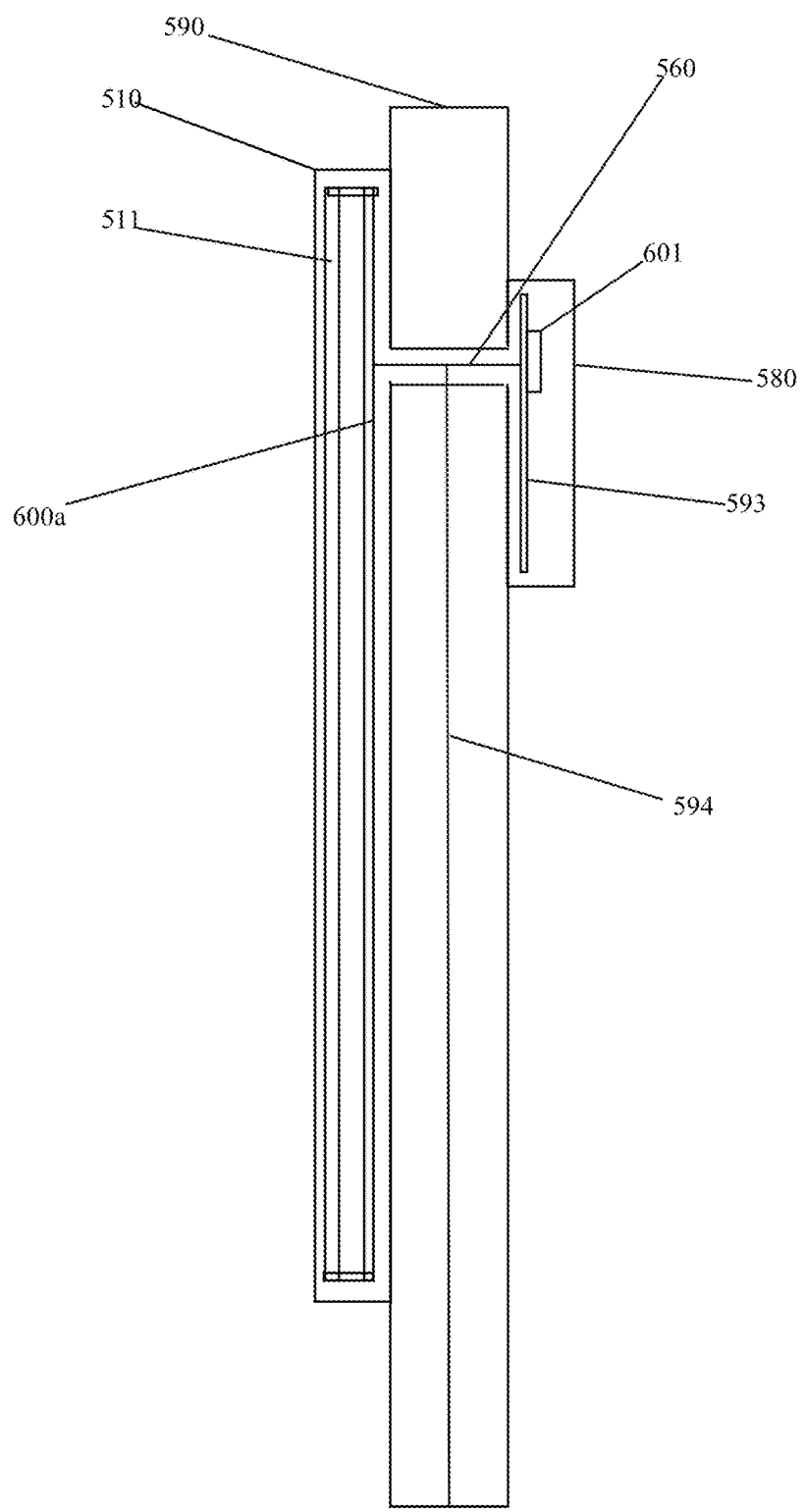
FIG. 31 shows a side cross-sectional view of a screen and camera combination with internal wiring.

These substantially L-shaped hooks are configured to hook inside of a back face of the screen body. In addition, a screw 558 is coupled to coupling bracket 550. In addition, disposed inside of coupling bracket 550 is a cable slot 559. Cable slot 559 is configured to receive a cable 560. Cable 560 is configured to be coupled to the electronic components shown in greater detail in FIG. 36. Cable 560 extends inside of channel 570 all the way to camera assembly 580. A screw hole 571 in channel 570 is configured to receive screw 558. Thus, cable 560 can slide through cable slot 559, wherein cable 560 is then connected to the electronic components inside of the screen body 512 of screen assembly 510. In addition, screw 558 can be screwed into screwhole 571 to secure camera assembly 580 to connection bracket 550. Connection bracket 550, can then be coupled to screen body 512 as shown in FIG. 31.

Figure 27:
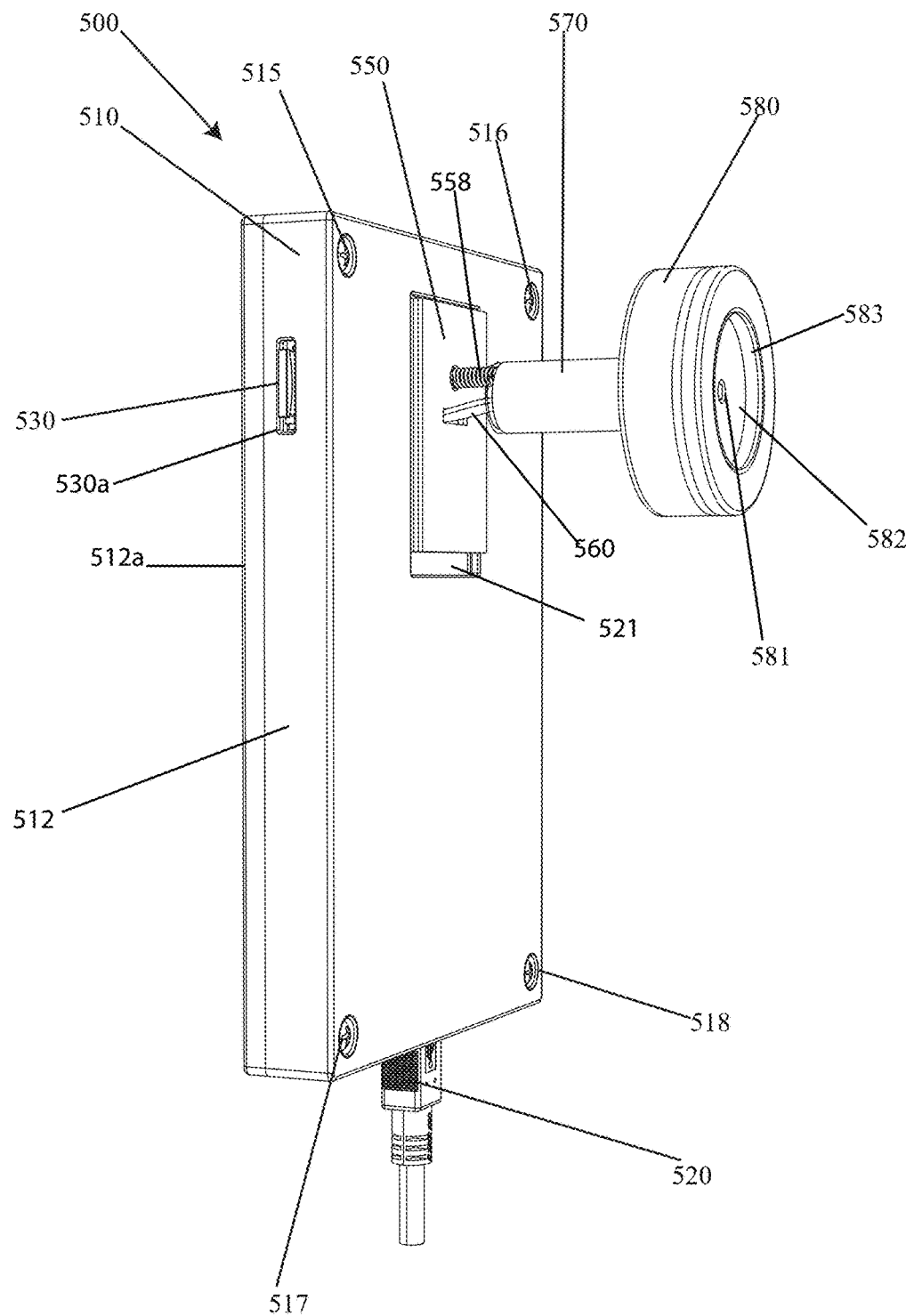
FIG. 27 shows a back perspective view of a screen and camera combination.

FIG. 27 shows a side-back perspective view of the embodiment shown in FIG. 25. In this view, connection bracket 550 is shown fitting into slot or recessed receptacle 521. As shown in this view, channel 570 is shown extending from camera assembly 580. Camera assembly 580 includes a camera 581, a camera face 582 and side walls 583. Camera assembly 580 can also include a covering such as a glass or transparent covering. As shown, there is also a screw 558 that connects channel 570 to bracket 550. In addition, as shown, there are also backing screws 515, 516, 517, and 518 which connect the body or housing 512 to a front plate 512a. In addition, as shown, there is a card 530 which extends into an opening 530a which connects card 530 to the motherboard which is housed inside of housing 512. The connection bracket 550 is fit snugly inside of recessed receptacle 521.

Figure 28:
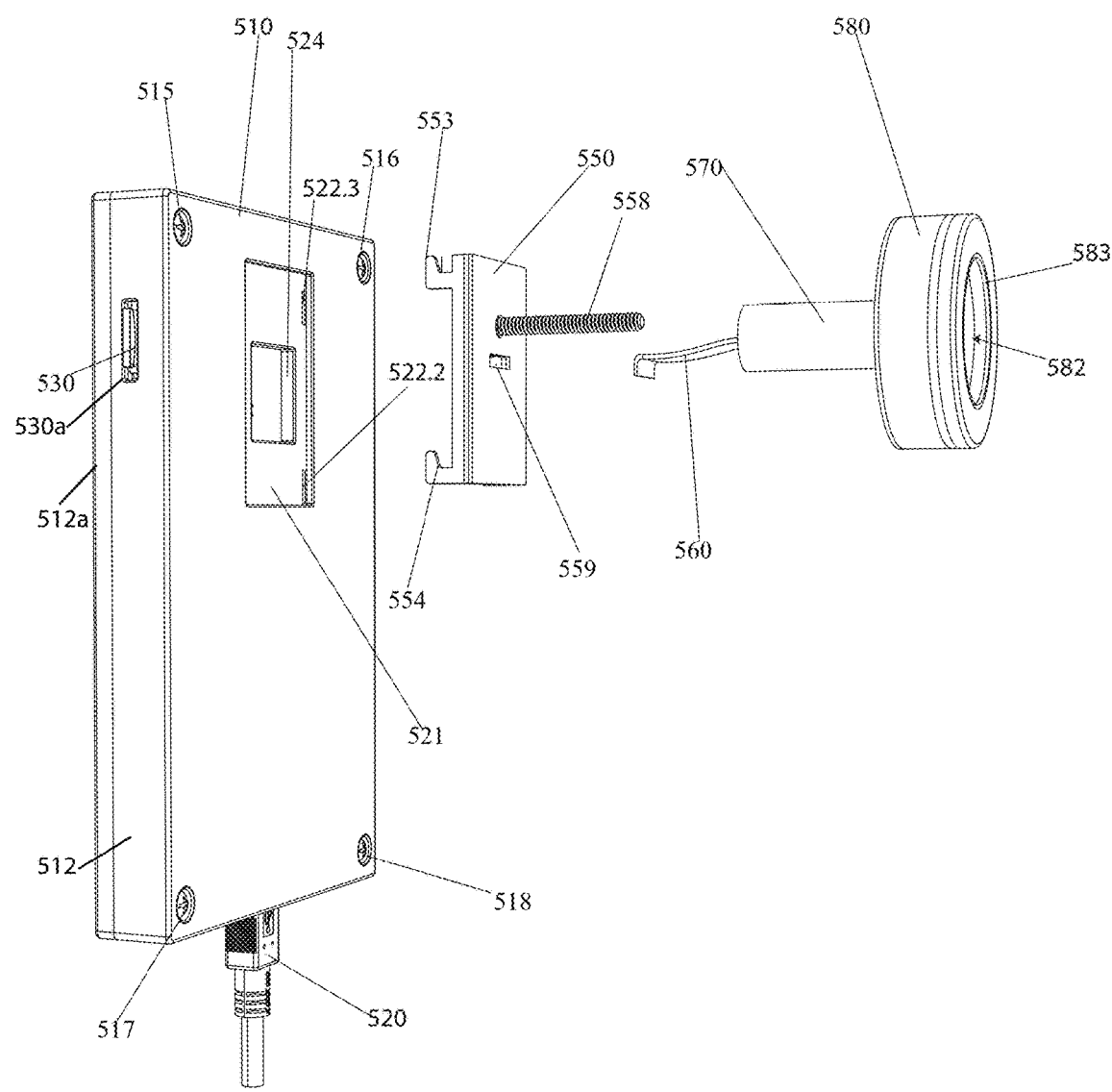
FIG. 28 shows a back perspective view of a screen and camera combination in an exploded view.

FIG. 28 is a side exploded view which is similar structure shown in FIG. 27. In this view there is shown bracket 550 is shown removed from screen body 512. Prongs 554, and 553 are shown extending out from bracket 550 wherein these prongs 551, 552, 553, and 554 can be configured to extend into prong openings such as prong openings 522.1, 522.2, 522.3, and 522.4. Cable 560 can extend in through slot 559 and then extend through opening 524.

Figure 29:
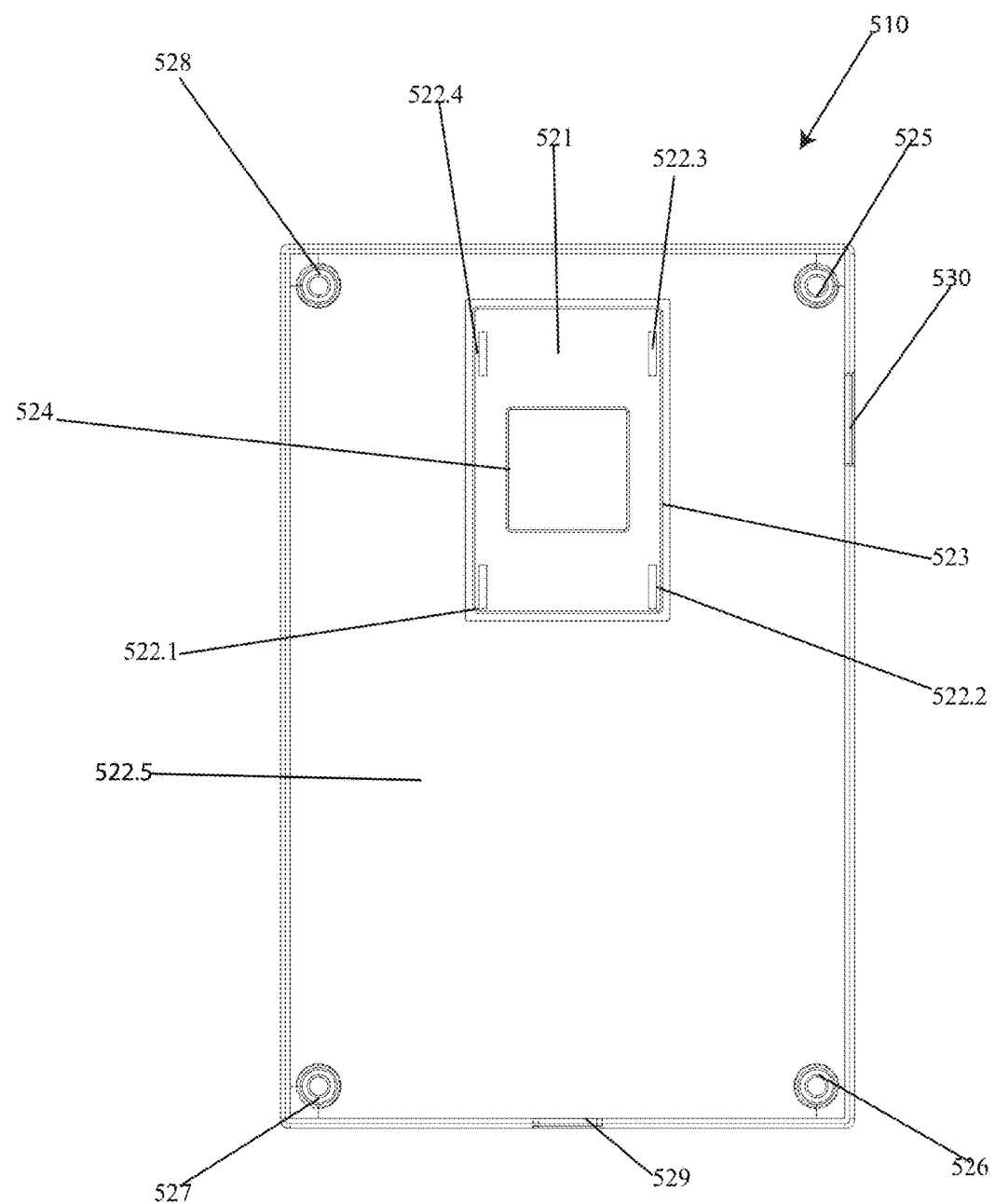
FIG. 29 shows a back view of the screen.

FIG. 29 is a back view of the screen assembly 510. In this view, there are screw holes 525, 526, 527, and 528. There are prong openings 522.1, 522.2, 522.3 and 522.4 which are configured to receive prongs. In addition, opening 524 is also shown. Furthermore, opening 529 is also configured to receive a cable 520. Cable 520 can be in the form of a power and communications cable such as a power over Ethernet cable (POE) which can supply both power and communications to and from a screen/camera and back to a central on board computer such as that shown in FIG. 38.

Figure 30:
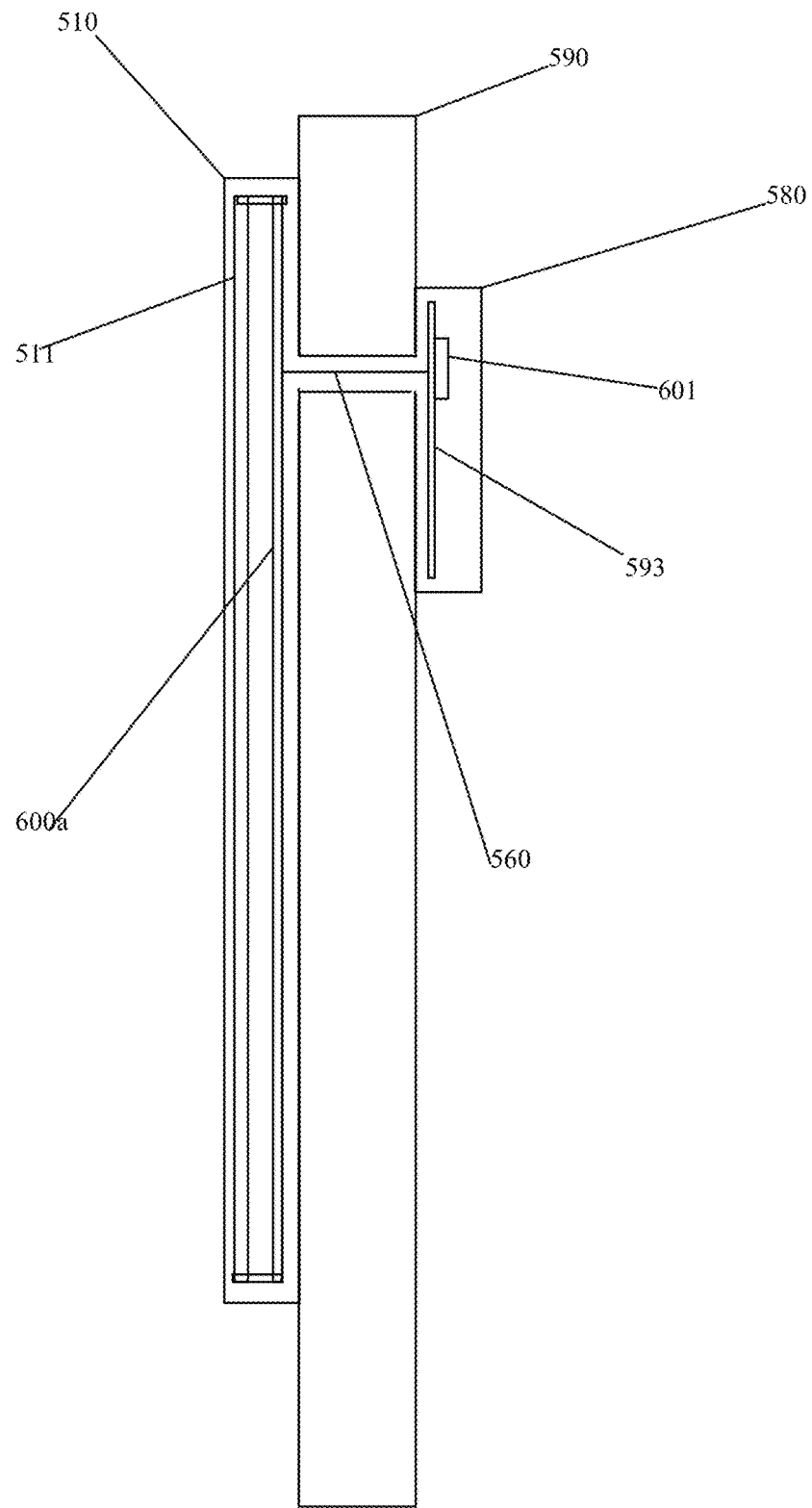
FIG. 30 shows a side cross-sectional view of a screen and camera combination.

FIG. 30 shows a side cross-sectional view of the system as it is coupled to a post in a car frame such as post 14, 15 or post 590. Post 590 can be any type of post similar to the posts 14.1, 14.2, 15.1 and 15.2. In addition, post 590 can also represent the surface of a rear view mirror or side view mirror as well. In this view there is a screen 511 disposed inside of a screen housing 510. In addition, there is a motherboard 600a which is in communication with screen 511. A cable or line 560 is in communication with motherboard 600a and extends to camera motherboard 593 disposed inside of a camera 580. There is also a camera chip 601 disposed inside of camera housing 580.

FIG. 31 shows another embodiment which shows the same components of FIG. 30 however it includes an additional line 594 forming a power line for powering the components. This power line can be used as a feed for feeding the power from the auto such as through an automobile electrical system.

Figure 32:
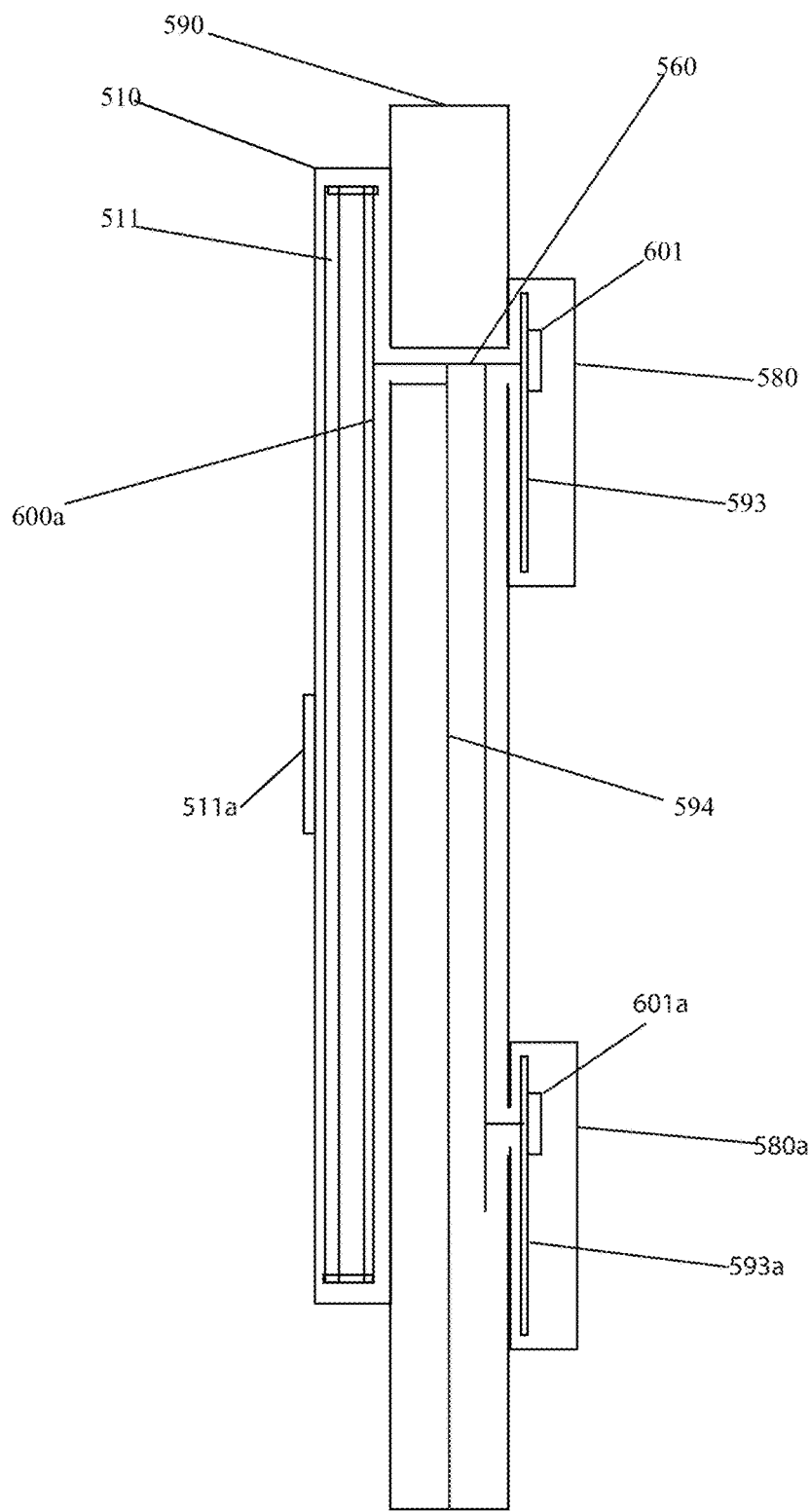
FIG. 32 shows a side view of a screen and camera combination with multiple cameras for a single screen.

FIG. 32 shows a side view of a multiple camera installation which is similar to FIG. 31, however this embodiment includes an additional line 594, an additional camera housing 580a, a base motherboard 593a, and an additional camera chip 601a. Thus, with this design multiple cameras can be associated with a single screen. The single screen can include at least one button, either included in a touch screen or an additional button 511a which can serve as a toggle button for the device toggling between different cameras. Alternatively, the two or more cameras can serve as a means for creating a three dimensional view on the screen 510. In addition, these buttons or virtual buttons as part of the screen software which are presented on the screen itself can be used to point and aim the cameras such as cameras 580, 580a, 580b, 580c (See FIG. 33), which are all cameras configured to be electronically driven, as well as at least cameras 22, 24, 26, and 32, 34, 36, 100, 120 by any suitable means such as through the drive system shown in FIG. 10B.

Figure 33:
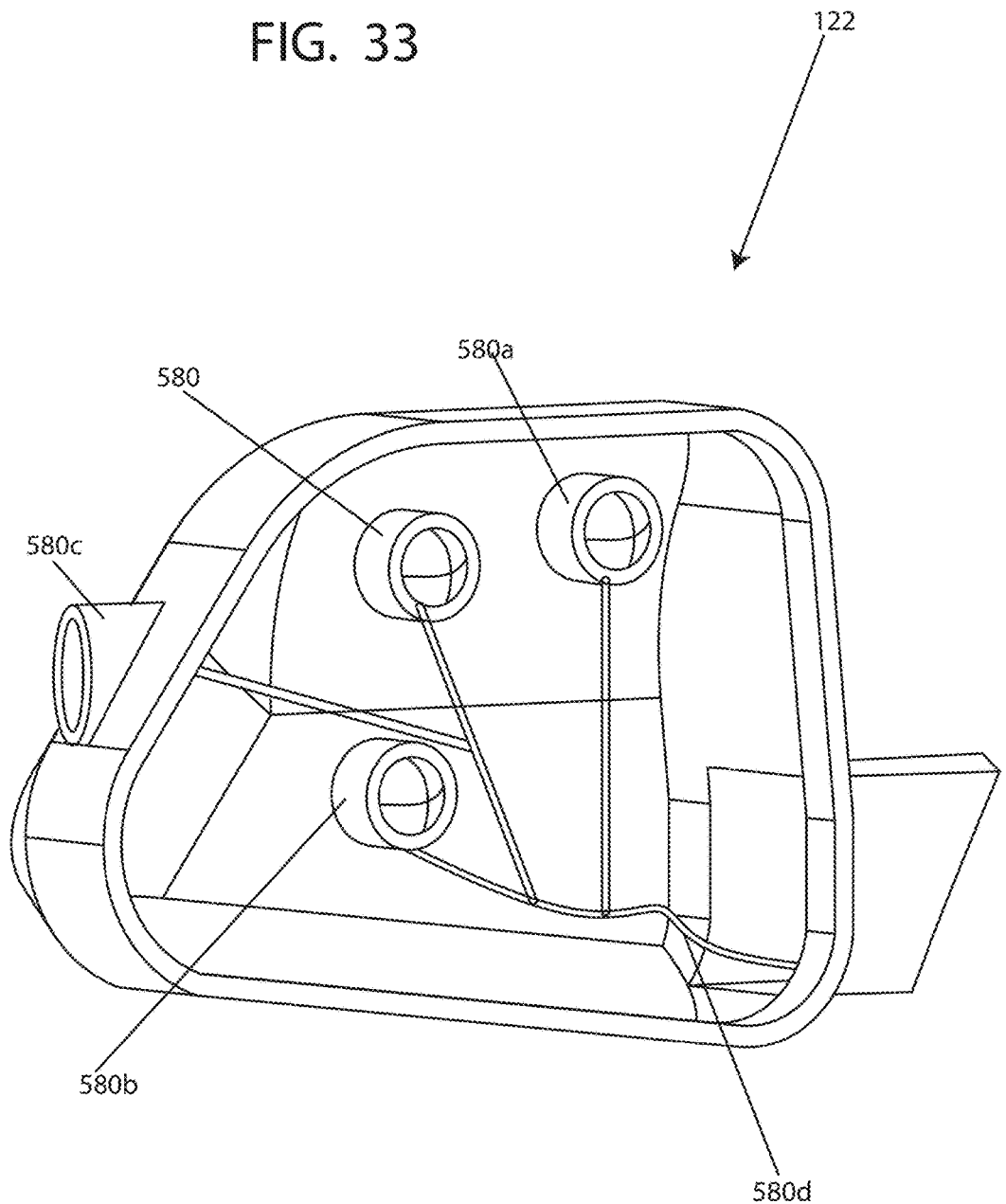
FIG. 33 is a front view of a camera and mirror combination with multiple cameras installed on a side mirror of an automobile.

FIG. 33 shows the different cameras which can be installed for example on a side view mirror 122 (See FIG. 10B). There can be for example a first camera or camera body 580, a second camera or camera body 580a, a third camera or camera body 580b, and a fourth camera or camera body 580c. While the cameras can be in the form of multiple different cameras feeding into a single screen, at least one of the cameras such as camera 580c can be positioned at a side position on mirror 122 so that it extends the viewing out laterally for users to see to the side of the car and even into blindspots of a rear view mirror. These cameras can also be driven such as via the drive system shown in FIG. 10B.

Figure 34:
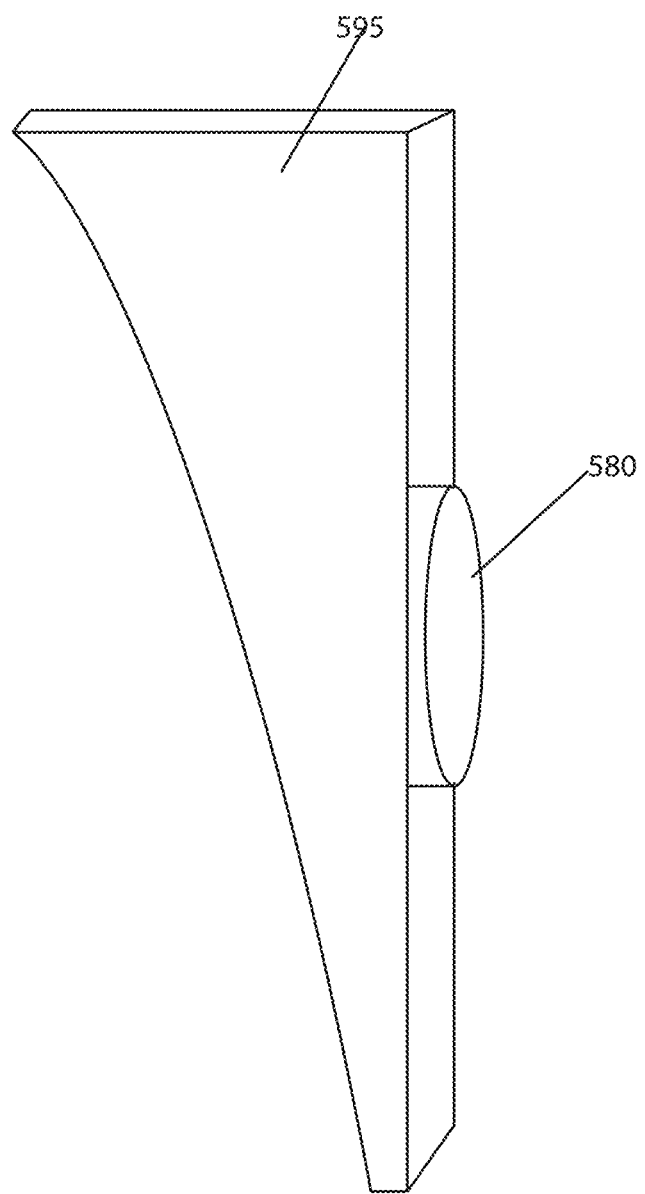
FIG. 34 is a side view of an adapter which can be placed on a side of a support for an auto or on a mirror.

FIG. 34 is a side perspective view of an adapter which includes a block adapter forming a mounting bracket 595 which can be pre-molded and pre-formed into a particular shape or structure which then allows the existing curvature of a structure of the automobile to be compensated for via this structure. Coupled to this block adapter 595 is a camera body 580 which is seated inside of this adapter structure. Any type of combination of camera and screen system can be used herein with this adapter.

Figure 35:
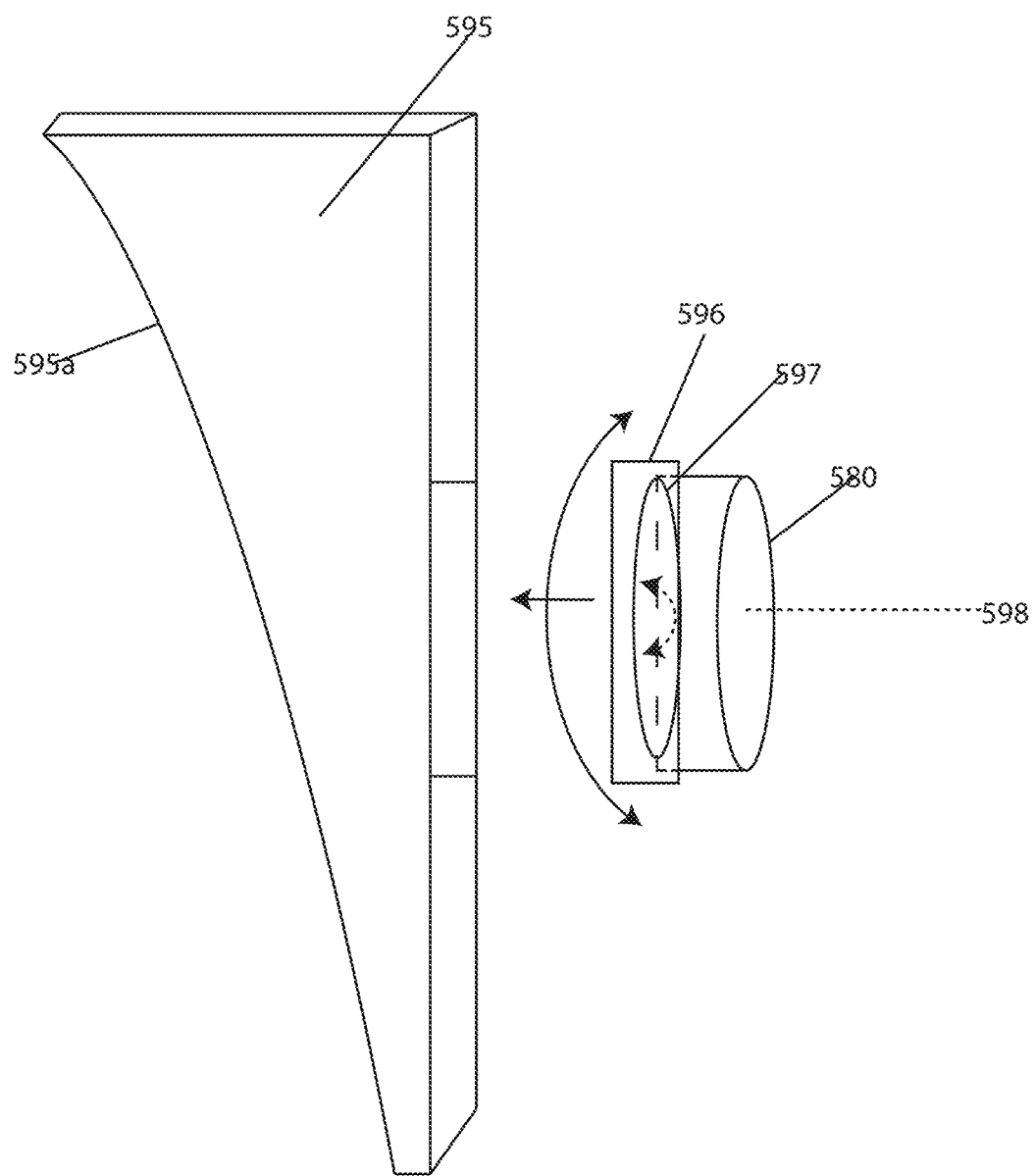
FIG. 35 shows a side support which allows for a camera with an adjustable angle seat being insertable therein.

FIG. 35 is a side perspective view of the block 595 which is configured to receive the camera body 580. With this embodiment, there is a camera seat 596 which includes an adapter device 597 which allows the camera to be rotated relative to a horizontal axis 598 to position and point the camera inside of the camera body. The camera seat 596 can be adjusted or rotated to either loosen or tighten the adapter device 597 to allow for the camera to be selectively positioned at a particular angle. With this design there is at least one curved surface 595a positioned substantially opposite a surface supporting the camera 580. Alternatively, the drive mechanism shown in FIG. 10B can be used with this type camera as well.

Figure 36:
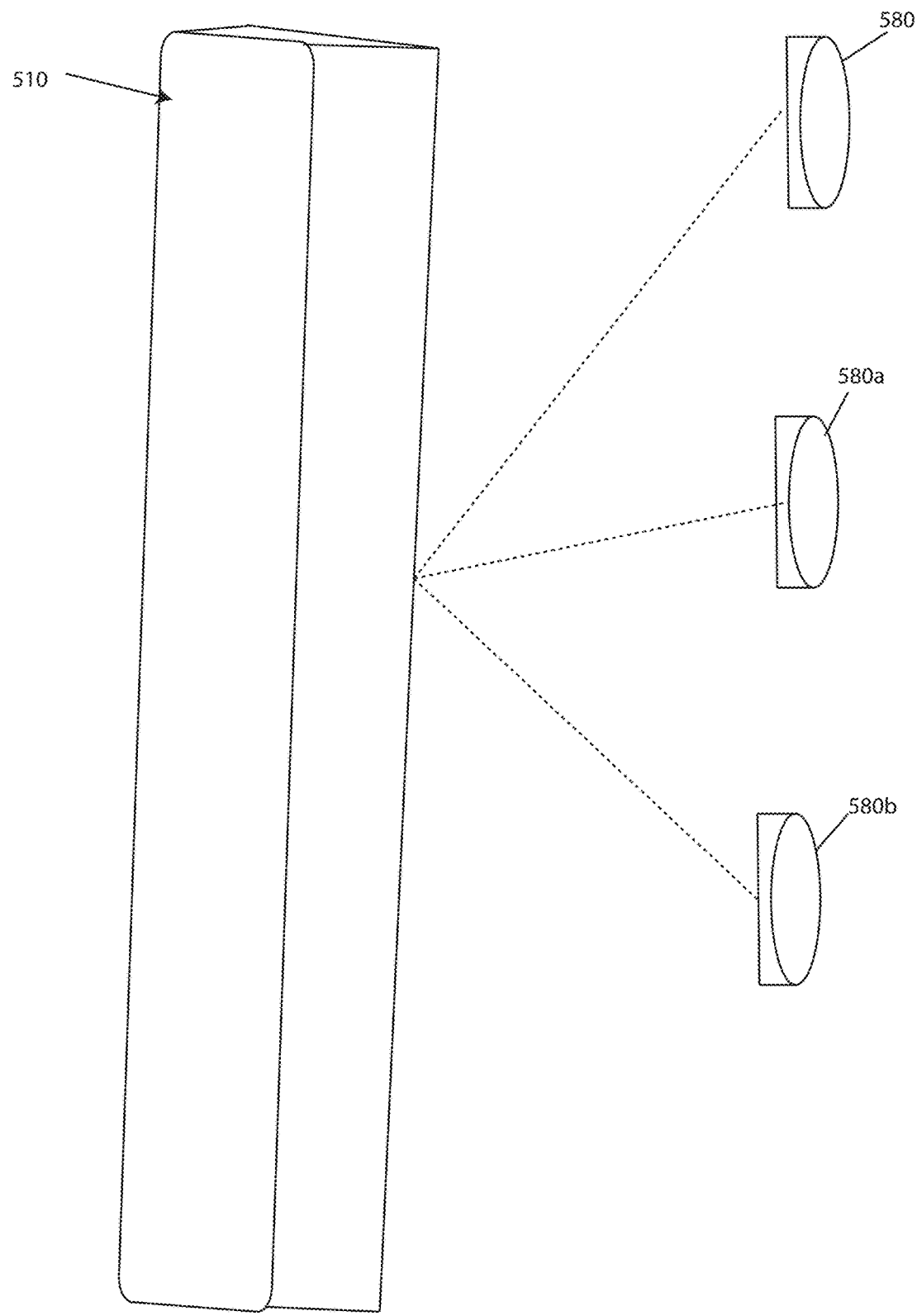
FIG. 36 shows a screen and multi-camera installation.

FIG. 36 shows a screen 510 which can be connected to any one of cameras 580, 580a, and 580b through a wireless connection.

Figure 37:
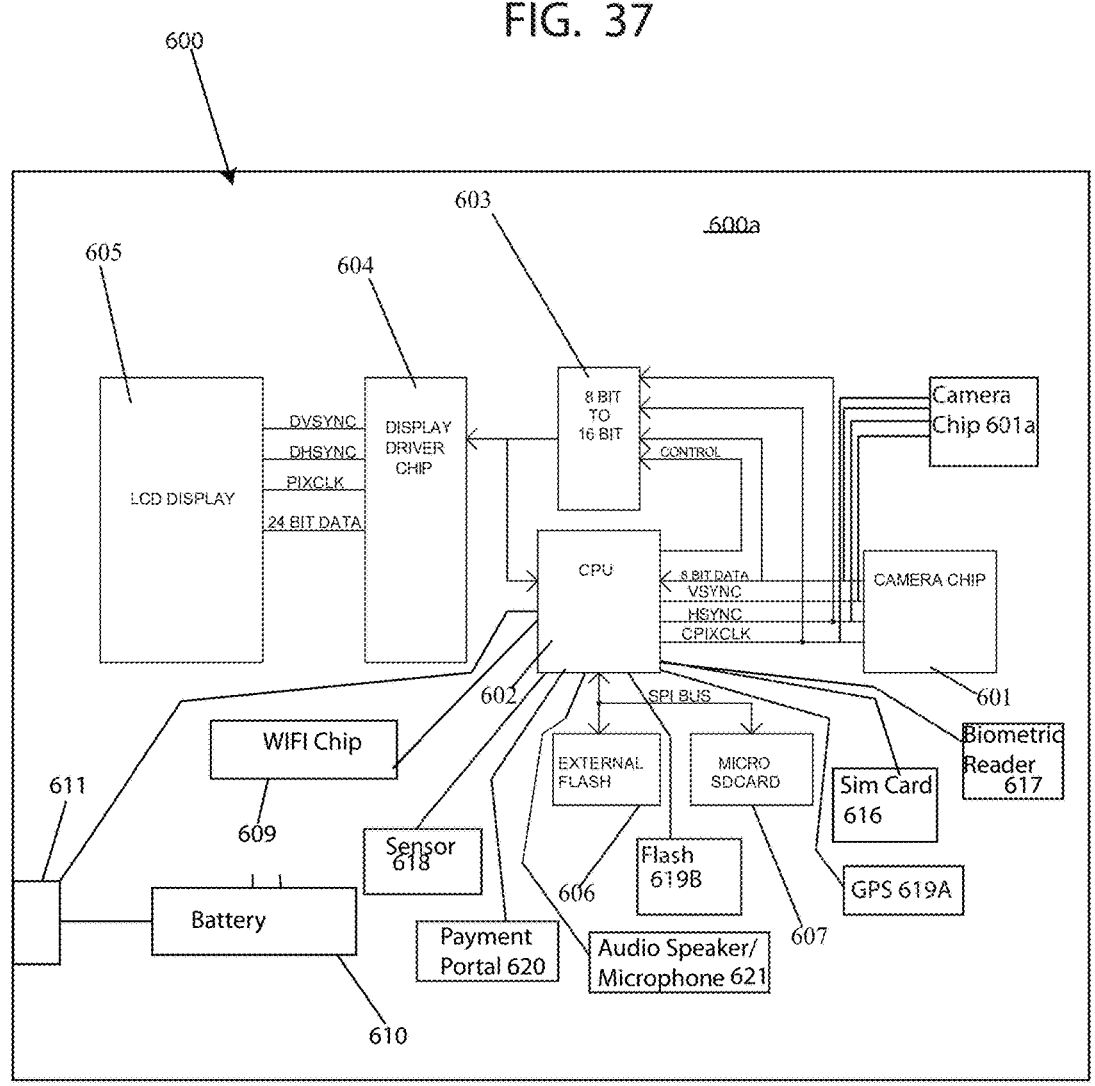
FIG. 37 is a schematic block diagram of the electronic components for the screen and camera combination.

FIG. 37 shows the preferred embodiment of the apparatus. This embodiment of electronic components 600 includes camera chip 601, CPU 602, data converter 603, display driver chip 604, LCD display 605, flash chip 606 and micro SDCard 607 which can include 530 shown in FIG. 31.

Camera chip 601 is one of several types. In the current embodiment, the chip provides an integrated lens, 640×480 full color pixel array sensor or any other suitable resolution, control electronics, an 8 bit data output bus and a control bus. CPU 602 sends commands to the camera chip to initialize it and to control the capture and format of data.

Typically, one of several formats can be chosen for the representation of full color images. CPU 602 selects a format that is compatible with display driver 604 to reduce the amount and convolution of data required to display a good image.

Data from the camera chip is ported to both CPU 602 and to the display driver chip 604, via data converter 603. The display driver 604 can accept data in several widths (8 bit, 16 bit, 24 bit) and formats (RGB656, RGB888, etc). The current embodiment programs camera chip 601 to send image data in the RGB656 format, which consists of 2 bytes containing 5 bits of red color information, 6 bits of green color information and 5 bits of blue color information. Display driver 604 can accept this data in 16 bit format; since the camera chip outputs the data in 8 bit widths, data converter 603 is used to convert the 8 bit data into 16 bit RGB656 format data. Display driver 604 contains sufficient memory to store at least one frame of display data.

The display driver 604 has many registers to control the appearance of the LCD display 605, so it is connected to CPU 602 using the same bus as data converter 603. CPU 602 programs these registers before beginning the image display and also writes a command to display driver 604 at the start of every display frame to describe where the forthcoming data from data converter 603 is to be displayed on LCD display 605.

A frame of data is defined by signals VSYNC and HSYNC and CPIXCLK. VSYNC is set high when an image frame is to be output from camera chip 601. Each line of the image is qualified by HSYNC which goes high when valid pixel data is available on the data outputs of camera chip 601. HSYNC goes low when the line of data ends and signals that a new line of data is about to begin. CPIXCLK pulse high frq each byte of data sent by camera chip 601. CPU 602 can either accept this data (to save frame(s) to micro SDCard 607, or can send this data to display driver chip 604 via data converter 603.

The sequence of events required to capture and display an image frame is this: CPU 602 monitors signal VSYNC from camera chip 601. When VSYNC is detected high by CPU 602, CPU 602 programs display driver 604 with the addresses of the data that is to be written to the LCD display. Once this is programmed CPU 602 activates data converter 603. Data converter 603 accepts HSYNC and CPIXCLK and uses these signals, along with the data signals from the camera chip to assemble a 16 bit wide RGB656 word and subsequently write that word to display driver chip 604. Display driver chip 604 takes these RGB656 and stores them sequentially into its internal frame memory. Display driver chip 604 uses the frame memory to generate the signals DVSYNC, DHSYNC, PIXCLK and the 24 bit data (8 bits each of red, green and blue) for display on LCD display 605.

CPU 602 continues to monitor signal VSYNC from camera chip 601. When VSYNC goes low, the frame has been completed and CPU 602 turns the data converter off and begins looking for a new frame of data. When CPU 602 sees VSYNC go high again it starts the display sequence again. This provides full motion data from the camera to be displayed on the LCD display 605.

LCD Display 605 incorporates a touch screen interface for the apparatus. This interface permits the user to capture an image or a video from the camera chip to micro SDCard 607. This image can be used for identification or verification of events. Flash chip 606 holds images that can be displayed on a portion of LCD display 605 and includes virtual buttons, help instructions, or general information for the operation of the apparatus. CPU 602 can generate information that can be displayed on LCD screen 605 instead of video or as an adjunct to the video display. In addition, coupled to CPU are other optional components.

For example, the optional components include a WIFI chip 609 which can be used to allow the camera and CPU 602 communicate with another computer network. In addition, there can be a battery 610. There is also an Ethernet connection port 611 which is coupled to CPU 602. Other optional components can include a sensor 618. Sensor 618 can be any one of the following sensors: RFID sensor, a motion sensor, a door ajar sensor, a fingerprint scanner, a thermal sensor, and a proximity sensor alarm. In addition, there is also shown a sim card 616, and a biometric reader 617. There can also be an audio speaker or a microphone 621 wherein the users can communicate between each other by communicating using the audio speaker and a corresponding microphone. This audio speaker and microphone can be embedded into the screen assembly 510. There can also be a GPS system 619A which can be used to receive and communicate with GPS systems to provide a location for the automobile or moving vehicle. The electronics shown in FIG. 37 can be used in any one of the camera and screen combinations disclosed herein.

Figure 38:
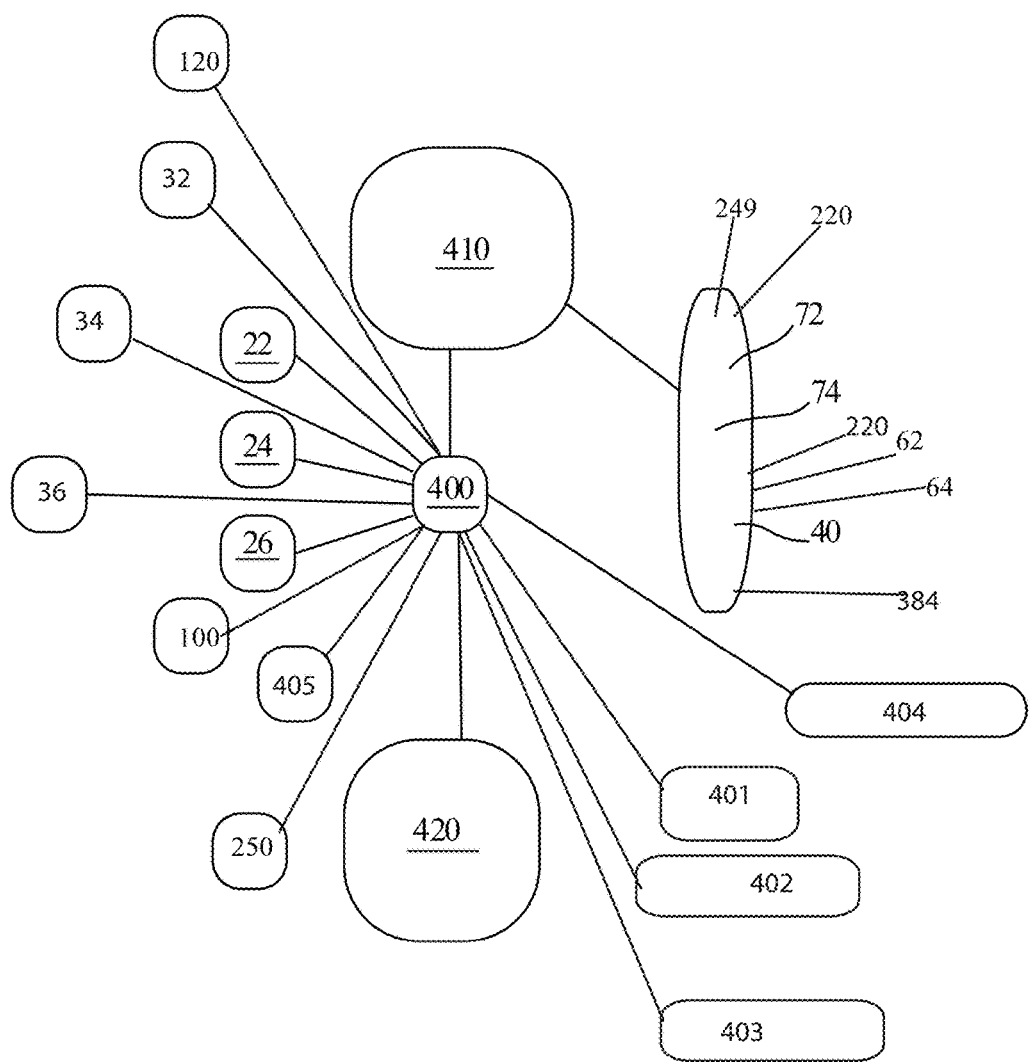
FIG. 38 is a schematic block diagram of the electronic components in communication with a central device such as a server.

Ultimately, this system can be designed to include a camera which can be configured to have a night vision camera, and an infrared sensor. FIG. 38 is a schematic block diagram of the embodiment of either FIG. 1A, 2A, 3, or 4. In this view there are cameras 22, 24, and 26 which are coupled to aggregator 400. Aggregator 400 is coupled to video compression device 410. Video compression device 410 has an output to at least one screen 62, 64, or 40, or screens 72, 74, or screens 220, or 249. In addition coupled to aggregator 400 is a video recorder 420 which is configured to selectively record video signals taken in from aggregator 400. Thus the device can serve as a black box video recorder as well. The cameras and screens for the embodiment of FIG. 5 can also be included in this block diagram as well. As shown in this view there is a first device 401 which acts as a recorder for the information such as speed, orientation, GPS provided by GPS system 618A, and other coordinates to serve for additional black box recording. In addition there is another device 402, which allows for the device to be coupled to or at least in communication with an outside cloud storage device. Thus, this device includes a wireless communication element such as a SIM card such as SIM card 616 or other wireless communication device. Another optional feature is a communication device 403 which is configured to communicate with an automobile to automatically stop an automobile. This device 403 can be preset with certain instances such as when it views a pedestrian in a cross walk or other obstruction. Device 403 can be wired into the auto's onboard computer to automatically brake the auto to stop the auto from hitting a person or object. This viewing device could then automatically either shut the auto down or disable the accelerator to prevent a party in a crosswalk from being hit. Essentially this device 403 reads the visual information from aggregator 400 and then processes the images from this information. Once it reads the information from this aggregator 400 and recognizes this information it then sends this information onto the automobile computer to either disable the auto or to disable the accelerator.

In addition, another camera control device 404 is configured to control the cameras such as cameras 22, 24, and 26 or cameras 32, 34, and 36, 52, 54, 56 or cameras 100, 120, 250 or 580. Each of these cameras can have in their body devices to control focus, pan, tilt, zoom, etc. Device 404 is thus configured to control the pan, tilt, zoom, a focus of each of these cameras and is configured to communicate through aggregator 400 so that each of these individual cameras is controlled. The controls of these cameras can be located in the dashboard of the auto, or on the steering wheel of the auto or on any one of the screens described above.

In addition, coupled to aggregator 400, is the onboard auto computer which communicates with this aggregator all of the information from the auto including the state of the auto. In addition, any controls located on the auto can be fed through the auto's onboard computer 405 through to the video aggregator 400, and then onto any one of the devices 401, 402, 403, or 404.

The aggregator 400 and also the components coupled either directly or indirectly to the aggregator 400 are coupled to the auto's onboard computer 405, in a communicative manner as well as in an electrically powered manner so that information and electrical power is passed between these components.

Each of these cameras can also be controlled by camera control device or lens 404 so that these cameras can render infrared, thermal, night vision or any other type of view known in the art and requested by the user.

Each of these components can communicate with each other via a wired connection. Alternatively, each of these components such as the cameras 22, 24, 26, 32, 34, 36, 52, 54, 56, 100, 120, 250, 580 can include an associated wireless transceiver also communicate in a wireless manner with any one of the suitable screens such as screens 249, 220, 72, 74, 62, 64, 40 or 511 also selectively having a wireless transceiver. The communication can be via wireless internet protocols such as WIFI, bluetooth or any other suitable wireless communication protocol.

Thus, the system is designed to allow for communication and control from multiple different cameras to multiple different screens either in a wired or wireless manner to allow the user to see in different blind spots. In addition, the system allows for the mounting and positioning of multiple different screens or cameras wherein these screens and cameras can be positioned around a moving vehicle.

Figure 39A:
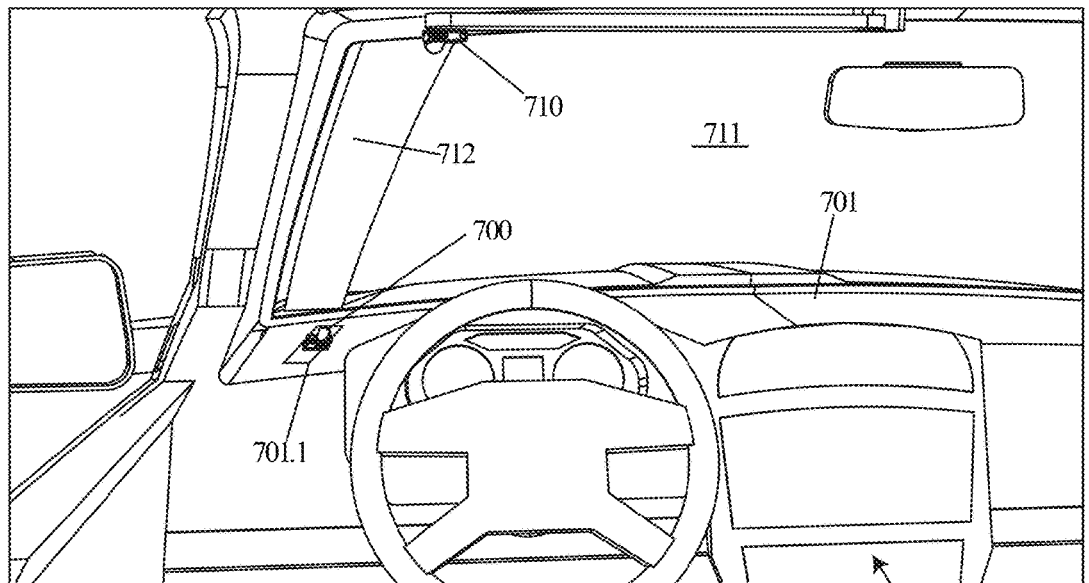
FIG. 39A is a view of another embodiment from an inside of a vehicle.

FIG. 39A shows a view of an auto 10 which includes a dashboard surface 701 which has at least one projector 700 positioned on it. There is also another projector 710 coupled to the auto, in this case to the visor of the auto. In addition, there is a reflective and/or translucent film 712 which can be made of any suitable material such as a substantially translucent and/or transparent polymer which is adhered to the windshield 711 of the auto. The adhesive can be in the form of a static adhesive or an actual chemical based adhesive. In addition, on the dashboard surface can be an induction plate 701.1 which is used to selectively charge or at least provide energy to the projector. The induction plate is configured to be powered by the auto while extending a charge to the device through electrical transfer of energy.

Figure 39B:
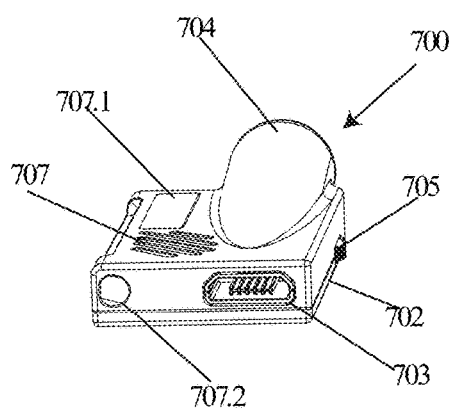
FIG. 39B is a view of a projector of FIG. 39A.
Figure 39C:
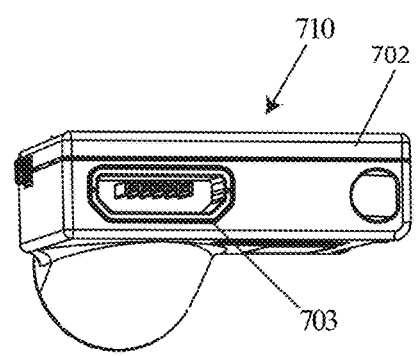
FIG. 39C is a view of another projector of FIG. 39A.

FIG. 39B shows a back perspective view of a projector 700. The projector 700 includes a body section 701, a connector 703 disposed in the body section. The connector can be any suitable connector such as a HDMI connector. The HDMI connector can serve as both a power connector as well as a media connector. Extending out from the body is a projector lens 704. There is also a vent 707 which allows the heat from the projector to escape. A card reader connection 705 is also disposed inside of body section 702. FIG. 39B shows the view of the projector 710 which is essentially the same as projector 700. There is also shown a security hole 108.1 which allows the device to be clamped down on the dashboard of a vehicle.

Figure 40A:
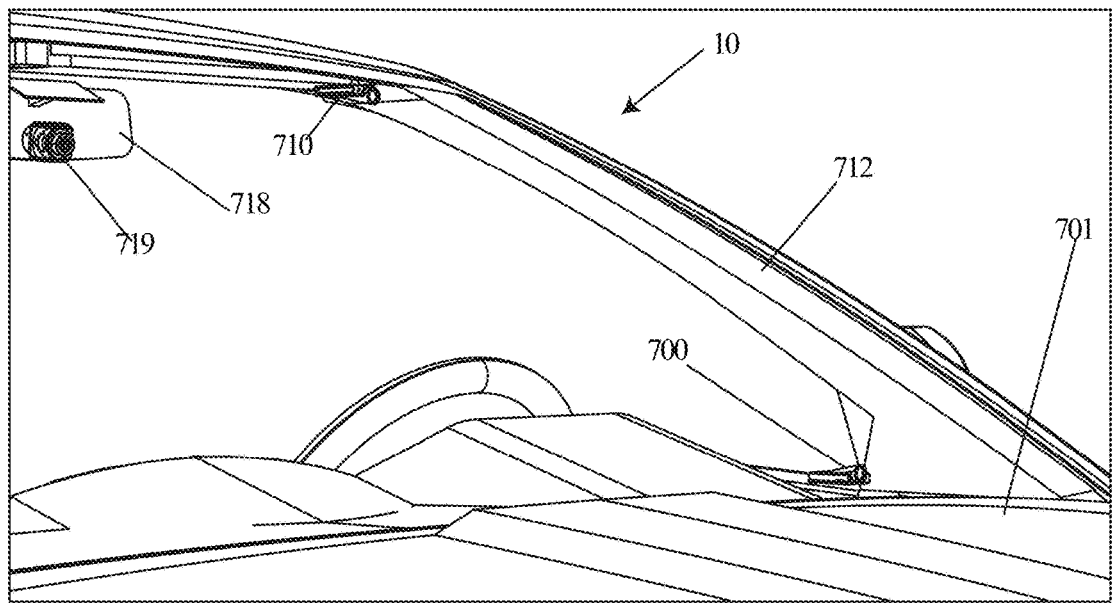
FIG. 40A is a front view of a vehicle with the embodiment of FIG. 39A.

FIG. 40A shows the view of projector 710 positioned on a visor of an auto 10. Reflective film 712 is positioned on the windshield 711. In addition, there is also a rear view mirror 718 which also includes a camera 719 positioned on the rear view mirror. The camera is configured to feed images to the projector 700 or to the projector 710. Both projectors 700 and 710 can operate independently to display images on film 712 or they can be synchronized to display a single composite image on film 712. The film 712 can have a strip around it, wherein the strip forms a guide for the projector to provide its images on the film. This strip can be in the form of an electromagnetic strip which provides feedback for the projector to guide the direction and focus of the projector onto the film.

Figure 40B:
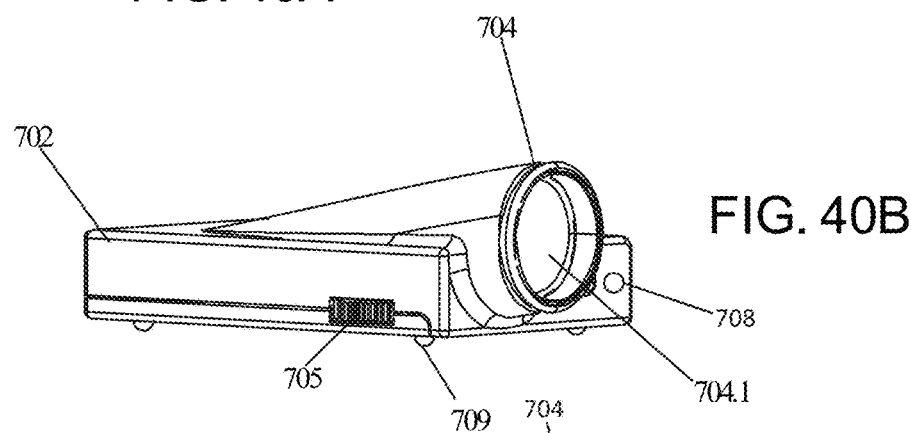
FIG. 40B is a front view of the projector of FIG. 39A.

FIG. 40B shows another perspective view of the projector 700 which shows lens 704 positioned in body 702. In addition, extending out from a side of body 702 are feet 709 configured to seat the body onto a dashboard such as dashboard 701. In addition, this projector can also include a laser range finder 708 which is configured to send a beam out to the film to provide a distance or range for the beam to focus the projector.

Figure 40C:
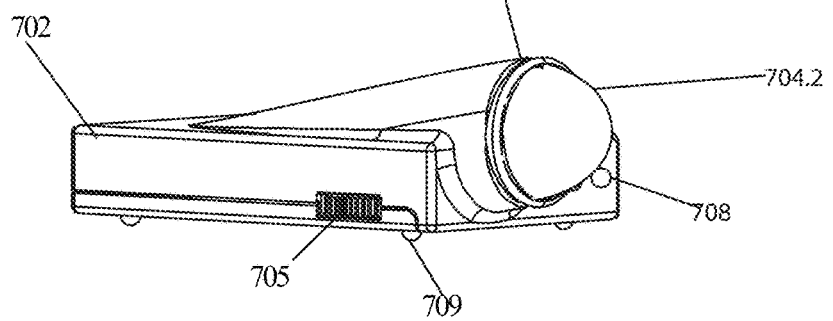
FIG. 40C is another embodiment of a projector.

FIG. 40C shows another embodiment, which shows a bulbous short-throw projector lens 704.2 which is used to provide a wide angle projection of the image onto the film. This fish-eye lens is bulbous and allows the image to extend in a wide angle direction, particularly both above and below the projector.

Figure 41A:
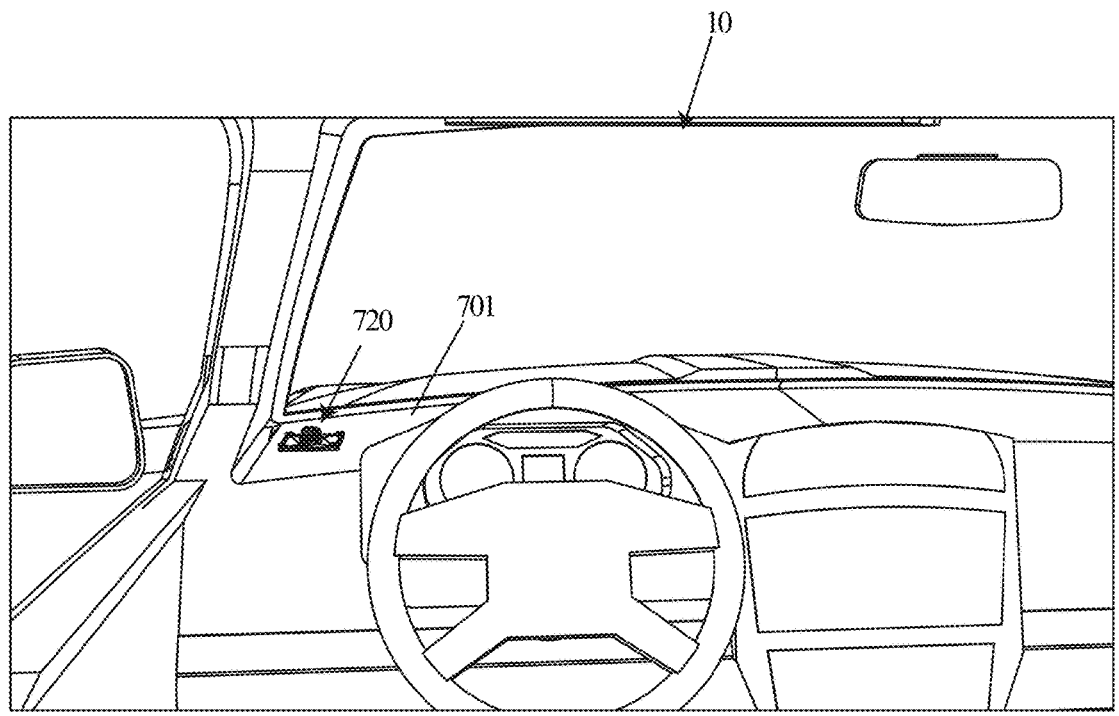
FIG. 41A is a view of an inside of a vehicle with another embodiment.
Figure 41B:
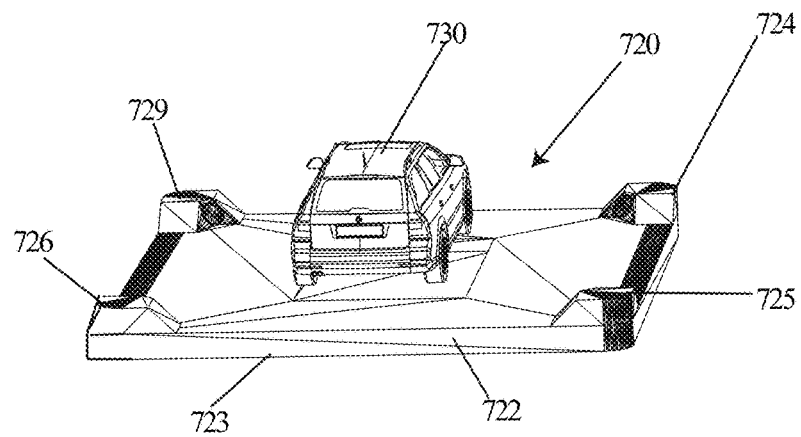
FIG. 41B is a view of the display system associated with FIG. 41A.

FIG. 41A shows a view of another three dimensional projection plane 720 positioned on dashboard 701. Three dimensional projection plane 720 includes a base section 722 which forms a mounting surface for different projectors 724, 725, 726, and 727. These projectors can project onto a reflective surface on base section 722 which is essentially a planar base surface which is configured to create a reflective surface along with the surface of the car body. The intersecting images of the projectors 724, 725, 726 and 727 are configured to create three dimensional 3-D images positioned around the car 730. Thus, in this way this design allows for a user to have a full three dimensional image of all of the bodies (autos as well as people and animals) around a vehicle. In at least one embodiment of the invention, the surface 723 of the base section 722 can be flat. In at least one additional embodiment, the surface of the base section can be formed from multiple differently angled reflective surfaces.

In another embodiment the car body projected would simply be a three dimensional holographic image.

Figure 42A:
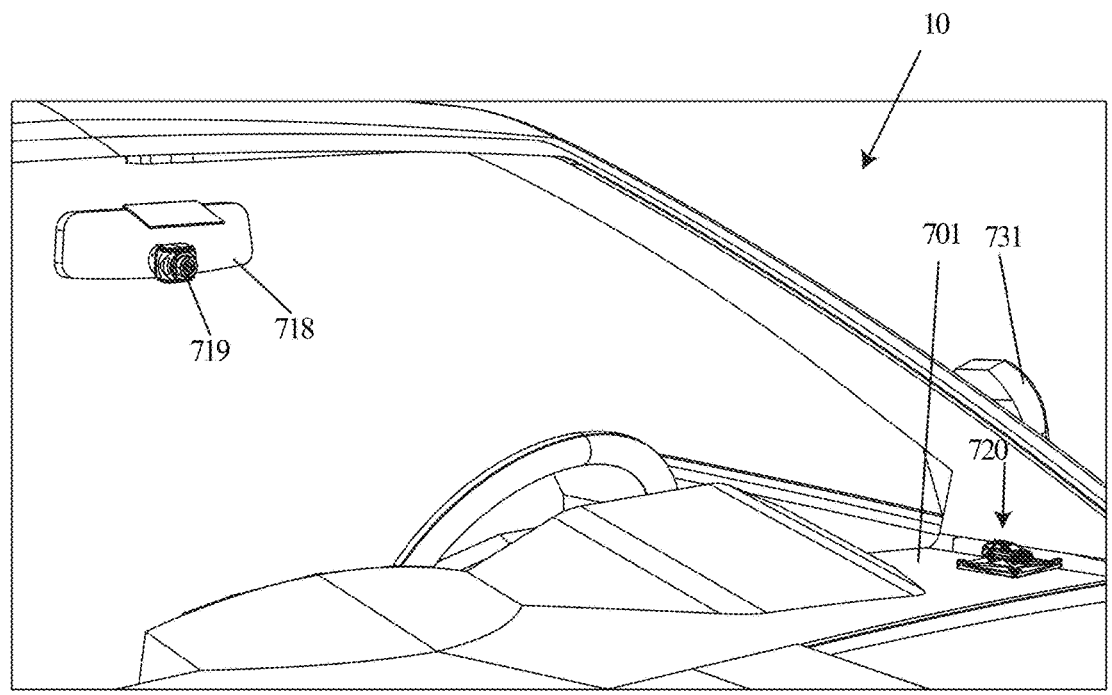
FIG. 42A is a view of the vehicle having the system of FIG. 41A.

FIG. 42A shows the projection plane 720 positioned on the dashboard of an auto. This view also shows camera 719 positioned on rear view mirror 718. In addition, an additional camera can be positioned on side view mirror 731 as well. This additional camera can either work in conjunction with camera 719 or in the alternative to camera 719.

Figure 42B:
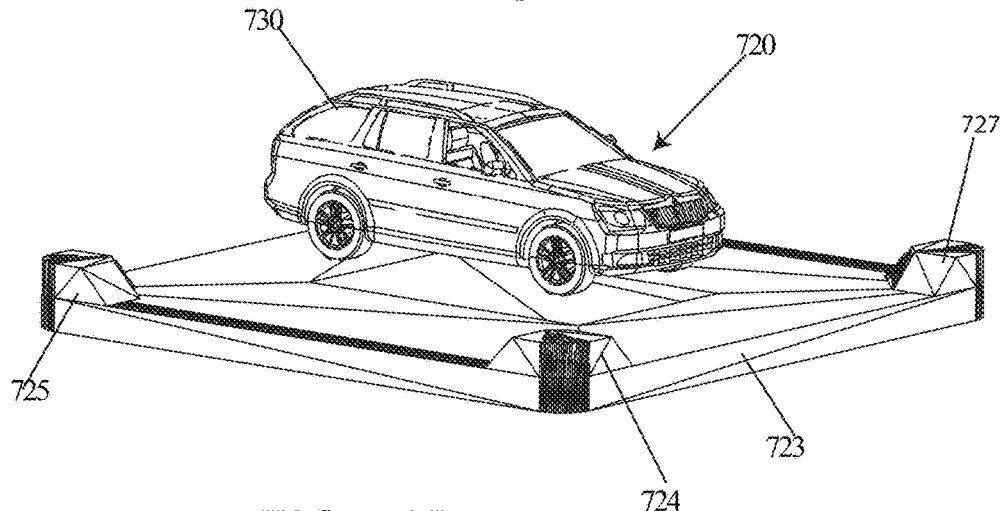
FIG. 42B is a view of the display system of FIG. 41B.

FIG. 42B shows a front perspective side view of the three dimensional projector plane 720. For example, this view shows the reflective surface 723 on base section 722 This reflective surface can have different angles of extension such that base section is not entirely planar. Thus the different projectors 724, 725, 726 and 727 can be used to project on these different angled surfaces to create images and reflections of images to create the appearance of a three dimensional image.

Figure 43A:
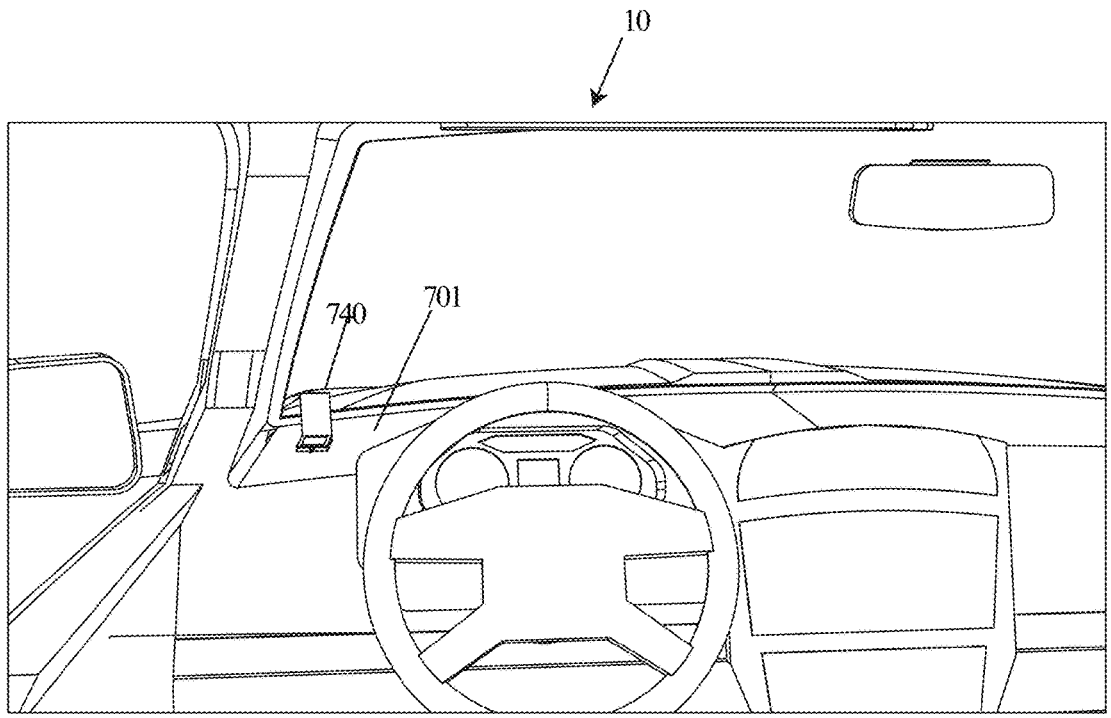
FIG. 43A is a view of an inside of a vehicle having another embodiment.

FIG. 43A shows a view of an auto which has another embodiment 740 positioned on a dashboard surface 701. This embodiment is shown in greater detail in FIG. 43B.

Figure 43B:
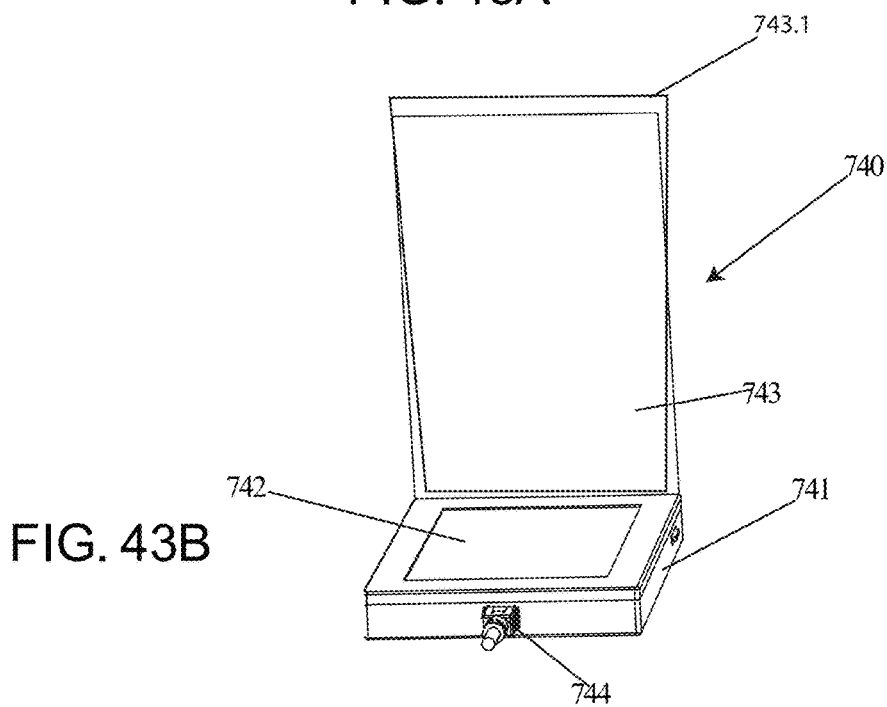
FIG. 43B is a view of the display system of FIG. 43A.

Thus FIG. 43B shows an image of an embodiment which is a screen 742 which is housed inside of a housing 741. There is a reflective screen 743 which extends up at an angle from screen 742. This reflective screen 743 is configured to reflect the image shown in screen 742. This screen acts as a projector displaying the image from the screen up to the reflective screen 743. Because screen 742 is configured to create a reflective image the image presented on the screen is modified to be readable by the user on screen 743. In addition, this device is connected to a cable 744 via a suitable cable connection, such as an Ethernet connection which is configured to provide both power and communication to the device. In at least one embodiment, the surface of the reflective screen 743 is made from a substantially transparent or semi-reflective surface. In another embodiment it could be a reflective screen. Thus, as shown by the dash-dotted lines there is another backup screen which can be used as well. This back up screen 743.1 is a solid backed screen which folds down separately from screen 743. This back up screen 743.1 is on a separate hinge 746.2 shown in FIG. 44B.

Figure 44A:
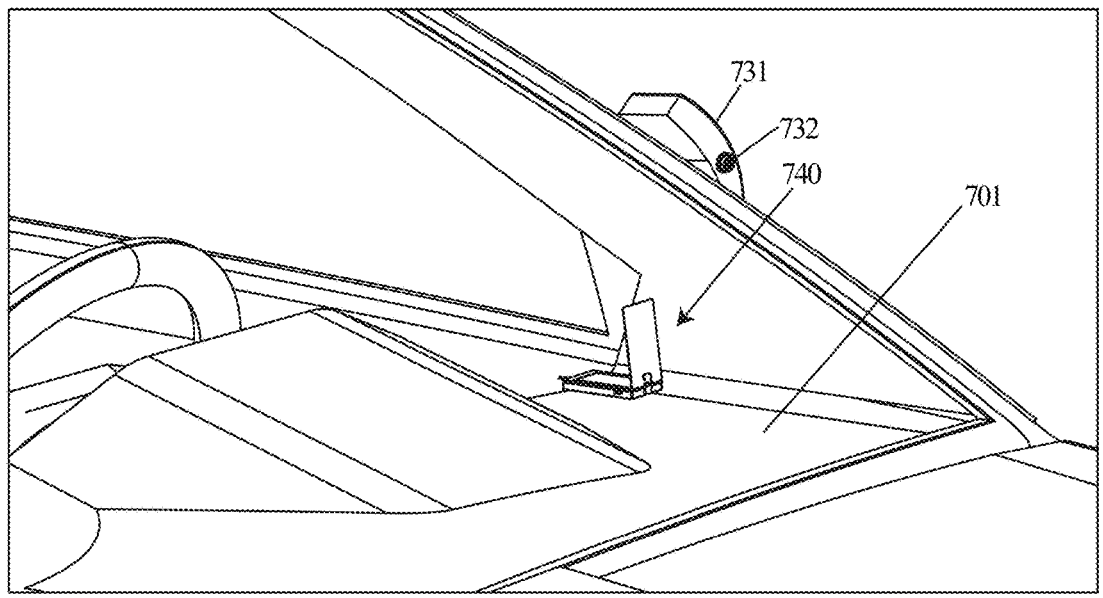
FIG. 44A is a view from outside the vehicle of the embodiment of FIG. 43A.

FIG. 44A shows the device 740 positioned on a user's dashboard. This view also shows side mirror 731 having a camera 732 positioned thereon. This camera as indicated above can work along with camera 719 or any other camera in the auto or this camera can work independent of this camera.

Figure 44B:
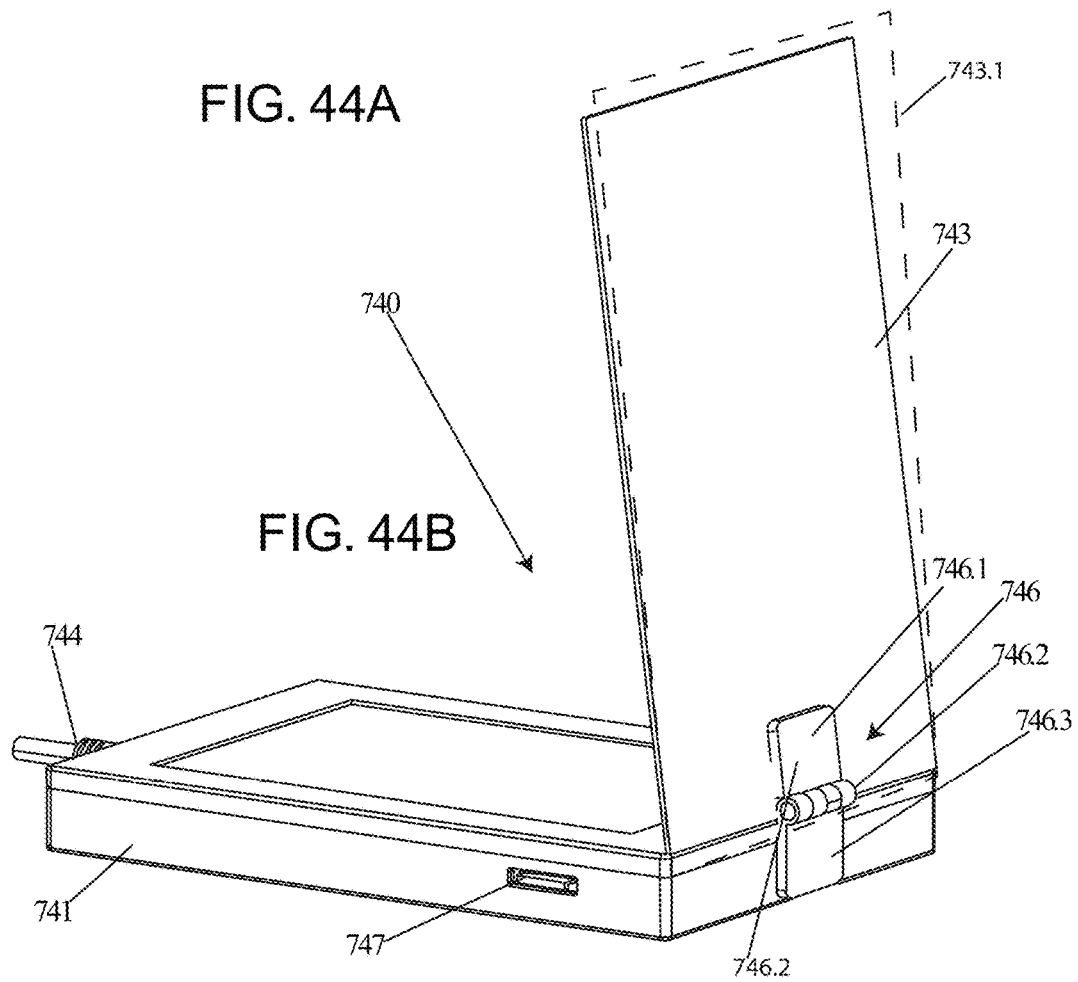
FIG. 44B is a back view of the display system of FIG. 43B.

FIG. 44B shows a back view of the device 740 which includes a body section 741, screen 743, a hinge 746 which has three main parts. First there is a first plate 746.1 a hinge section 746.2, and a third plate 746.3. There is also a card reader 747 positioned inside of the body section which allows for recording of the images and storage of the images. Thus, this card can form a "black box" recording for the automobile.

Figure 45:
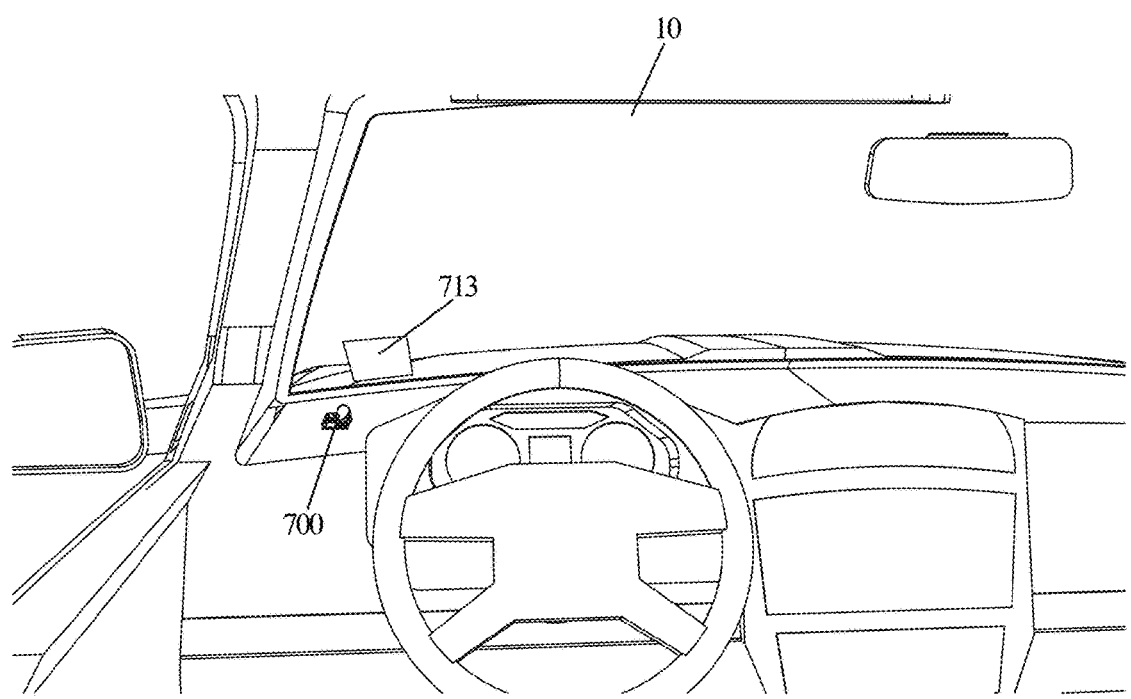
FIG. 45 is a view from an inside of a vehicle with another embodiment.

FIG. 45 shows another embodiment which shows a projector 700 which is configured to project onto a screen of reflective film 713 on a windshield 711 of an auto 10.

Figure 46:
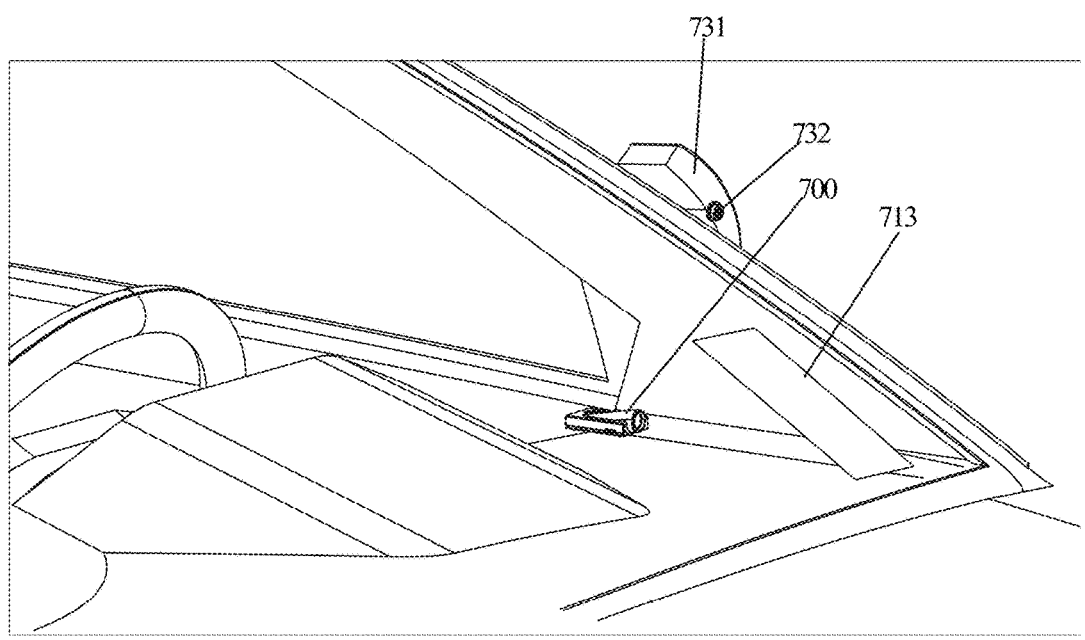
FIG. 46 is a view from outside the vehicle of the embodiment of FIG. 45.

FIG. 46 shows the reverse view of the projector 700 with the reflective film 713. This view also shows side view mirror 731 with camera 732. The film 713 is shown as smaller than film 712 such that the image required to show the necessary information may not need to be as large as shown with film 712. Thus, the film or 712 or 713 can be of any suitable size.

Figure 47:
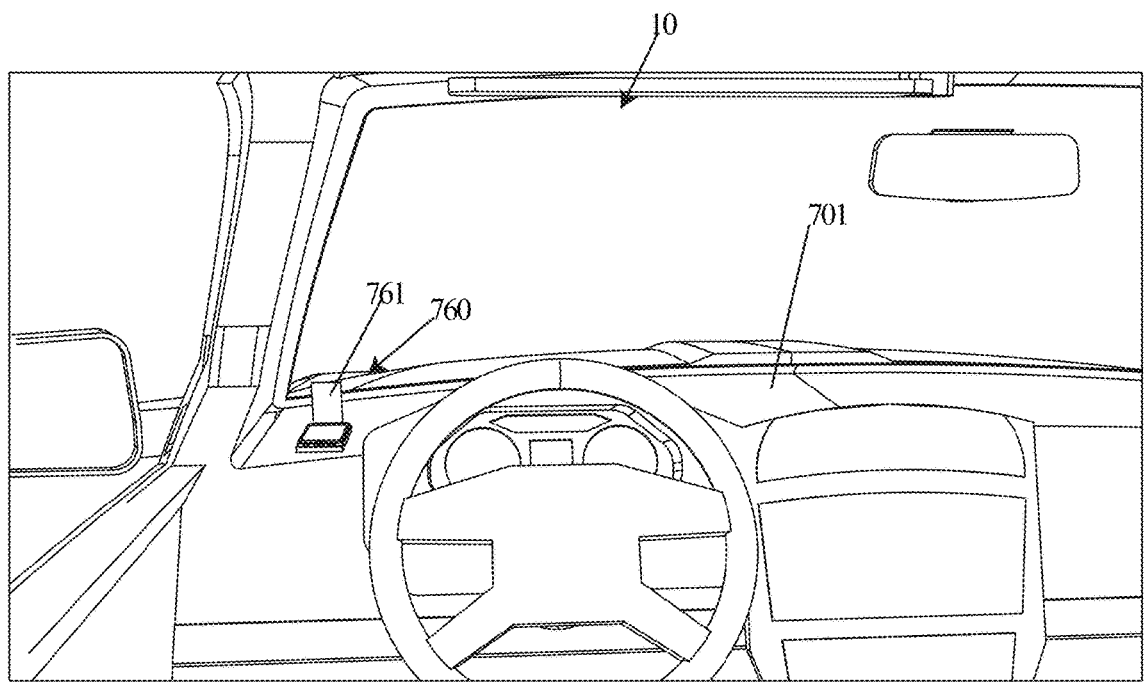
FIG. 47 is a view from an inside of the vehicle of another embodiment.

FIG. 47 shows an auto 10 having another embodiment 760 having a smaller screen 761. This device is positioned on the dashboard 701.

Figure 48:
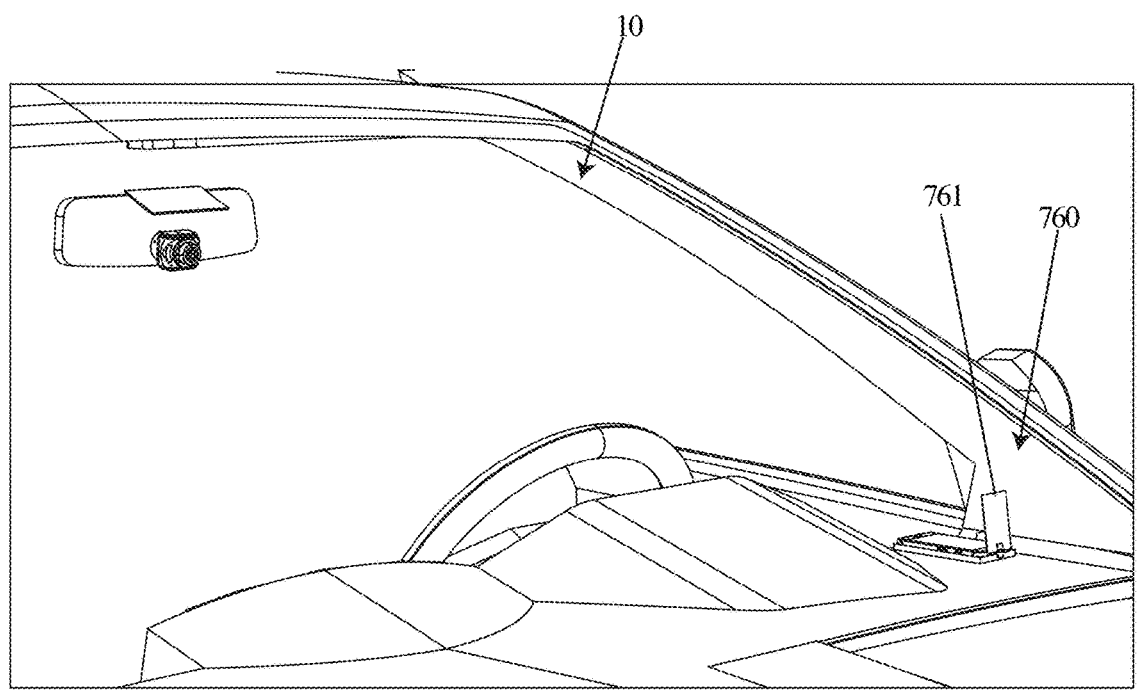
FIG. 48 is a view from outside of the vehicle of the embodiment of FIG. 47.

FIG. 48 shows an opposite view of the device having smaller screen 761. This device can be in the form of a portable phone such as a smart phone.

Figure 49:
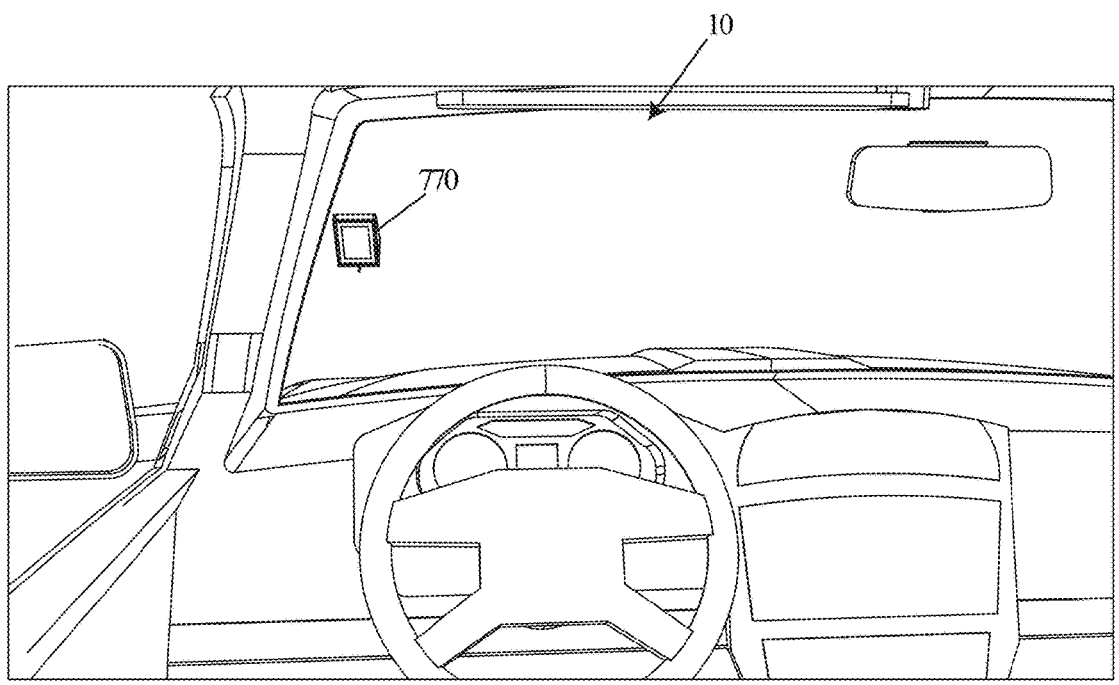
FIG. 49 is a view from inside the vehicle of another embodiment.
Figure 50:
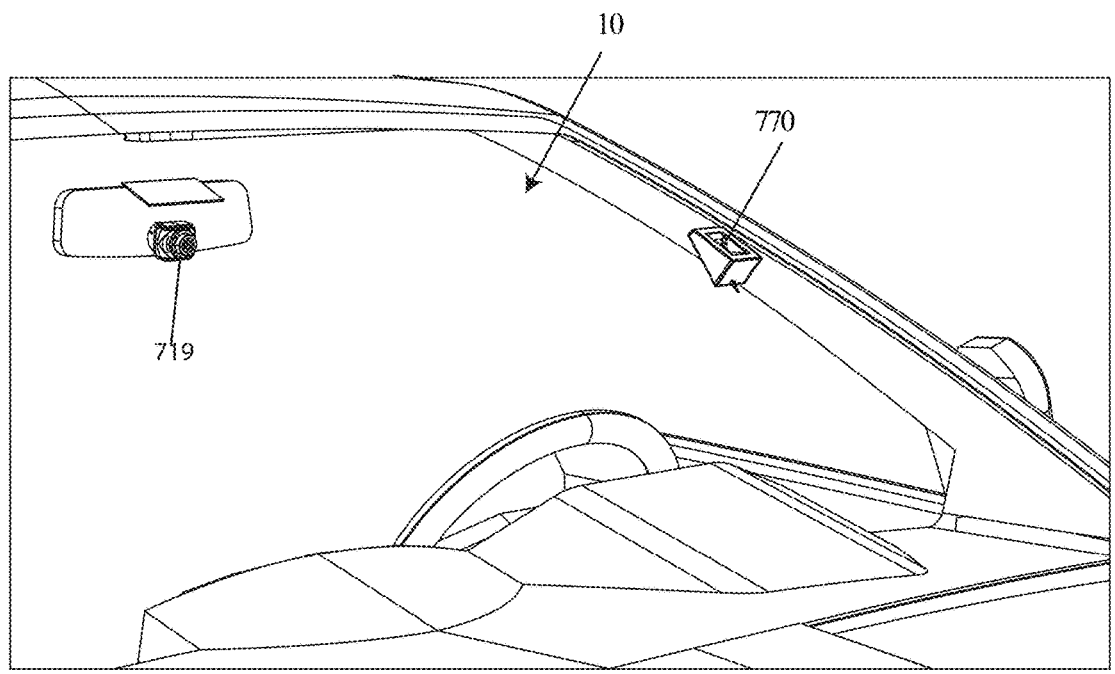
FIG. 50 is a view from outside the vehicle of the embodiment of FIG. 49.
Figure 51:
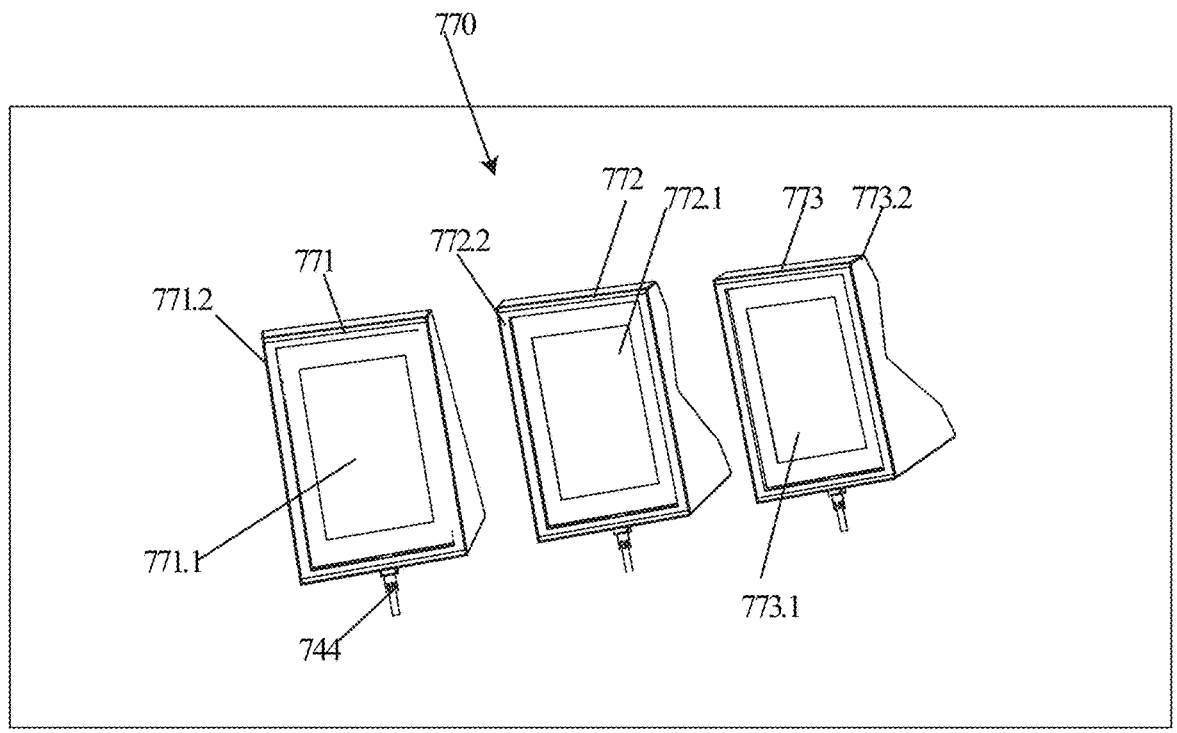
FIG. 51 is a view of an embodiment that can be used with the embodiment of FIG. 50.

FIG. 49 shows another device 770 which is positioned on a windshield of auto 10. This device 770 is shown in greater detail in FIGS. 50-52. For example, as shown in FIG. 50 there is a device 770 which has a recess. FIG. 51 shows different versions of screens 770. These different screens have a screen surface 771.1, 772.1, and 773.1. These screens also have respectively different screen bodies 771.2, 772.2, and 773.2.

Figure 52:
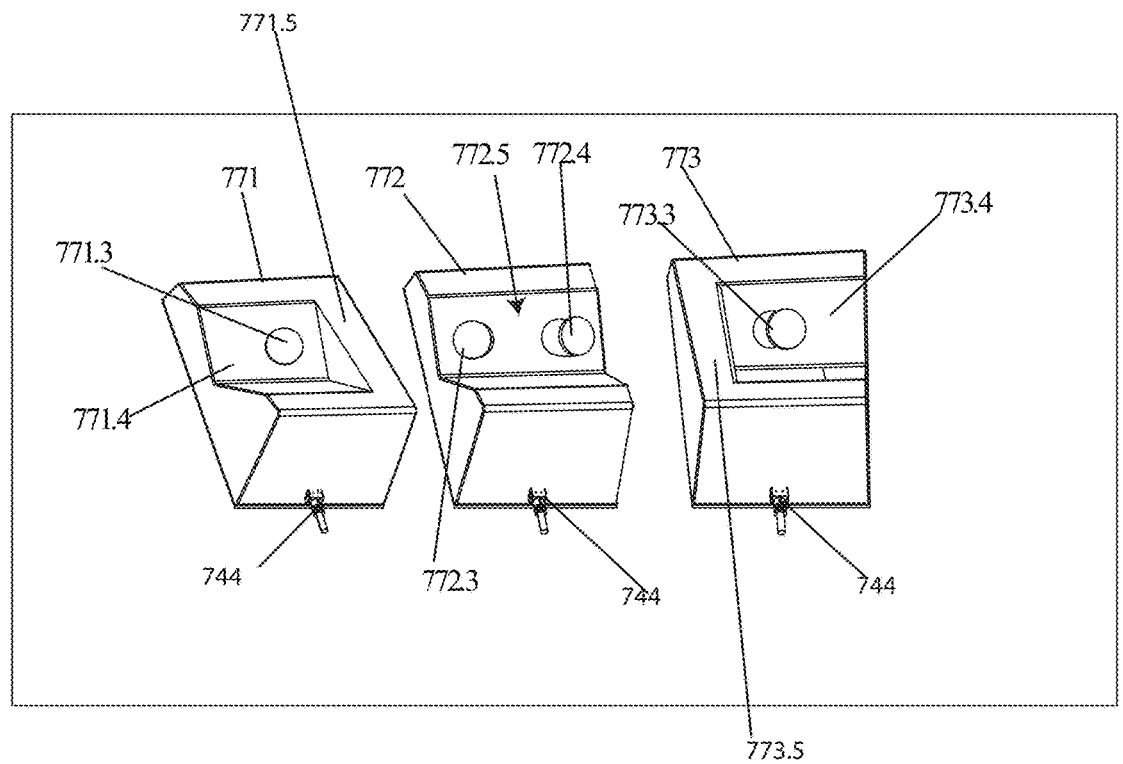
FIG. 52 is a backside view of the displays shown in FIG. 51.

FIG. 52 shows the opposite sides of these bodies. For example, screen 771 includes a first camera 771.3 and a recessed section 771.4. This recessed section includes a side shielding panel 771.5. Screen 772 includes two different cameras 772.3, and 772.4 and a recessed section 772.5.

Screen 773 includes camera 773.3. This design includes a recessed portion 773.4 and a side wall 773.5. These different designs are configured to allow these screens and systems to record activities at different angles when positioned on a windshield of an auto. Each of these cameras are pivotable or rotatable in different directions to allow for different views by the user. In one embodiment, the cameras are movable by hand. In another embodiment the cameras are movable by remote control using a touch screen such as the touch display screen or by other remote control devices such as a joystick.

Figure 53A:
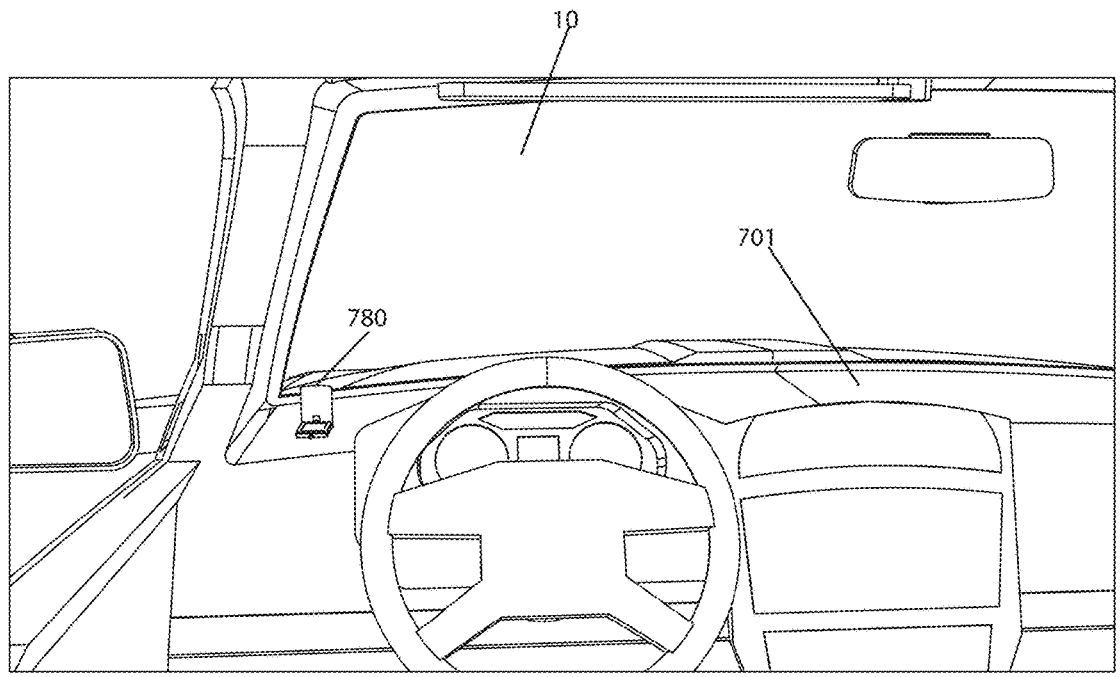
FIG. 53A is a view of the inside of a vehicle having another embodiment.
Figure 53B:
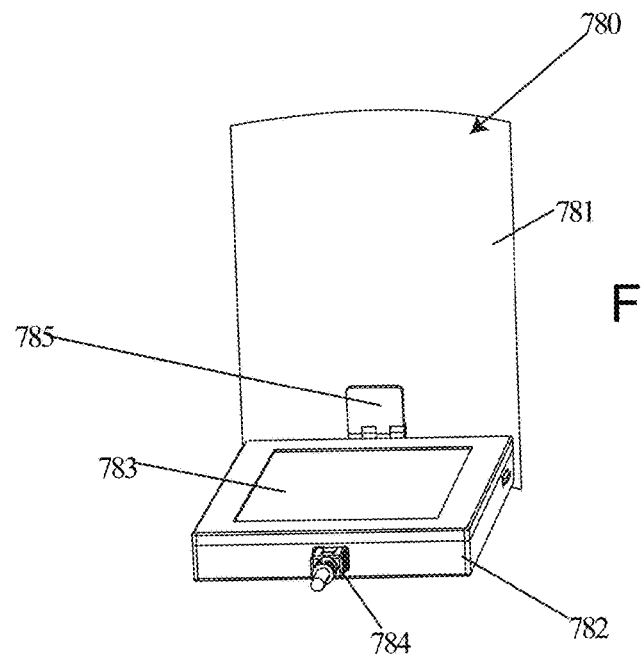
FIG. 53B is a view of the display component of FIG. 53A.

FIG. 53A shows a view of another embodiment 780 which includes a curved screen 781 which is attached to a body 782 of a screen 783. There is also a cable connection 784 coupled to the body section 782.

Figure 54A:
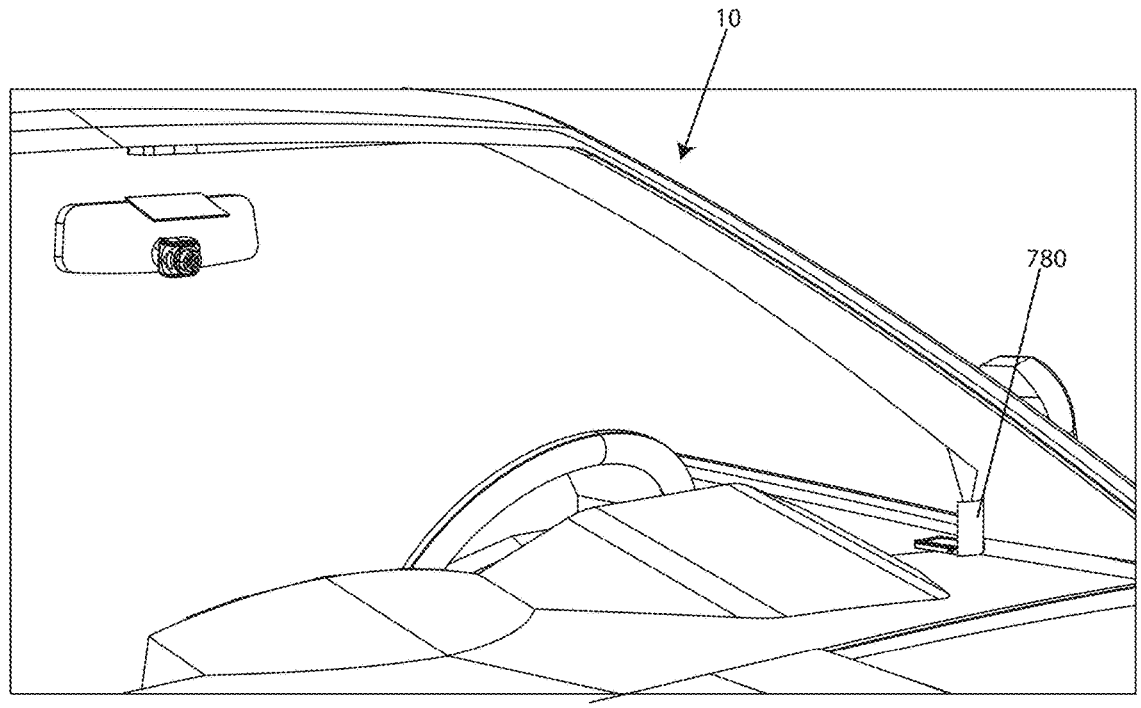
FIG. 54A is a view of the embodiment shown in FIGS. 53A and 53B
Figure 54B:
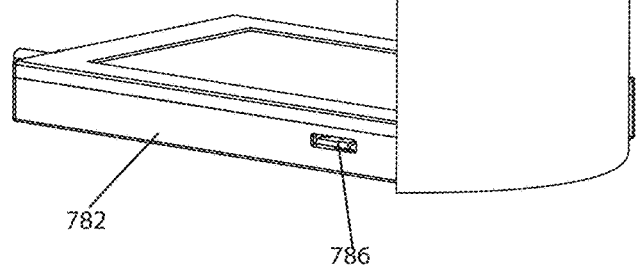
FIG. 54B is a view of the component shown in FIGS. 53A, 53B, and 54A.

FIG. 54A shows a back view of the device 780 while FIG. 54B shows a view of the screen 781 which is curved. This screen is curved to help create a three dimensional (3-D) image on the screen due to the concavity of the reflective screen. In addition, this view also shows a card connection 786 disposed inside of body 782.

Figure 55:
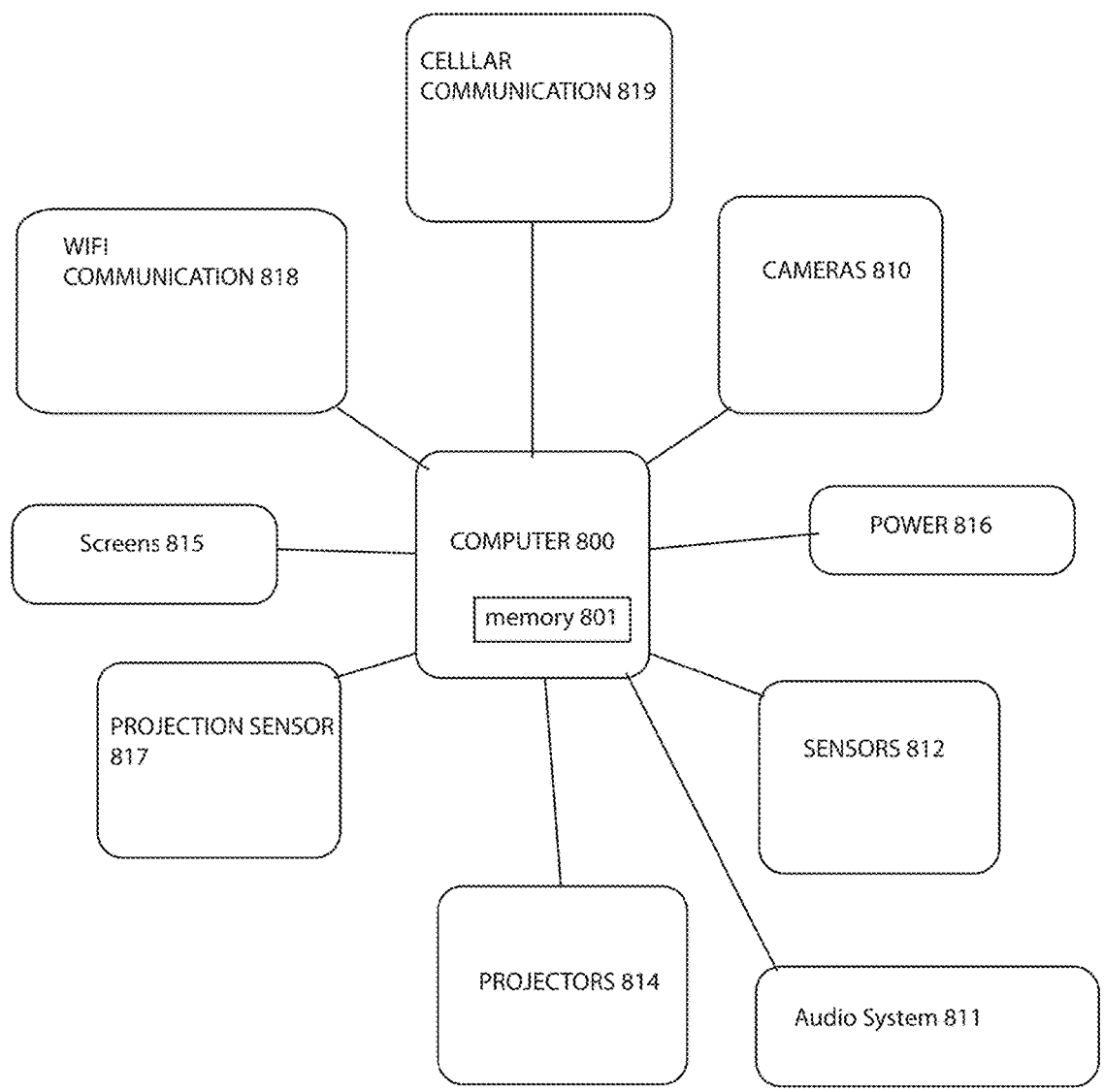
FIG. 55 is a view of the electronic network of components that can be used with any one of the above embodiments.

FIG. 55 shows an alternative embodiment for a computerized network of components which is designed to fit any one of the above identified embodiments. For example, in this embodiment, there is a computer 800 which is configured to coordinate the information taken in by any one of cameras 810. In at least one embodiment this computer includes a memory 801 which is configured to store both images and moving images taken by at least one camera such as cameras 810. Cameras 810 can be any one of the above identified cameras such as for example camera 719 or camera 732 shown in FIG. 42A or FIG. 44A respectively. There are optional sensors 812 which can be placed around the vehicle and which can be used to determine the presence of an object along with the cameras 810. These sensors can send an infrared beam, a wifi signal or any other type of suitable signal which determines the presence of objects around the vehicle. In addition, there are optional projectors 814 which can be any form of suitable projector listed above such as but not limited to the projector device 700 or 710. Furthermore, there are optional screens 815 which can take the form of any suitable screen mentioned above in any one of the above embodiments. In addition, coupled to computer 800 is a power supply 816 which is configured to power computer 800.

If the projectors 814 are present, then there can be a projection sensor 817 which can represent projection sensor 708 which is used to allow the projector to properly focus the image based upon a distance from the screen.

There are also optional communication modules which can include any one of a wifi or bluetooth communication module 818 or a cellular communication module 819. These communication modules allow the information from computer 800 to be communicated to other components such as to a smart phone or to a server.

Figure 56A:
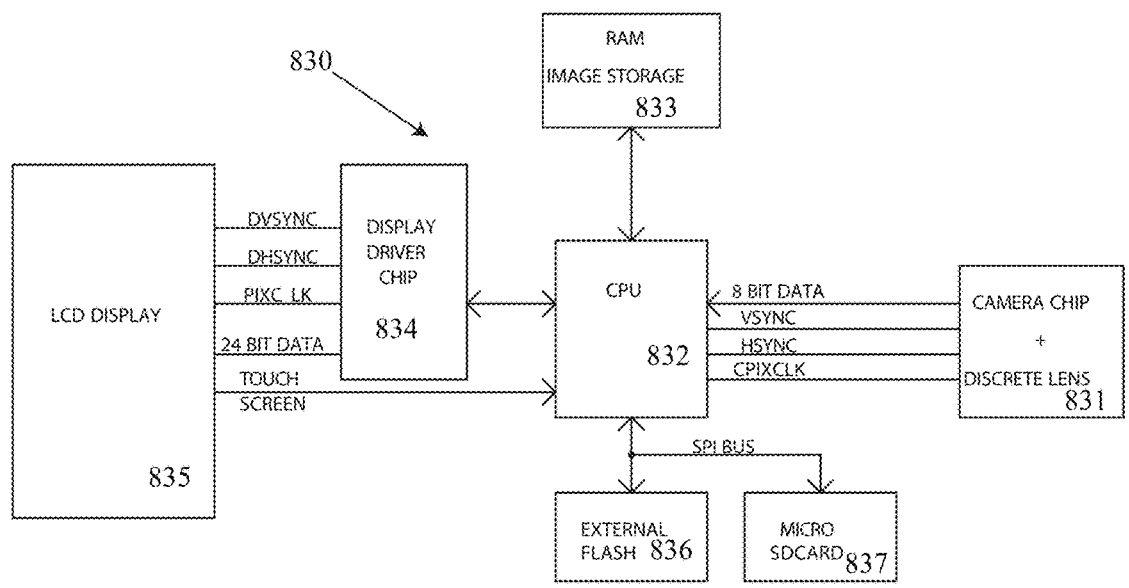
FIG. 56A is a block diagram of a camera system.

FIG. 56A shows a block diagram for a design for a camera which can be an example of a camera that can be used as any of the above mentioned cameras such as cameras 100, 120 and substituted for the corresponding components in FIG. 37. For example, there is an embodiment 830 which has a camera chip and discrete lens 831 which is coupled to and in communication with a central processing unit (CPU) 832. This CPU 832 is coupled to a ram storage 833, and also to external or removable storage in the form of an external flash 836, and an optional micro SDCard 837. In addition, coupled to the CPU and in communication with this CPU is a display driver chip 834 which is also in communication with an LCD display 835. LCD display is also in communication with CPU as well. The pictures as well as motion video can be recorded either in memory on the memory 801 of computer 800 or it can be recorded on the SD Card 837 or on the external flash 836.

The camera can be a CMOS e2v camera with any suitable resolution such as HD resolution of 1280×1024, an 8 bit resolution depth and 1.3 megapixel in memory. The Sensor model can be a EV&6560BB or EV76560B. The lens can have a focal length of 4.2 mm and a relative aperture of F3.0 to create a relative sensor size of 1/2.5 "with a total length of approximately 21.50 mm with an angle of view of 69 degrees×51 degrees.

Figure 56B:
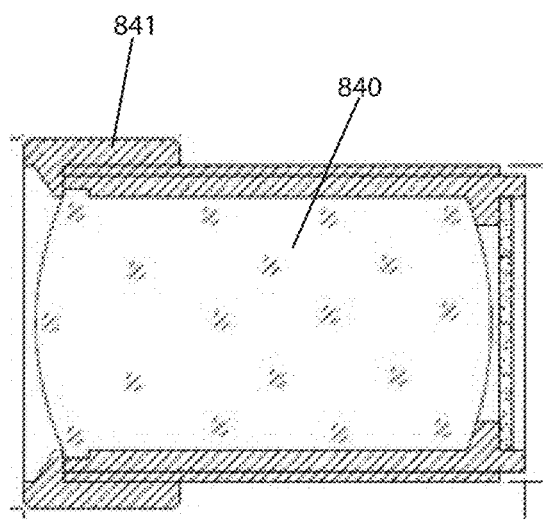
FIG. 56B is a view of a lens system.

An example of the lens is shown in FIG. 56B which shows a lens 840 with its holder or mount 841 having a mount size of M12×0.5 mm. It is noted that this camera and lens system is simply one embodiment which is a preferred embodiment but the claims are not to be limited to any of the specifications cited herein.

Figure 57:
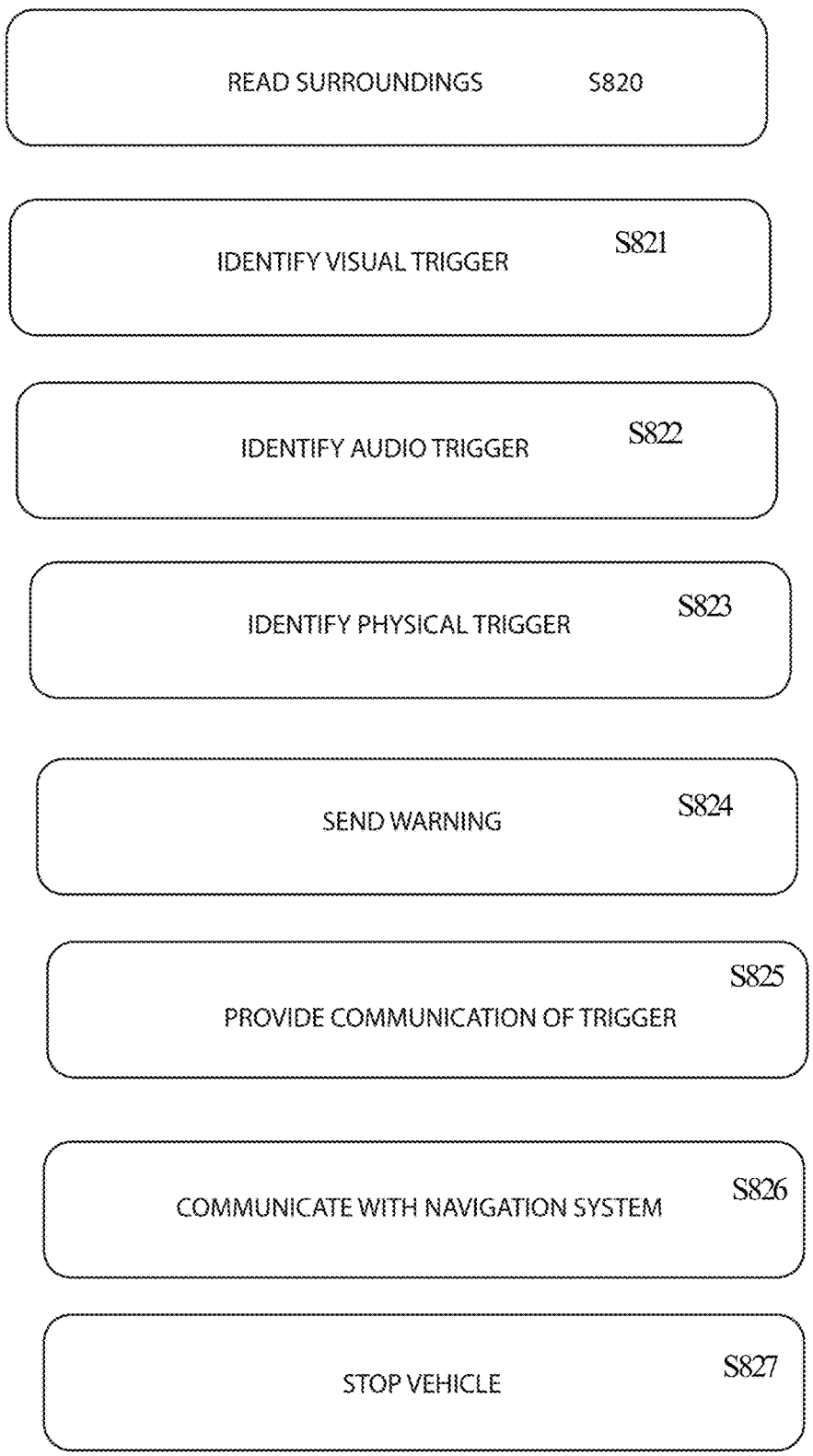
FIG. 57 is a flow chart for identifying objects.

FIG. 57 is a flow chart showing the steps for controlling an automobile or vehicle using for example the components listed above including but not limited to the components listed or referenced in FIG. 55 or even FIG. 56.

For example, FIG. 56 starts with step S820 which includes reading the surroundings of the environment using any one of the cameras 810 or sensors 812 for example. In addition, other components such as the wifi communication module 818 or the cellular communication module 819 can be used to track location or distance to other objects in the surrounding area. Furthermore, any one of the cameras 810 can also be used to identify the objects in the surrounding area. All of these components can feed information into computer 800 which is then configured to read these visual images and sensory clues to identify the objects surrounding the vehicle.

Next, in step S821 the system, in particular the computer can identify visual triggers in step S821 to identify whether the objects are of concern for the driver and to identify the distance that the vehicle is from these proposed objects.

Next, in step S822 the system can also identify audio triggers as well to determine from this information the operations around the vehicle. Thus the sensors 812 can be audio sensors as well.

Next in strep S823 the system can identify the physical trigger via sensors as well. This physical trigger can be for example physical contact by an object on the vehicle which causes the sensors such as sensors 812 to react. Thus, these sensors can be in the form of tactile sensors as well.

Next, in step S824, the system comprising computer 800 can send a warning which can be an indication sent from a projector 814 or information sent to a screen 815 as well. In addition, this warning can also be in the form of an audio warning as well either through a voice warning or through a beep generated through the vehicles audio system 811.

Next, in step S825 the system can provide a communication of the trigger such as an image of a body on a screen, or a voice indication of the location of the body or shape of the body or type of the body.

Next, in step S826, the system can communicate with the vehicle's navigation system to identify on the navigation system the location of any of the potential triggers as well.

Next, in step S827, the system including computer 800 can stop the vehicle from moving to prevent any accidents by the user.

Thus, above there is disclosed many different embodiments which are designed to provide a self-contained vehicle warning system which is configured to warn users of impending collisions or interactions with other bodies around them such as other autos or pedestrians. It should be noted that any one of the above cameras in any one of the above embodiments can be used in any one of the other embodiments. In addition, any one of the above screens in any one of the above embodiments can be used with the other embodiments. Furthermore, any one of the above components with any one of the above embodiments should be construed as optional unless stated as being required within the system.

Accordingly, while at least one embodiment of the present invention has been shown and described, it is obvious that many changes and modifications may be made thereunto without departing from the spirit and scope of the invention.

What is claimed is:

1. A viewing system coupled to a vehicle the system comprising:
    a) at least one camera positioned on a front side mirror of a vehicle and directed towards a position in front of or adjacent to a front portion of the vehicle; and
    b) at least one screen;
    at least one support bracket comprising at least one universal joint;
    c) at least one coupling bracket coupled to said at least one support bracket wherein said at least one coupling bracket comprises a plurality of prongs configured to be coupled to said at least one screen
    wherein said at least one camera coupled to the vehicle and wherein said at least one screen is in communication with said at least one camera, wherein said at least one screen displays images presented by said at least one camera and wherein said at least one camera is configured to identify objects positioned in front or adjacent to a front portion of the vehicle.

2. The viewing system as in claim 1, wherein the vehicle comprises a support and wherein said at least one screen is coupled to at least one support.

3. The viewing system as in claim 1, wherein said at least one camera comprises at least three cameras.

4. The viewing system as in claim 1, further comprising at least one additional set of cameras.

5. The viewing system as in claim 1, further comprising at least one aggregator coupled to a first set of cameras and wherein said at least one aggregator has an output coupled to said at least one screen.

6. The viewing system as in claim 5, further comprising at least one video compression device which is configured to compress the incoming video, wherein said video compression device has an output to said screen.

7. The viewing system as in claim 5, further comprising at least one video recorder.

8. A viewing system coupled to a motor vehicle having a frame having a roof, at least one support, and a body with the at least one support supporting the roof over the body, the system comprising:
    a) at least one camera;
    b) at least one support bracket comprising at least one universal joint;
    c) at least one screen coupled to the at least one support bracket, wherein said at least one screen is configured to be adjusted in a plurality of different angles; and
    wherein said at least one camera coupled to the at least one support and wherein said at least one screen is in communication with said at least one camera, wherein said at least one screen displays images presented by said at least one camera;
    at least one coupling bracket coupled to said at least one support bracket wherein said at least one coupling bracket comprises a plurality of prongs configured to be coupled to said at least one screen.

9. The viewing system as in claim 8, further comprising at least one projector in communication with said at least one camera, wherein said at least one projector is configured to project an image onto a windshield.

10. The viewing system as in claim 8, further comprising at least one mounting bracket wherein said at least one mounting bracket is configured to be mounted on a side of an automobile, and wherein said at least one camera is configured to be mounted on said at least one mounting bracket.

11. The viewing system as in claim 10, wherein said at least one mounting bracket comprises at least one curved surface positioned substantially opposite a surface supporting said at least one camera.

12. The viewing system as in claim 8, wherein the at least one support bracket comprises at least two ball joints for adjustment of a screen.

13. A viewing system for a motor vehicle comprising:
    a) a plurality of cameras positioned on at least one front-side portion of the motor vehicle, said plurality of cameras being directed towards a position in front of or adjacent to a front portion of the vehicle;
    b) at least one sensor;
    c) at least one computing device configured to identify objects spaced apart from the motor vehicle;
    d) at least one display;
    e) at least one support bracket comprising at least one universal joint;
    f) at least one coupling bracket coupled to said at least one support bracket wherein said at least one coupling bracket comprises a plurality of prongs configured to be coupled to said at least one screen;
    wherein said at least one display is configured to display an image captured by said plurality of cameras, and wherein said display is configured to change when said at least one sensor detects a potential collision.

14. The viewing system as in claim 13, further comprising at least one communication module which comprises at least one of a cellular communication module and a wifi communication module.

15. The viewing system as in claim 14, wherein said at least one display comprises a projector and a screen which is a substantially translucent adhesive screen configured to be coupled to a windshield of a vehicle.

16. The viewing system as in claim 14, wherein said at least one display comprises a projector, and a curved screen coupled to said projector.

17. The viewing system as in claim 14, further comprising a recording device wherein said at least one computing device comprises a memory configured to record images and moving images in said recording device.

* * * * *